United States Patent
Kasahara et al.

(10) Patent No.: US 12,500,984 B2
(45) Date of Patent: Dec. 16, 2025

(54) NOTIFICATION SYSTEM NOTIFYING USER OF MESSAGE, CONTROL METHOD THEREFOR, AND STORAGE MEDIUM STORING CONTROL PROGRAM THEREFOR

(71) Applicant: CANON KABUSHIKI KAISHA, Tokyo (JP)

(72) Inventors: Ryosuke Kasahara, Ibaraki (JP); Shuichi Takenaka, Chiba (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 338 days.

(21) Appl. No.: 18/191,281

(22) Filed: Mar. 28, 2023

(65) Prior Publication Data
US 2023/0336669 A1    Oct. 19, 2023

(30) Foreign Application Priority Data

Apr. 18, 2022 (JP) .................................. 2022-068273
May 6, 2022 (JP) .................................. 2022-076685
Feb. 16, 2023 (JP) .................................. 2023-022893

(51) Int. Cl.
  *H04N 1/00*    (2006.01)
  *G06F 3/0481*  (2022.01)
  *H04L 51/224*  (2022.01)

(52) U.S. Cl.
  CPC ....... *H04N 1/00084* (2013.01); *G06F 3/0481* (2013.01); *H04L 51/224* (2022.05); *H04N 1/00488* (2013.01)

(58) Field of Classification Search
  CPC ............... H04N 1/00084; H04N 1/488; H04N 1/00344; H04N 1/00002; H04L 51/224; G06F 3/0481; G06F 11/00; G11C 29/44; G05B 2219/24001
  See application file for complete search history.

(56) References Cited

U.S. PATENT DOCUMENTS

| | | | | |
|---|---|---|---|---|
| 7,904,613 | B2* | 3/2011 | Hagiuda | G06F 3/121 |
| | | | | 713/1 |
| 8,539,356 | B2* | 9/2013 | Ito | G06F 21/604 |
| | | | | 715/741 |
| 8,553,244 | B2* | 10/2013 | Ohashi | G06F 3/1259 |
| | | | | 717/172 |
| 10,136,296 | B1* | 11/2018 | Dames | H04W 4/90 |
| 11,012,581 | B1* | 5/2021 | Kodimer | G06V 20/20 |

(Continued)

FOREIGN PATENT DOCUMENTS

JP    2021002767 A    1/2021

*Primary Examiner* — Patrick F Riegler
(74) *Attorney, Agent, or Firm* — ROSSI, KIMMS & McDOWELL LLP

(57) ABSTRACT

A notification system that is capable of sending a message to a person who is highly related to the message. The notification system includes an image pickup unit that picks up an image including a person as an object, an obtainment unit that obtains a role of the person in the image based on the image picked up by the image pickup unit, a determination unit that determines a content of a message about a predetermined event corresponding to the role obtained by the obtainment unit, and a notification unit that notifies of the message determined by the determination unit.

14 Claims, 33 Drawing Sheets

(56) References Cited

U.S. PATENT DOCUMENTS

| | | | |
|---|---|---|---|
| 2007/0273915 A1* | 11/2007 | Nakagawa | H04N 1/00832 358/1.14 |
| 2008/0104044 A1* | 5/2008 | Kardamilas | H04L 67/55 |
| 2009/0063663 A1* | 3/2009 | Ikeno | H04L 43/0817 709/220 |
| 2009/0070494 A1* | 3/2009 | Hagiuda | G06F 3/1285 710/19 |
| 2011/0075191 A1* | 3/2011 | Meunier | H04N 1/00244 358/1.15 |
| 2011/0141509 A1* | 6/2011 | Kato | H04N 1/00344 358/1.13 |
| 2011/0270771 A1* | 11/2011 | Coursimault | H04N 1/00344 705/304 |
| 2012/0218578 A1* | 8/2012 | Tanaka | H04N 1/00344 358/1.13 |
| 2014/0126016 A1* | 5/2014 | Namihira | G06F 21/31 358/1.15 |
| 2015/0172267 A1* | 6/2015 | Sato | H04L 63/0815 726/3 |
| 2015/0181056 A1* | 6/2015 | Mutsuno | G06F 3/1236 358/1.14 |
| 2015/0229793 A1* | 8/2015 | Melo | H04N 1/00344 358/1.15 |
| 2015/0249771 A1* | 9/2015 | Young | G06F 3/121 358/1.14 |
| 2016/0359849 A1* | 12/2016 | Nakajima | H04L 63/0853 |
| 2017/0094120 A1* | 3/2017 | Towata | H04N 1/00336 |
| 2017/0171431 A1* | 6/2017 | Towata | H04N 1/4406 |
| 2017/0180598 A1* | 6/2017 | Nagahara | H04N 1/32662 |
| 2017/0272606 A1* | 9/2017 | Wang | G06F 3/1261 |
| 2017/0366701 A1* | 12/2017 | Ooba | H04N 1/00076 |
| 2018/0349678 A1* | 12/2018 | Koskan | G06Q 10/00 |
| 2020/0053540 A1* | 2/2020 | Dames | H04L 67/306 |
| 2020/0259967 A1* | 8/2020 | Onishi | H04N 1/00403 |
| 2020/0341696 A1* | 10/2020 | Shibuta | G06F 3/1286 |
| 2020/0404111 A1 | 12/2020 | Matsuda | |
| 2021/0243329 A1* | 8/2021 | Sohma | H04N 1/4426 |
| 2021/0349955 A1* | 11/2021 | Megill | G06F 16/955 |

\* cited by examiner

FIG. 10

| Malfunction | Recovery procedure | Available user |
|---|---|---|
| Degradation of ITB belt | Replacement of ITB belt | Service person |
| Wear of conveyance roller | Replacement of conveyance roller | Service person |
| Full of waste toner | Replacement of waste toner box | Administrator user |
| ... | ... | ... |

FIG. 11A

| Recovery procedure | General user | Administrator user | Service person |
|---|---|---|---|
| Replacement of ITB belt | PRINT/COPY function is unusable | Degenerate into SEND function only | Replace ITB belt |
| Replacement of conveyance roller | PRINT/COPY function is unusable | Degenerate into SEND function only | Replace conveyance roller |
| Replacement of waste toner box | PRINT/COPY function is unusable | Replace waste toner box | No message |
| ... | ... | ... | ... |

FIG. 11B

| Recovery procedure | General user | Administrator user | Service person |
|---|---|---|---|
| Replacement of ITB belt | Call administrator user | Call service person | No message |
| Replacement of conveyance roller | Call administrator user | Call service person | No message |
| Replacement of waste toner box | Call administrator user | No message | No message |
| ⋮ | ⋮ | ⋮ | ⋮ |

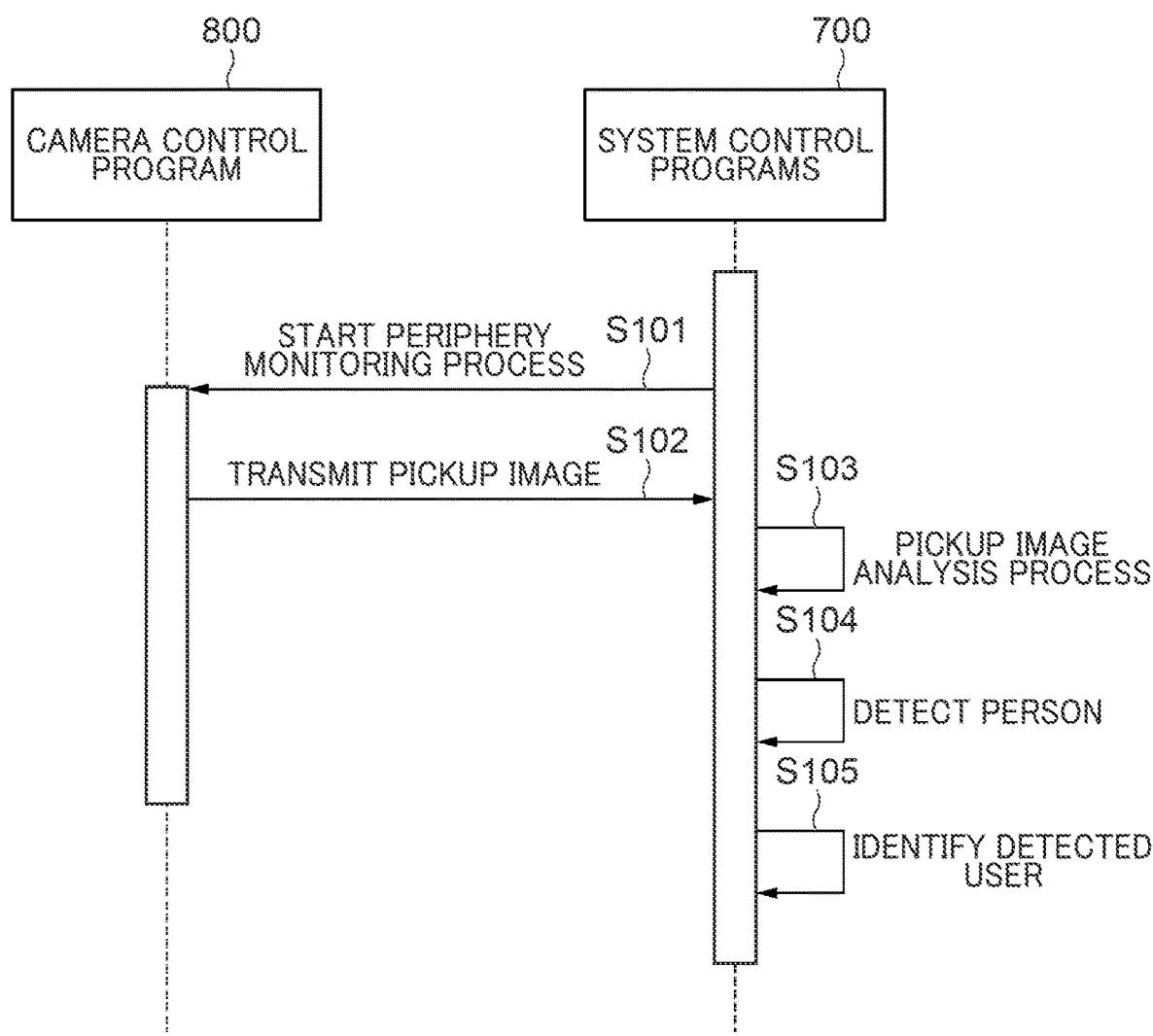

*FIG. 26*

| No | UserID | E-mail | Role |
|---|---|---|---|
| 1 | AAA | AAA@mail.com | GeneralUser |
| 2 | BBB | BBB@mail.com | Administrator |
| 3 | CCC | CCC@mail.com | GeneralUser |
| 4 | ... | ... | ... |
|  |  |  |  |

FIG. 27

| Device condition | Message type | GeneralUser (General user) | Specific user | Administrator (Administrator user) |
|---|---|---|---|---|
| Paper jam | Abnormality message | (No voice notification) | (No voice notification) | Jam occurs at paper feeding roller. |
| Residual K toner shortage | Abnormality message | (No voice notification) | (No voice notification) | Residual K toner is empty. Replace K toner box. |
| Reception of Fax job | Message for specific user | (No voice notification) | Fax is received for specific user. | (No voice notification) |
| Completion of copy job | General message | Copy is completed. | Copy is completed. | Copy is completed. |

NOTIFICATION SYSTEM NOTIFYING USER OF MESSAGE, CONTROL METHOD THEREFOR, AND STORAGE MEDIUM STORING CONTROL PROGRAM THEREFOR

BACKGROUND OF THE INVENTION

Field of the Invention

The present invention relates to a notification system that notifies a user of a message, a control method therefor, and a storage medium storing a control program therefor.

Description of the Related Art

There is a known image forming apparatus (image processing apparatus), such as an MFP (Multifunction Peripheral/Printer/Product), that has a function to notify a user, who uses the apparatus, of a message. The message notification may be achieved by a voice message from a speaker. An apparatus disclosed in Japanese Laid-Open Patent Publication (Kokai) No. 2021-002767 (JP 2021-002767A, Counterpart of US 20200404111 A1) automatically internally generates a message to request maintenance when a malfunction, such as a trouble of the apparatus concerned, occurs. Then, an unspecified user approaching the apparatus is notified of a voice message to request maintenance.

However, when the apparatus disclosed in the above publication notifies an unspecified user of a voice message, a user who receives the voice message is not necessarily a user who can cope with the message or a user who actually cope with the message. For example, even if a message about recovery of a caused malfunction that needs special knowledge, such as failure of a conveyance roller, is sent to a general user, the user concerned can hardly cope with the malfunction or the user concerned may be confused.

SUMMARY OF THE INVENTION

The present invention provides a notification system that is capable of sending a message to a person who is highly related to the message, a control method therefor, and a storage medium storing a control program therefor.

Accordingly, an aspect of the present invention provides a notification system including an image pickup unit configured to pick up an image including a person as an object, an obtainment unit configured to obtain a role of the person in the image based on the image picked up by the image pickup unit, a determination unit configured to determine a content of a message about a predetermined event corresponding to the role obtained by the obtainment unit, and a notification unit configured to notify of the message determined by the determination unit.

According to the present invention, a message is sent to a person who is highly related to the message.

Further features of the present invention will become apparent from the following description of exemplary embodiments with reference to the attached drawings.

BRIEF DESCRIPTION OF THE DRAWINGS

FIG. 10 is a view showing a recovery procedure management table managed by the cloud server.

FIG. 11A and FIG. 11B are views showing user-type specified message generation tables managed by the cloud server.

FIG. 12 is a sequence chart showing a periphery monitoring control process performed between the camera control program and the system control program.

FIG. 26 is a view showing an example of a user data list used by the data conversion control program.

FIG. 27 is a view showing an example of a message generation table stored in the cloud server.

DESCRIPTION OF THE EMBODIMENTS

Figure 1:
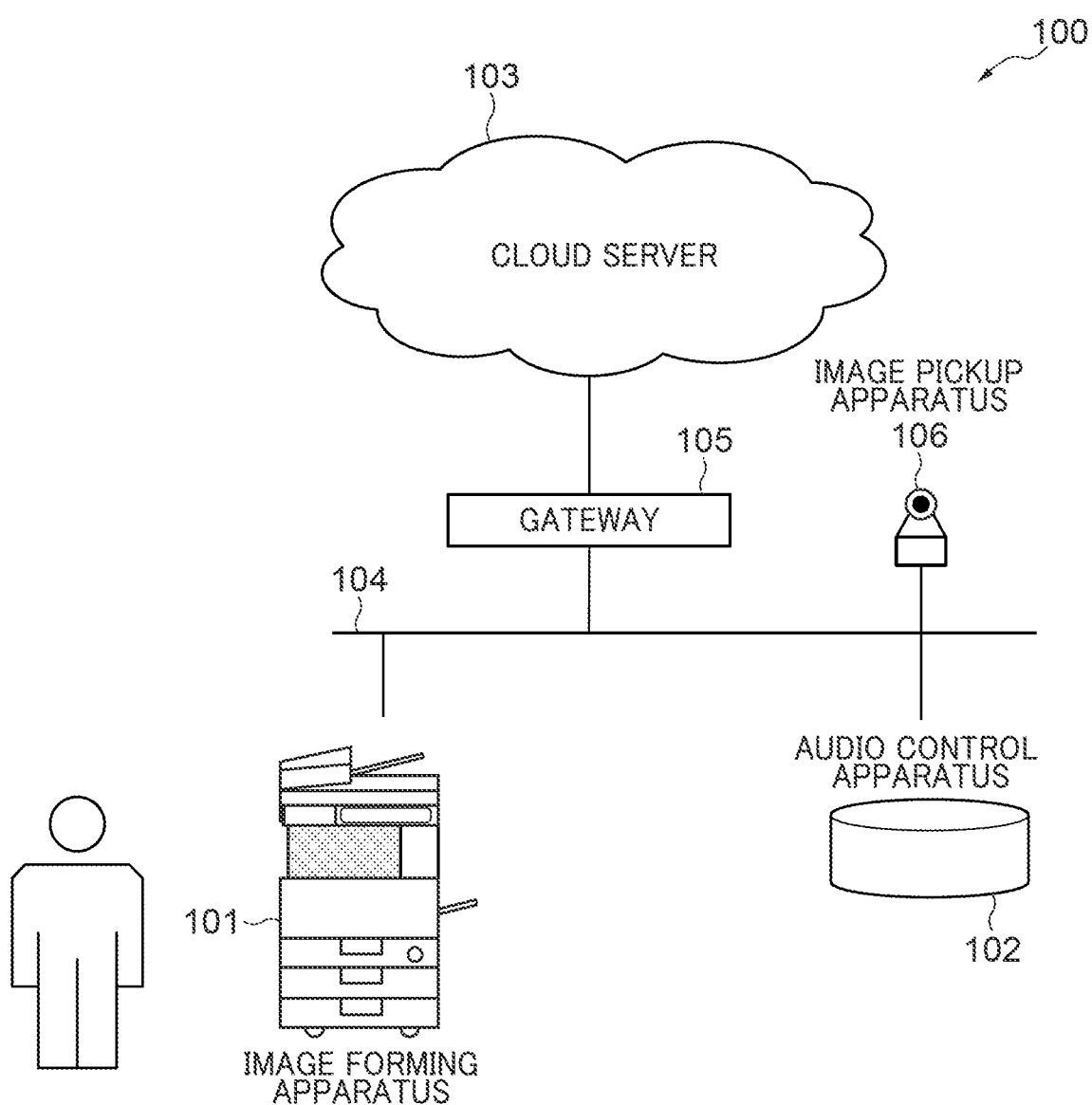
FIG. 1 is a view showing an example of an entire configuration of a notification system according to a first embodiment of the present invention.

Hereafter, embodiments according to the present invention will be described in detail by referring to the drawings. However, configurations described in the following embodiments are just examples, and the scope of the present invention is not limited to the configurations described in the embodiments. For example, each member that constitutes the present invention can be replaced by a member of an arbitrary configuration that exhibits an equivalent function. Moreover, arbitrary structures may be added. Moreover, two or more arbitrary configurations (characteristic features) in the embodiments can be combined.

The notification system of the present invention specifies a role of a person in a pickup image and determines a content of a message according to the specified role. In a first embodiment, an attribute (a general user, an administrator user, etc.) as a role of a person is determined from clothes etc. of the person, and a content of a message is determined on the basis of the attribute.

FIG. 1 is a view showing an example of an entire configuration of a notification system 100 according to the first embodiment of the present invention. As shown in FIG. 1, the notification system 100 has an image forming apparatus (an image processing apparatus) 101, an audio control apparatus 102, a cloud server 103, a gateway 105, and an image pickup apparatus (an image pickup unit) 106. In the notification system 100, the image forming apparatus 101, audio control apparatus 102, image pickup apparatus 106, and cloud server 103 are mutually connected via the gateway 105 and a network 104 so as to be communicable. The notification system 100 stores programs causing a computer to execute operations (a control method for the notification system) of members and units of the notification system 100. The programs may be collectively stored in one of the image forming apparatus 101, audio control apparatus 102, image pickup apparatus 106, and cloud server 103. Alternatively, the programs may be dispersively stored in the respective apparatuses.

The image forming apparatus 101 is an MFP (Multifunction Peripheral/Printer/Product) that has a plurality of functions, such as a copy function, a scan function, a print function, and a FAX function. In this embodiment, the image forming apparatus 101 is a detection target. When a malfunction occurs in the image forming apparatus 101, the malfunction is detected as a predetermined event. A predetermined apparatus used as the detection target is not limited to the image forming apparatus 101. For example, another information processing apparatus, such as a personal computer or a mobile terminal, may be the detection target. Moreover, the predetermined event is not limited to a malfunction. For example, the predetermined event may be a command to an apparatus, etc. Moreover, the image forming apparatus 101 is not limited to a multifunction apparatus, for example, may be single-function apparatuses, such as a printer and a scanner.

The audio control apparatus 102 records user's voice in response to a voice operation start instruction by a user and transmits coded voice data to the cloud server 103. The audio control apparatus 102 is a voice input/output apparatus that enables voice communication with a user through a smart speaker, a smart phone, etc. Although the audio control apparatus 102 and the image forming apparatus 101 are constituted by different bodies (i.e., they are independent) in this embodiment, this configuration is not indispensable. For example, at least one of hardware and software that constitute the audio control apparatus 102 may be included in the image forming apparatus 101.

The cloud server 103 is constituted by one or more server computers and provides a cloud service that manages users who use the notification system 100, recognizes voice and an image, and performs an information process for controlling the image forming apparatus 101. The cloud server 103 can recognize user's voice data obtained by the audio control apparatus 102 and image data picked up by the image pickup apparatus 106 while referring to user information managed by the cloud server 103 concerned. Moreover, the cloud server 103 can analyze device information like malfunction information obtained from the image forming apparatus 101. Moreover, the cloud server 103 generates a predetermined message according to an image recognition result and a device information analysis result, and also synthesizes voice data for reproducing a message content by the audio control apparatus 102.

The image pickup apparatus 106 picks up an image (an image pickup step) including a person (hereinafter referred to as a "user") who is approaching a monitoring target area around the image forming apparatus 101. A person shall be classified to one of three user types including a general user (a user), an administrator user (an administrator), and a serviceperson in this embodiment. A general user is a person who uses the image forming apparatus 101. An administrator user is a supervisor who manages the state of the image forming apparatus 101. A service person is a maintenance person who performs maintenance and check of the image forming apparatus 101. Moreover, the image pickup apparatus 106 is an external camera that is installed in a place different from the image forming apparatus 101 and is connectable via a USB or a LAN (i.e., a network camera) in this embodiment. However, this configuration is not indispensable. For example, the image pickup apparatus 106 may be built in the image forming apparatus 101.

The network 104 is directly connected with the image forming apparatus 101, audio control apparatus 102, and the image pickup apparatus 106, and is also connected with the cloud server 103 through the gateway 105. The network 104 can transfer various data, such as voice data obtained by the audio control apparatus 102, image data picked up by the image pickup apparatus 106, device information transmitted from the image forming apparatus 101, and voice data transmitted from the cloud server 103.

The gateway 105 is a wireless LAN router based on the IEEE802.11 standard series, for example. The IEEE802.11 standard series includes standards belonging to IEEE802.11, such as IEEE802.11a and IEEE802.11b. The gateway 105 is not limited to the wireless LAN router and may be a wired LAN router based on the Ethernet standard that is represented by 10BASE-T, 100BASET, 1000BASE-T, etc. Moreover, the gateway 105 may have ability to operate according to another wireless communication system or another wired communication system.

Figure 2:
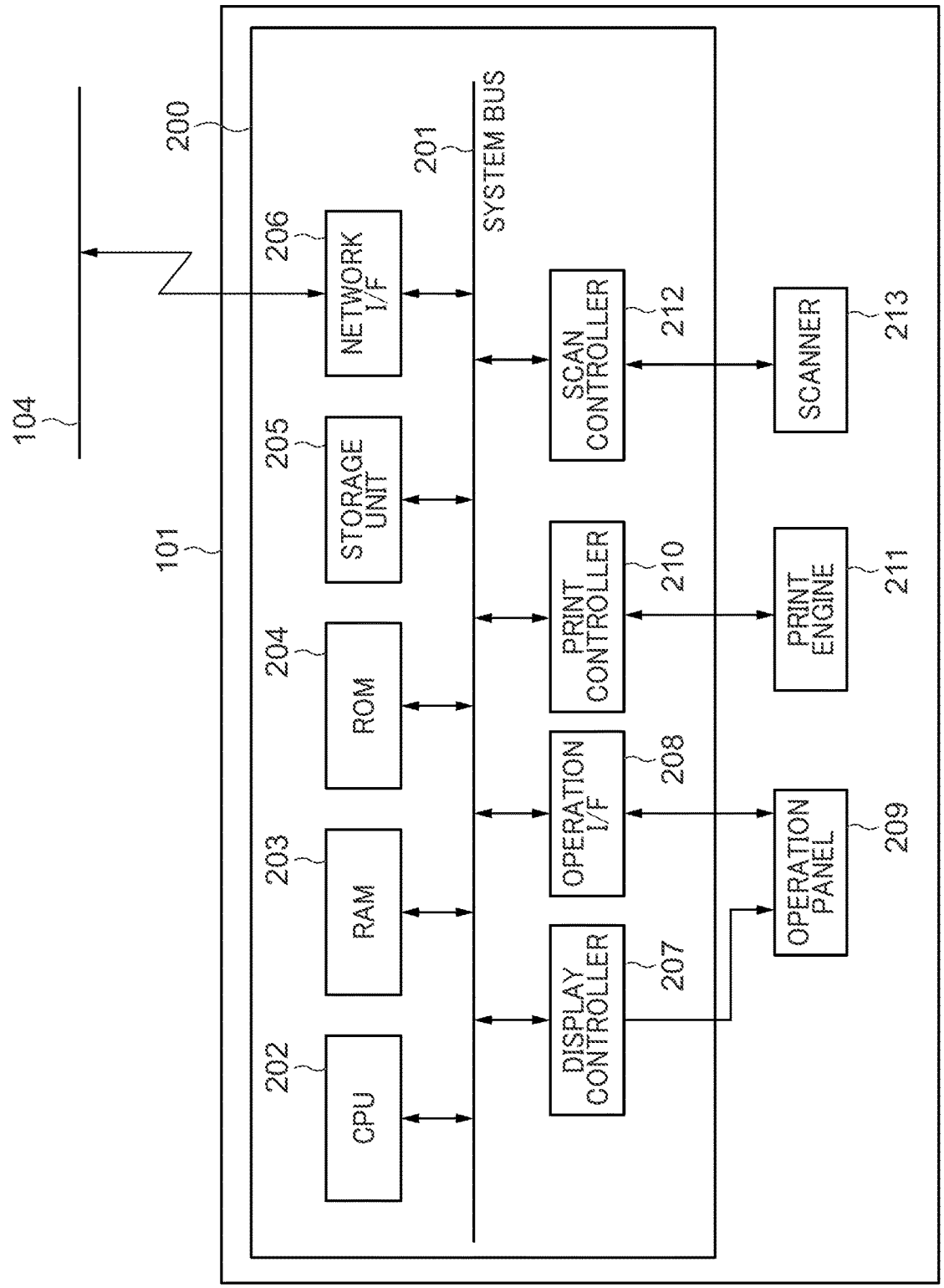
FIG. 2 is a block diagram showing a hardware configuration of an image forming apparatus shown in FIG. 1.

FIG. 2 is a block diagram showing a hardware configuration of the image forming apparatus 101. As shown in FIG. 2, the image forming apparatus 101 has a controller unit 200, an operation panel 209, a print engine 211, and a scanner 213. The controller unit 200 has a CPU (Central Processing Unit) 202. Moreover, the controller unit 200 has a RAM 203, a ROM 204, a storage unit 205, a network I/F 206, a display controller 207, an operation I/F 208, a print controller 210, and a scan controller 212. In the controller unit 200, these components are connected via a system bus 201 so as to be communicable mutually.

The CPU 202 controls operations of the entire image forming apparatus 101. The CPU 202 reads a control program stored in the ROM 204 or the storage unit 205 and performs various control processes, such as a reading control process, a printing control process, etc. The RAM 203 is a main memory of the CPU 202 and is used as a work area and as a temporary storage area to which various control programs stored in the ROM 204 and storage unit 205 are developed. The ROM 204 stores the control programs that are executable by the CPU 202. The storage unit 205 stores print data, image data, various programs, information about various settings, etc.

Although the single CPU 202 shall execute processes shown in flowcharts mentioned later using a single memory (the RAM 203) in the image forming apparatus 101 of this embodiment, this configuration is not indispensable. For example, a plurality of CPUs may execute the processes shown in the flowcharts mentioned later by cooperating with RAMs, ROMs, and storage units in the image forming apparatus 101. Moreover, a part of the processes may be executed using hardware circuits, such as an ASIC (Application Specific Integrated Circuit) and an FPGA (Field-Programmable Gate Array).

The network I/F 206 is an interface that communicably connects the image forming apparatus 101 with an external apparatus via the network 104. Moreover, the image forming apparatus 101 analyzes print data received through the network I/F 206 with a software module (a PDL analysis module) stored in the storage unit 205 or the ROM 204. The PDL analysis module generates data for printing with the print engine 211 on the basis of the print data expressed by various kinds of page description languages (PDLs). The display controller 207 is connected with the operation panel 209. In the image forming apparatus 101, a screen controlled by the operation I/F 208 is displayed on the operation panel 209. When a user operates this screen, an event corresponding to the user's operation is obtained through the display controller 207.

The print controller 210 is connected to the print engine 211. The image data to be printed is transferred to the print engine 211 through the print controller 210. The print engine 211 receives a control command and the image data to be printed, and forms an image based on the image data on a sheet. A printing method of the print engine 211 may be an electrophotographic system or an ink jet system. When the printing method is the electrophotographic system, an electrostatic latent image formed on a photosensitive member is developed with toner, and a toner image is transferred to a sheet. Then, an image is formed by fixing the transferred toner image. In the meantime, when the printing method is the ink jet system, an image is formed on a sheet by discharging ink.

The scan controller 212 is connected to the scanner 213. The scanner 213 reads an image on a sheet and generates image data. This generated image data is stored in the storage unit 205. Moreover, the image forming apparatus 101 can form an image on a sheet using the image data generated by the scanner 213. The scanner 213 has a document feeder (not shown) and can read sheets stacked on the document feeder while conveying the sheets one by one.

Figure 3:
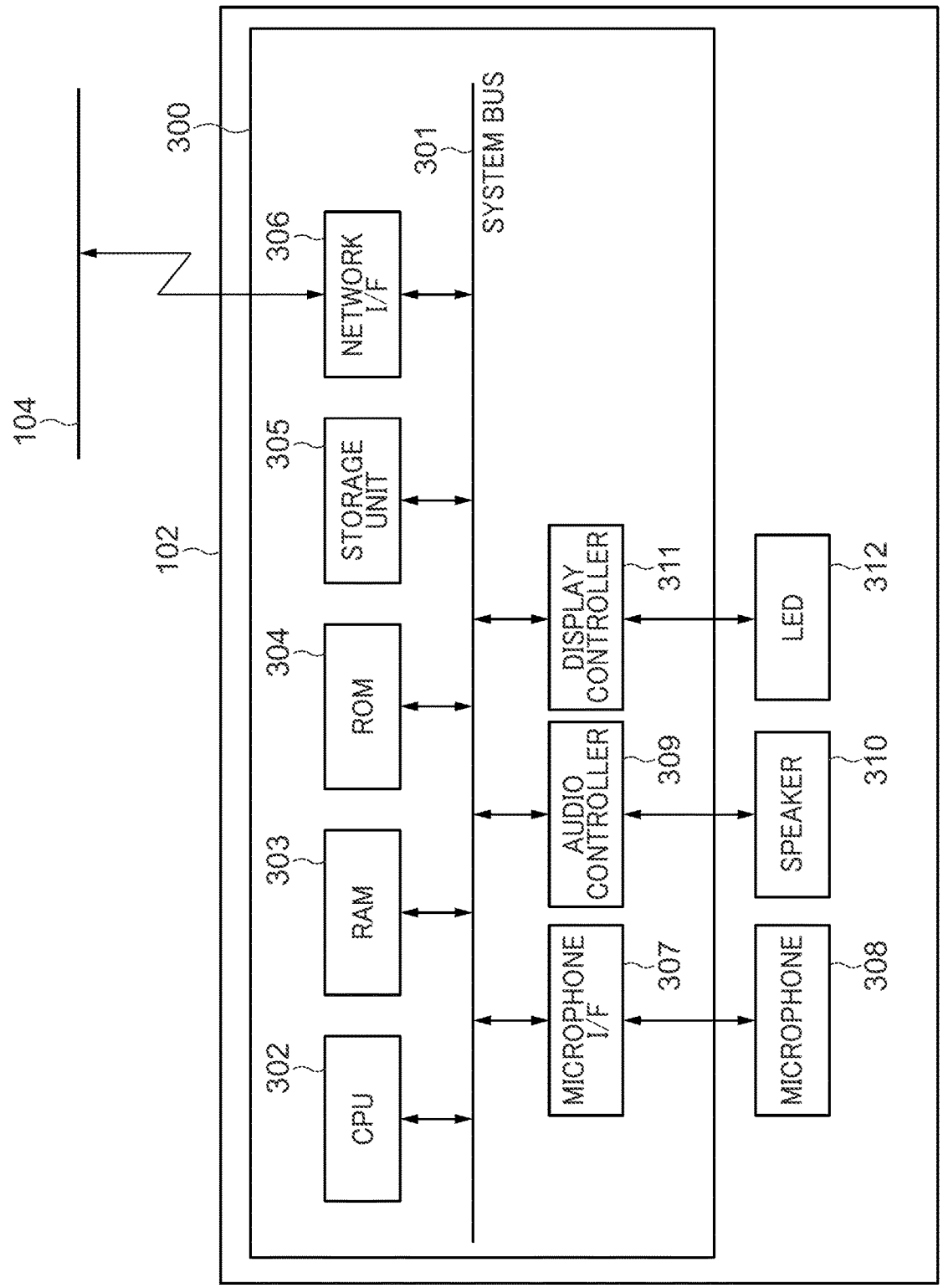
FIG. 3 is a block diagram showing a hardware configuration of an audio control apparatus shown in FIG. 1.

FIG. 3 is a block diagram showing a hardware configuration of the audio control apparatus 102. As shown in FIG. 3, the audio control apparatus 102 has a controller unit 300. The controller unit 300 has a CPU 302, a RAM 303, a ROM 304, a storage unit 305, a network I/F 306, a microphone I/F 307, an audio controller 309, and a display controller 311. In the controller unit 300, these components are connected via a system bus 301 so as to be communicable mutually. Moreover, the audio control apparatus 102 has a microphone 308 as a voice input device, a speaker 310 as a sound output device, and an LED 312 as a notification device.

The CPU 302 is a central processing unit that controls operations of the entire controller unit 300. The RAM 303 is a volatile memory. The ROM 304 is a nonvolatile memory and stores the boot program of the CPU 302. The storage unit 305 is a large capacity storage device as compared with the RAM 303 and consists of an SD card, for example. The storage unit 305 stores a control program of the audio control apparatus 102 that is executed by the controller unit 300.

The storage unit 305 is not limited to the SD card. For example, another storage device like a flash ROM that has a function equivalent to the SD card may be employed. The CPU 302 runs a boot program stored in the ROM 304 at start-up of the audio control apparatus 102 by turning ON of the power. This boot program reads the control program stored in the storage unit 305 and develops it onto the RAM 303. The CPU 302 runs the control program developed on the RAM 303 after executing the boot program so as to control operations of the entire controller unit 300. Moreover, the CPU 302 reads and writes data that is used when executing the control program by storing data on the RAM 303. The storage unit 305 can store various settings that are needed in running the control program. The CPU 302 can communicate with other devices on the network 104 through the network I/F 306.

The network I/F 306 includes a circuit and an antenna for communicating according to the wireless communication system based on an IEEE802.11 standard series. The communication through the network I/F 306 is not limited to the wireless communication system. For example, it may be a wired communication system based on the Ethernet standard. The microphone I/F 307 is connected to the microphone 308 and converts user's voice input through the microphone 308 into coded voice data. This voice data is stored into the RAM 303 in response to an instruction from the CPU 302.

In this embodiment, although the microphone 308 is a compact MEMS microphone mounted in a smart phone etc., it is not limited to this. Moreover, although the installed number of the microphone 308 may be one or more, three or more microphones are preferably installed at predetermined positions. When the installed number of the microphones 308 is three or more, an arrival direction of voice that a user utters can be detected. The audio controller 309 is connected to the speaker 310, converts voice data into an analog voice signal in response to an instruction from the CPU 302, and outputs a sound through the speaker 310.

The speaker 310 reproduces answer tone representing that the audio control apparatus 102 is responding, a sound that is synthesized by the cloud server 103, etc. The speaker 310 is a general-purpose device for reproducing a sound. The display controller 311 is connected to the LED 312 and controls the indication of the LED 312 in accordance with an instruction from the CPU 302. In the embodiment, the display controller 311 mainly performs light control of the LED for representing that the user's voice is correctly input to the audio control apparatus 102. The LED 312 is a blue LED that is visible by a user, for example. The LED 312 is a general-purpose device. A display device that can display characters, figures, etc. may be used in place of the LED 312.

Figure 4:
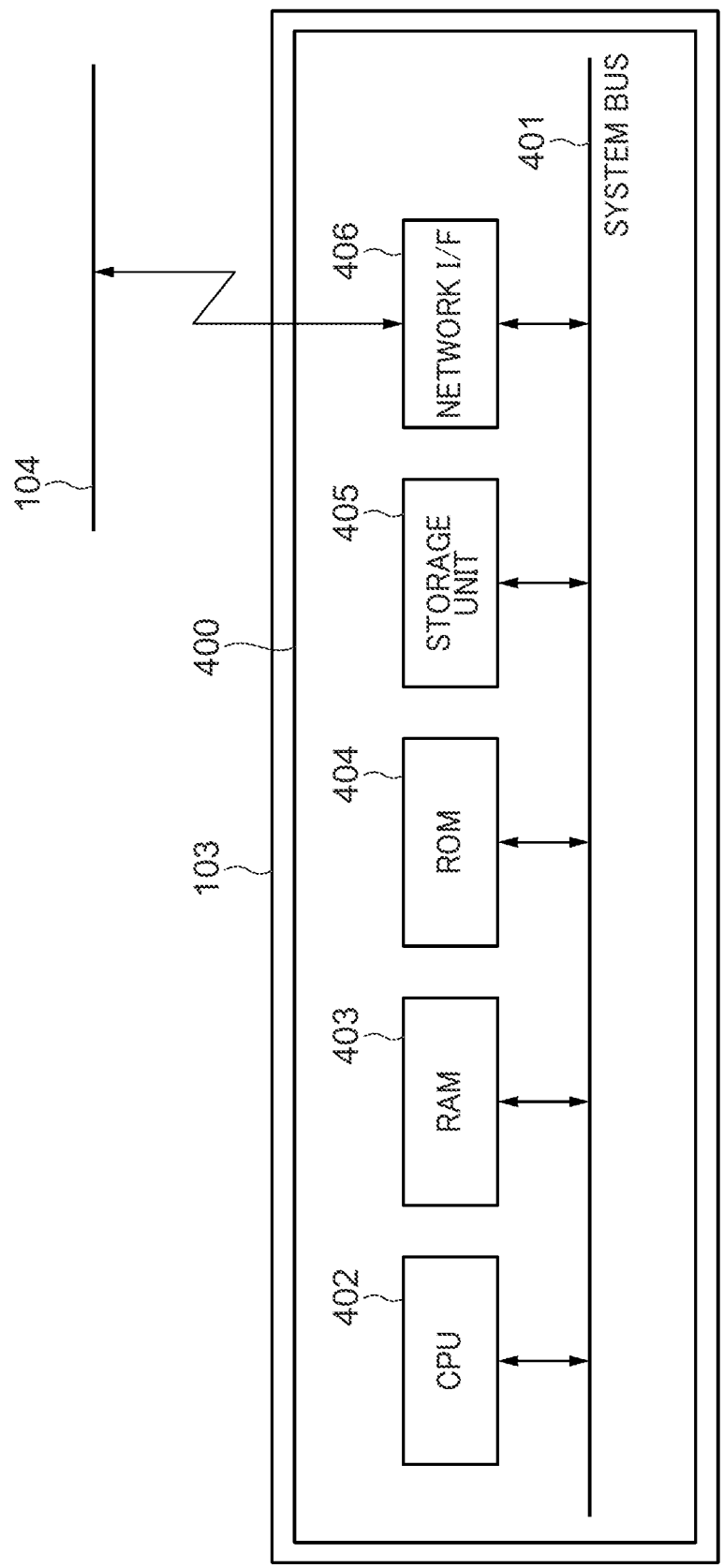
FIG. 4 is a block diagram showing a hardware configuration of a cloud server shown in FIG. 1.

FIG. 4 is a block diagram showing a hardware configuration of the cloud server 103. As shown in FIG. 4, the cloud server 103 has a controller unit 400. The controller unit 400 has a CPU 402, a RAM 403, a ROM 404, a storage unit 405, and a network I/F 406. These are connected via a system bus 401 so as to be communicable mutually.

The CPU 402 is a central processing unit that controls operations of the entire controller unit 400. The RAM 403 is a volatile memory. The ROM 404 is a nonvolatile memory and stores a boot program of the CPU 402. The storage unit 405 is a large capacity storage device as compared with the RAM 403 and consists of a hard disk drive (HDD), for example. The storage unit 405 stores a control program of the cloud server 103 that is executed by the controller unit 400. The storage unit 405 is not limited to the hard disk drive. For example, another storage device like a solid state drive (SSD) that has a function equivalent to the hard disk drive may be employed.

The CPU 402 runs the boot program stored in the ROM 404 at start-up of the cloud server 103 by turning ON of the power. This boot program reads the control program stored in the storage unit 405 and develops it onto the RAM 403. The CPU 402 runs the control program developed on the RAM 403 by executing the boot program so as to control operations of the entire controller unit 400. Moreover, the CPU 402 reads and writes data that is used when executing the control program by storing data on the RAM 403. The storage unit 405 can store various settings that are needed in running the control program. The CPU 402 can communicate with other devices on the network 104 through the network I/F 406.

Figure 5:
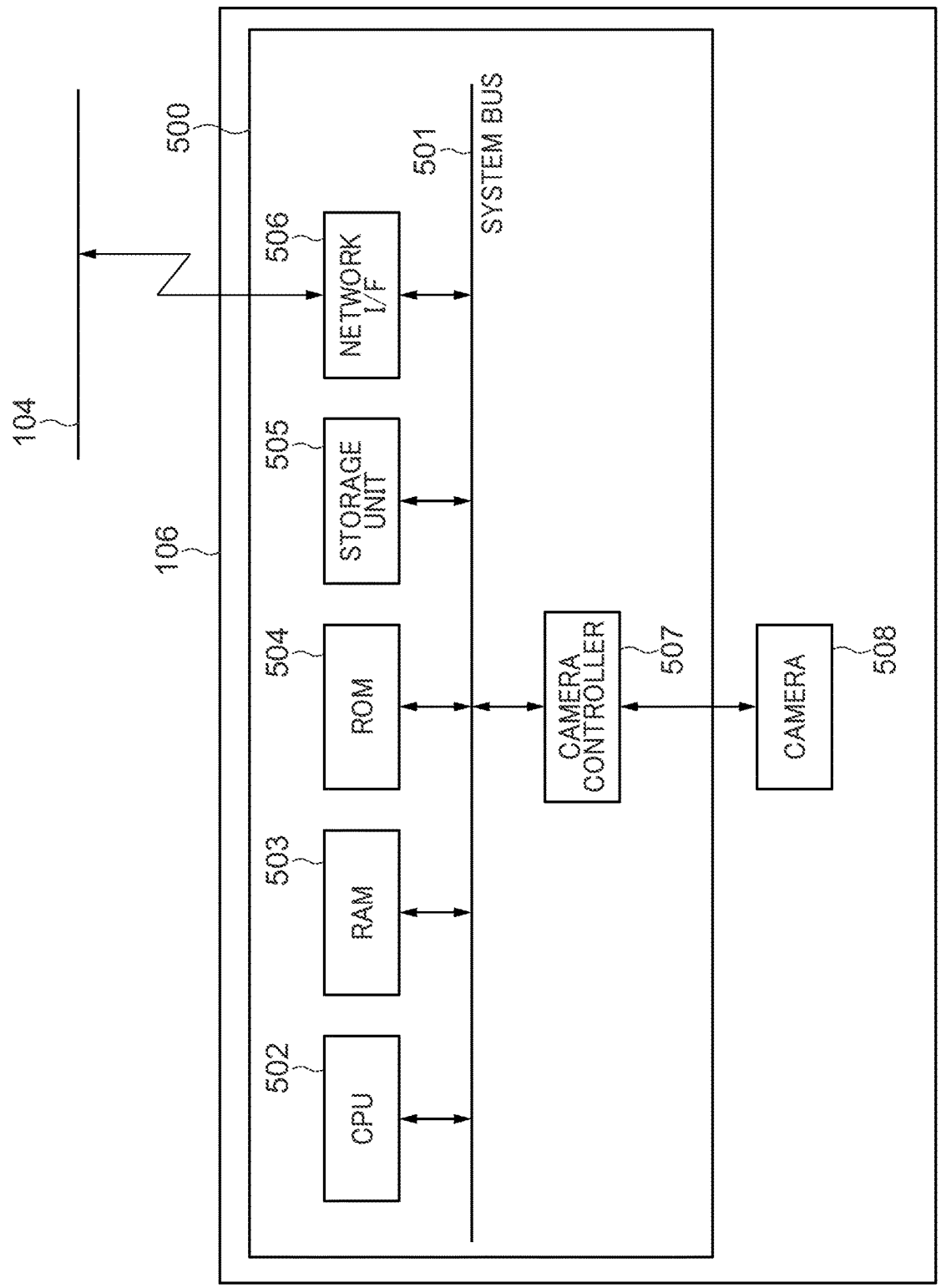
FIG. 5 is a block diagram showing a hardware configuration of an image pickup apparatus shown in FIG. 1.

FIG. 5 is a block diagram showing a hardware configuration of the image pickup apparatus 106. As shown in FIG. 5, the image pickup apparatus 106 has a controller unit 500. The controller unit 500 has a CPU 502, a RAM 503, a ROM 504, a storage unit 505, a network I/F 506, a camera controller 507, and a camera 508. These are connected via a system bus 501 so as to be communicable mutually.

The CPU 502 is a central processing unit that controls operations of the entire controller unit 500. The RAM 503 is a volatile memory. The ROM 504 is a nonvolatile memory and stores a boot program of the CPU 502. The storage unit 505 is a large capacity storage device as compared with the RAM 503 and consists of a hard disk drive (HDD), for example. The storage unit 505 stores a control program of the image pickup apparatus 106 that is executed by the controller unit 500. The storage unit 505 is not limited to the hard disk drive. For example, another storage device like a solid state drive (SSD) that has a function equivalent to the hard disk drive may be employed.

The CPU 502 runs the boot program stored in the ROM 504 at start-up of the image pickup apparatus 106 by turning ON of the power. This boot program reads the control program stored in the storage unit 505 and develops it onto the RAM 503. The CPU 502 runs the control program developed on the RAM 503 by executing the boot program so as to control operations of the entire controller unit 500. Moreover, the CPU 502 reads and writes data that is used when executing the control program by storing data on the RAM 503. The storage unit 505 can store various settings that are needed in running the control program. The CPU 502 can communicate with other devices on the network 104 through the network I/F 506.

The camera controller 507 is connected to the camera 508 and controls various exposures and image quality adjustment for image pickup. The camera 508 includes an image pickup lens and picks up a peripheral area of the image forming apparatus 101, i.e., the monitoring target area, under control of the camera controller 507.

Figure 6:
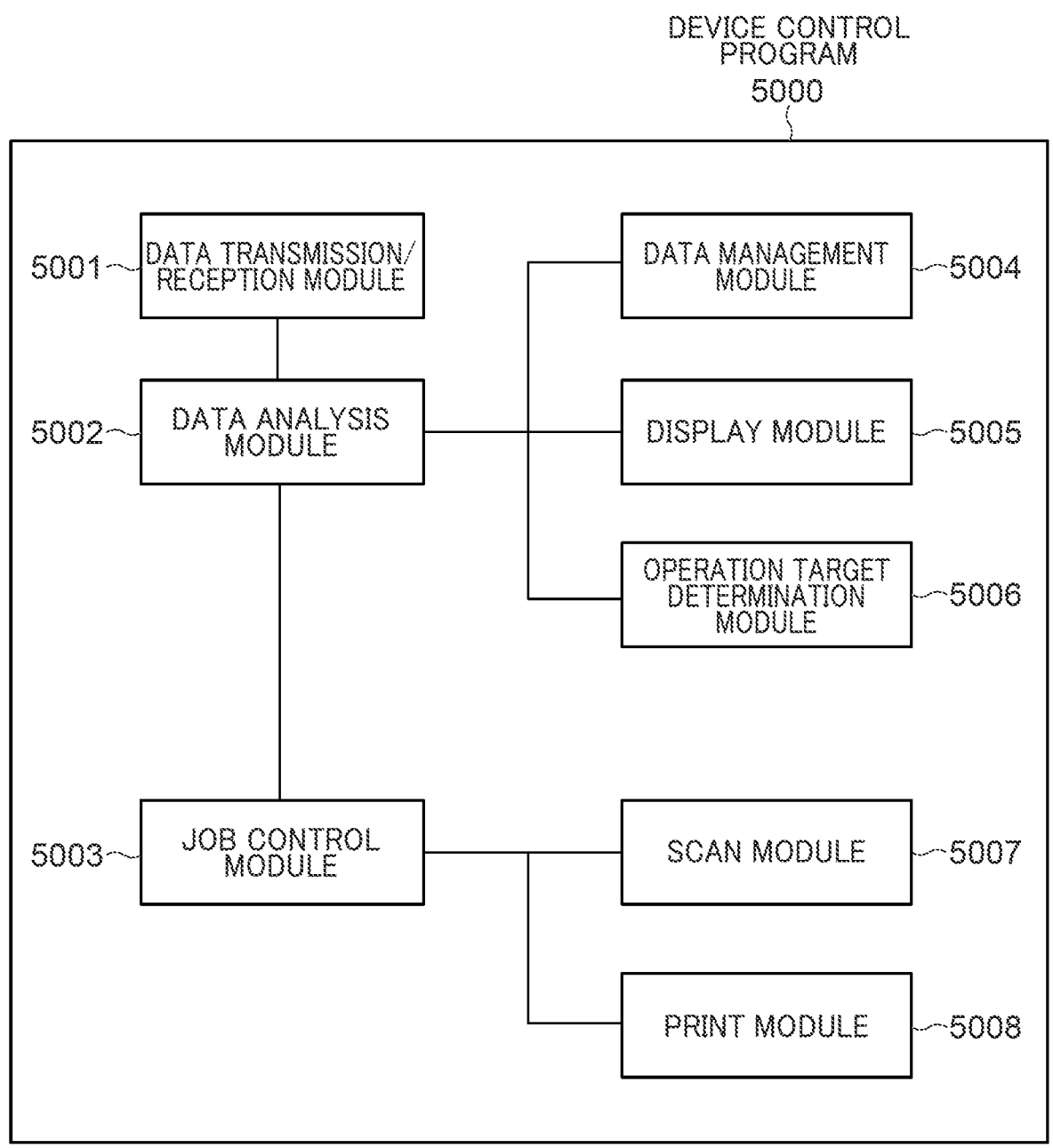
FIG. 6 is a block diagram showing a configuration of software (a device control program) of the image forming apparatus.

FIG. 6 is a block diagram showing a configuration of software (a device control program) of the image forming apparatus 101. The device control program 5000 shown in FIG. 6 is stored in the ROM 204. The CPU 202 develops the device control program 5000 to the RAM 203 at start-up of the image forming apparatus 101 and runs it. The device control program 5000 includes a data transmission/reception module 5001, a data analysis module 5002, a job control module 5003, a data management module 5004, a display module 5005, an operational target determination module 5006, a scan module 5007, and a print module 5008.

The data transmission/reception module 5001 transmits/receives data to/from other devices on the network 104 through the network I/F 206 by TCP/IP. The data transmission/reception module 5001 transmits the malfunction information and its recovery operation situation as the device information to the cloud server 103 when a malfunction of the image forming apparatus 101 occurs in this embodiment.

The data analysis module 5002 converts the device operation data that is received by the data transmission/reception module 5001 into commands that the modules in the device control program 5000 communicate. Then, the data analysis module 5002 transmits corresponding commands to the job control module 5003, data management module 5004, and display module 5005.

The job control module 5003 controls the print engine 211 and the scanner 213 through the print controller 210 and the scan controller 212. For example, when press of a start key is detected while the display unit 5005 displays a copy function screen, the job control module 5003 receives job parameters of a copy job and a job start designation from the operational target determination module 5006. Then, the job control module 5003 controls the print engine 211 so as to print image data read by the scanner 213 on the basis of the job parameters to a sheet. Since the control method of scan and print is well-known, further description is omitted.

The data management module 5004 stores various data, such as work data generated by executing the device control program 5000, setting parameters needed for device control processes, and various operation histories by users, to a predetermined areas of the RAM 203 and the storage unit 205, and manages them. Moreover, the data management module 5004 stores and manages authentication information required for communication with the gateway 105 and device information required for communication with the cloud server 103 etc.

The display module 5005 controls the operation panel 209 through the display controller 207. For example, the display module 5005 displays user operatable UI widgets (buttons, pulldown lists, check boxes, etc.) on the operation panel 209. The screen displayed on the operation panel 209 is updated on the basis of screen display control information. The operational target determination module 5006 obtains a touched coordinate on the operation panel 209 through the operation I/F 208 and determines a UI widget corresponding to the touched coordinate on the operation panel 209 as an operation target.

The scan module 5007 controls the scanner 213 through the scan controller 212 on the basis of the scan job parameters to scan an image and stores the scanned image data into the data management module 5004. The print module 5008 controls the print engine 211 through the print controller 210 to print an image on the basis of the print job parameters of the job control module 5003.

Figure 7:
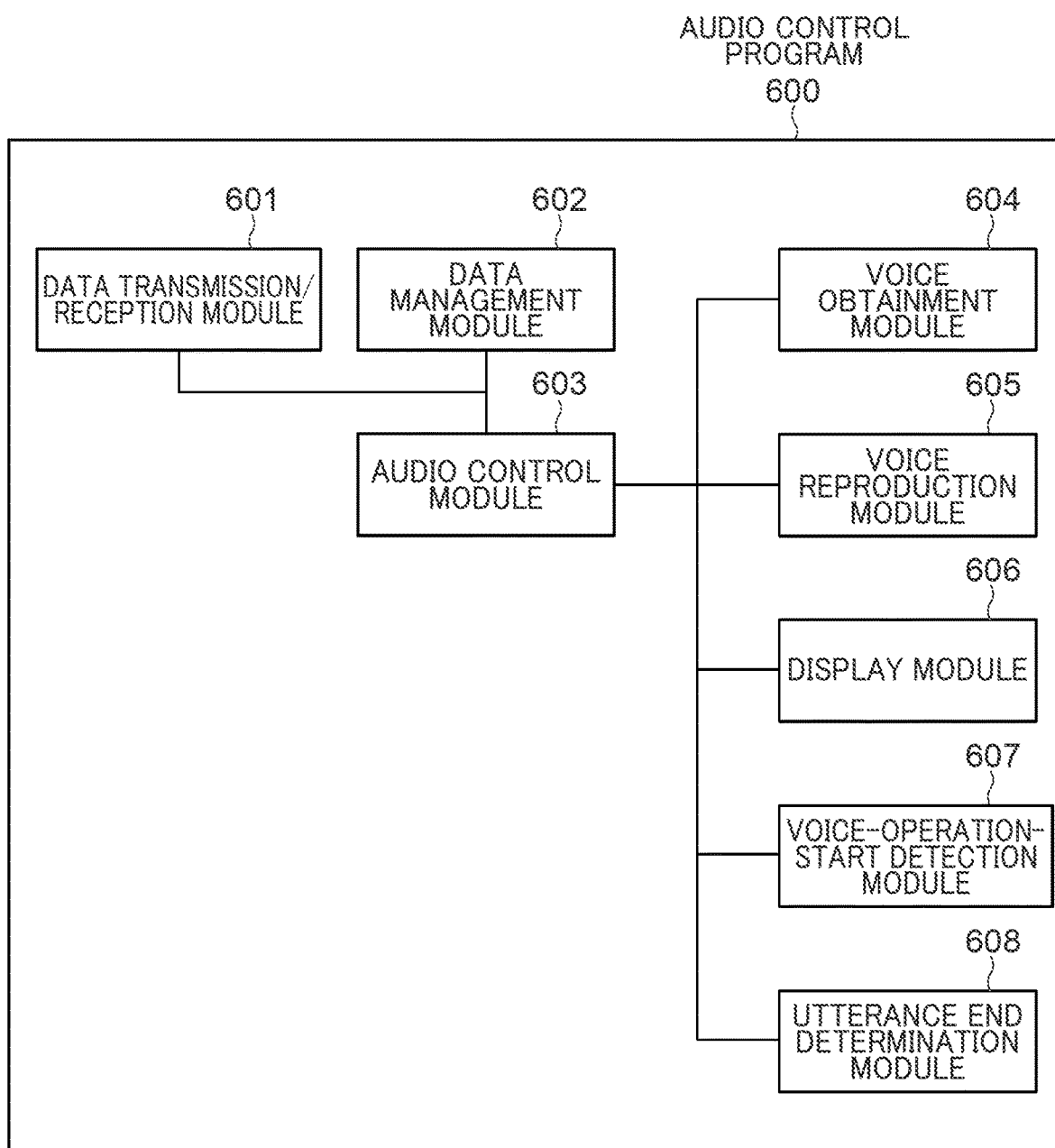
FIG. 7 is a block diagram showing a configuration of software (an audio control program) of the audio control apparatus.

FIG. 7 is a block diagram showing a configuration of software (an audio control program) of the audio control apparatus 102. The audio control program 600 shown in FIG. 7 is stored in the storage unit 305. The CPU 302 develops the audio control program 600 to the RAM 303 at start-up of the audio control apparatus 102 and runs it. The audio control program 600 includes a data transmission/reception module 601, a data management module 602, an audio control module 603, a voice obtainment module 604, a voice reproduction module 605, a display module 606, a voice-operation-start detection module 607, and an utterance end determination module 608.

The data transmission/reception module 601 transmits/receives data to/from other devices on the network 104 through the network I/F 306 by TCP/IP. The data transmission/reception module 601 transmits voice data uttered by a user obtained by the voice obtainment module 604 to the cloud server 103. Moreover, the data transmission/reception module 601 receives synthesized voice data used for a maintenance information notification to a user. It should be noted that the synthesized voice data is generated on the cloud server 103. The data management module 602 stores various data like work data etc. generated by executing the audio control program 600 to a predetermined area on the storage unit 305 and manages them. For example, the data management module 602 stores and manages voice volume setting data of voice reproduced by the voice reproduction module 605 and authentication information required for communication with the gateway 105. Moreover, the data management module 602 stores and manages device information required for communication with the image forming apparatus 101 and cloud server 103.

The voice obtainment module 604 converts analog voice of a user near the audio control apparatus 102 obtained with the microphone 308 into voice data and stores it temporarily. User's voice is converted into a predetermined format like MP3, for example. Then, this user's voice is temporarily stored on the RAM 303 as the voice data coded to be transmitted to the cloud server 103. Start and end timings of the process of the voice obtainment module 604 are managed by the audio control module 603. Moreover, voice data may be coded into a general-purpose format for streaming. The data transmission/reception module 601 may sequentially transmit the coded voice data. The voice reproduction module 605 reproduces synthesized voice data (a voice message) that is received by the data transmission/reception module 601 with the speaker 310 through the audio controller 309. A timing of voice reproduction of the voice reproduction module 605 is managed by the audio control module 603.

The display module 606 controls lighting of the LED 312 through the display controller 311. For example, the display module 606 lights the LED 312, when the voice-operation-start detection module 607 detects a voice operation. A timing of display of the display module 606 is managed by the audio control module 603. When detecting a wake word uttered by a user or detecting a press of an operation start key (not shown) of the audio control apparatus 102, the voice-operation-start detection module 607 transmits the detection result to the audio control module 603 as an operation start notification. The wake word is a voice word determined beforehand. The voice-operation-start detection module 607 is always monitoring an analog voice of a user who is near the audio control apparatus 102 obtained with the microphone 308 to detect the wake word. A user can operate the image forming apparatus 101 by talking a word that the user intends to do after talking the wake word continuously.

The utterance end determination module 608 determines an end timing of the process by the voice obtainment module 604. For example, when a user's voice breaks off beyond a predetermined period (for example, 3 seconds), the utterance end determination module 608 determines that the user's utterance has been finished and transmits the determination result to the audio control module 603 as the utterance end notification. A determination criterion about the utterance end is not limited to a no-utterance period (a blank period). For example, the utterance end may be determined on the basis of a predetermined word phrase from a user.

The audio control module 603 is a core of the control of the audio control program 600, and controls the other modules in the audio control program 600 so as to cooperate mutually. For example, the audio control module 603 controls starts and ends of the processes of the voice obtainment module 604, voice reproduction module 605, and display module 606. Moreover, the audio control module 603 controls the data transmission/reception module 601 to transmit the voice data to the cloud server 103 after the voice data is obtained by the voice obtainment module 604. Moreover, the audio control module 603 controls the voice reproduction module 605 to reproduce synthesized voice data after the synthesized voice data is received from the cloud server 103 through the data transmission/reception module 601.

Figure 8:
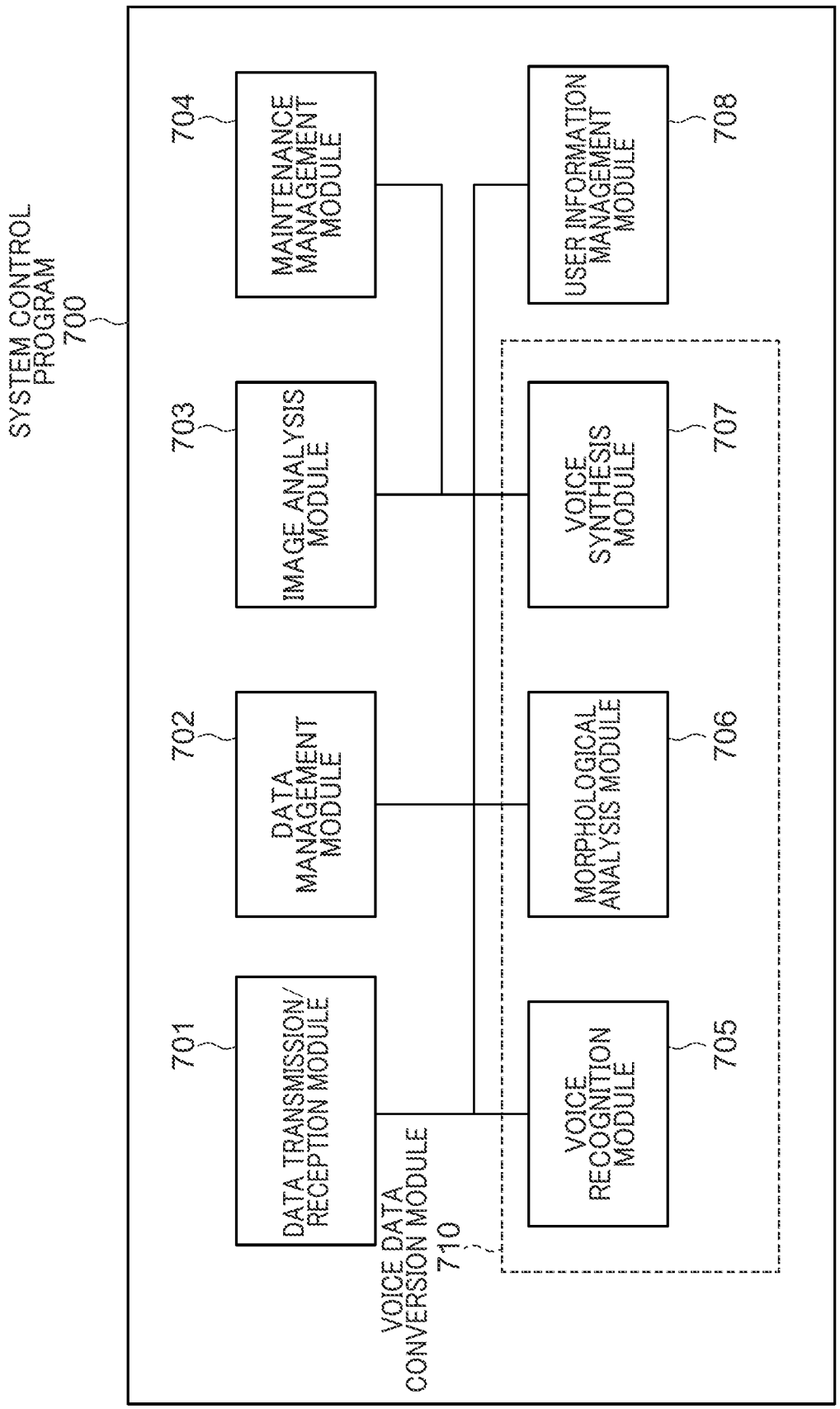
FIG. 8 is a block diagram showing a configuration of software (a system control program) of the cloud server.

FIG. 8 is a block diagram showing a configuration of software (a system control program) of the cloud server 103. The system control program 700 shown in FIG. 8 is stored in the storage unit 405. The CPU 402 develops the system control program 700 to the RAM 403 at start-up of the cloud server 103 and runs it. The system control program 700 includes a data transmission/reception module 701, a data management module 702, an image analysis module 703, a maintenance management module 704, a user information management module 708, and a voice data conversion module 710. The voice data conversion module 710 includes a voice recognition module 705, morphological analysis module 706, and voice synthesis module 707.

The data transmission/reception module 701 transmits/receives data to/from other devices on the network 104 through the network I/F 406 by TCP/IP. The data transmission/reception module 701 receives user's voice data from the audio control apparatus 102, pickup image data from the image pickup apparatus 106, and device information data from the image forming apparatus 101. The data management module 702 holds and manages various data, such as voice data generated by the voice synthesis module 707, and analytic models and parameters required to perform a voice recognition process in the morphological analysis module 706 and an image feature amount extraction process in the image analysis module 703.

The image analysis module 703 detects a person in a pickup image received from the image pickup apparatus 106 by analyzing the pickup image. Moreover, the image analysis unit 703 also performs an analysis process that identifies an individual user specifically by referring to the user information held by the user information management module 708. The maintenance management module 704 holds and manages the malfunction information and working status on the basis of the device information transmitted from the image forming apparatus 101. Moreover, the maintenance management module 704 extracts maintenance information corresponding to the malfunction information.

As mentioned above, the voice data conversion module 710 includes the voice recognition module 705, morphological analysis module 706, and voice synthesis module 707. The voice recognition module 705 performs the voice recognition process that converts the user's voice data received by the data transmission/reception module 701 into a text. The voice recognition process converts the user's voice data into phonemes using an acoustic model, and also converts the phonemes into actual text data using a language model.

The morphological analysis module 706 analyzes morphemes of the voice recognition data converted by the voice recognition module 705 according to a language setting. The morphological analysis deduces a morpheme string from a dictionary that has the grammar of the language and information about parts of speech etc., and discriminates a part of speech for each of the morphemes. The voice synthesis module 707 converts the text information described in the text data into voice information according to the language setting. It should be noted that the morphological analysis module 706 and voice synthesis module 707 are publicly known.

The user information management module 708 manages the information about users who use the notification system 100. The user information management module 708 sets and holds an authority level that defines an allowability of changing various device settings of the image forming apparatus 101 for every user. Moreover, the user information management module 708 also manages specific symbol pattern information, such as a face, an arm band, and a nameplate, for specifying an individual user. These pieces of information are referred in a user specifying process by the image analysis module 703.

Although the specific symbol pattern information for specifying an individual user is beforehand registered as a predetermined pattern model and is held statically, it is not limited to this. For example, a feature amount detected by an image analysis process in a step S2003 (see FIG. 15) mentioned later applied to an image picked up by the camera control program 800 may be used as the specific symbol pattern information. Then, the specific symbol pattern information can dynamically correspond to variation of user's appearance by reflecting and updating variation of this feature amount suitably by machine learning. In this case, a user's feature update process that specifies variation of a feature amount on the basis of a user image picked up in logging in to the image forming apparatus 101 can be performed suitably.

Figure 9:
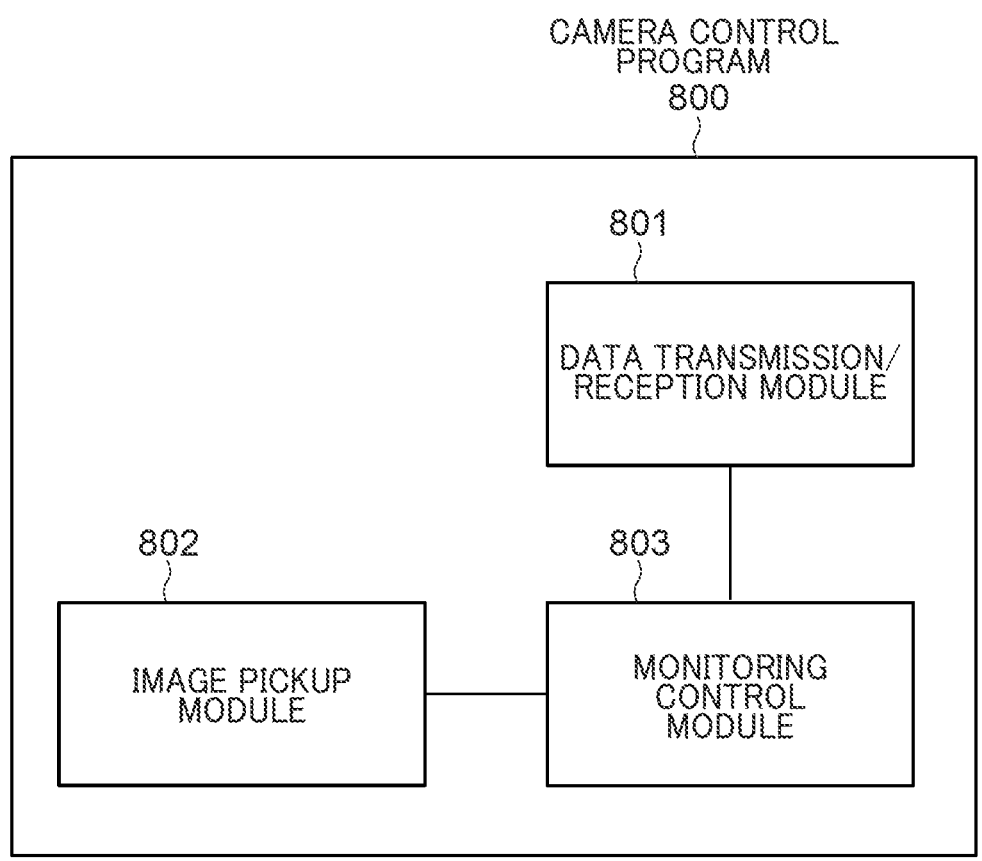
FIG. 9 is a block diagram showing a configuration of software (a camera control program) of the image pickup apparatus.

FIG. 9 is a block diagram showing a configuration of software (a camera control program) of the image pickup apparatus 106. The camera control program 800 shown in FIG. 9 is run by the CPU 502. This camera control program 800 includes a data transmission/reception module 801, an image pickup module 802, and a monitoring control module 803. The data transmission/reception module 801 has a function to receive instructions to start and finish the monitoring from the cloud server 103, a function to convert data of an image picked up by the image pickup apparatus 106, and a function to transmit the converted image data to the cloud server 103. The image pickup module 802 has a function to pick up an object while controlling the image pickup lens mounted and a function to take in an image pickup signal. The monitoring control module 803 has a function to integrally perform interpretation of instruction data received from the cloud server 103, control of start and finish of the monitoring process, and control of transmission instruction of pickup image data.

FIG. 10 is a view showing a recovery procedure management table. The recovery procedure management table shown in FIG. 10 is used to eliminate a malfunction and to return the apparatus to a normal state when the malfunction occurs in the image forming apparatus 101. The table is managed by (stored in) the maintenance management module 704 of the cloud server 103. In this embodiment, a recovery procedure to eliminate each malfunction is managed by the recovery procedure management table according to a content of a malfunction of the image forming apparatus 101.

As shown in FIG. 10, the recovery procedure management table stores a malfunction content, a recovery procedure, and information about an available user as a role of a user who can recover the apparatus as an example. Then, the recovery procedure management table defines who should perform what with respect to the malfunction. For example, when the malfunction content is "Degradation of ITB belt", the table defines that a "service person" who is the available user should perform "Replacement of ITB belt" as the recovery procedure. Moreover, when the malfunction content is "Wear of conveyance roller", the table defines that the "service person" who is the available user should perform "Replacement of conveyance roller" as the recovery procedure. When the malfunction content is "Full of waste toner", the table defines that an "administrator user (or a service person may be sufficient)" who is the available user should perform "Replacement of waste toner box" as the recovery procedure.

In this way, a recovery procedure and a user who should perform the recovery procedure are defined corresponding to a malfunction content in this embodiment. Moreover, a user other than a user who should perform a recovery procedure is notified of prohibition of use of functions relevant to a malfunction or is notified of recommendation of degeneration (fall back) of the function. This can reduce an operation that leads to a further malfunction (a secondary malfunction).

Accordingly, the recovery procedure management table is used to distinguish between a user who should be notified of a recovery procedure and a user who is not notified. The degeneration of the function is an emergency measure that maintains a restricted usable state by restricting the function and performance in a case where a mechanism that is ordinarily used does not function normally due to a malfunction.

FIG. 11A and FIG. 11B are views showing user-type specified message generation tables. The user-type-specified message generation tables shown in FIG. 11A and FIG. 11B define messages of solutions (recovery procedures) corresponding to a malfunction of the image forming apparatus 101. These tables are managed by the maintenance management module 704 of the cloud server 103. Moreover, a message about a malfunction is announced by voice through the speaker 310 (a notification step). In this way, the speaker 310 is included in the notification unit that notifies a user of a message in this embodiment. Notification of a message is not limited to the notification by voice. For example, notification with an image is allowable and notification by voice and an image is also allowable.

In the notification system 100, when a malfunction occurs in the image forming apparatus 101, a user who is around the image forming apparatus 101 is detected, and the detected user is prompted by a voice message to cope with the malfunction. However, when a user unfamiliar with this coping is notified of the voice message, the user may lead a secondary malfunction if the user cannot cope with the malfunction appropriately due to unfamiliarity.

Accordingly, a notification content is determined according to a user's role. A general user is not notified of a recovery procedure and is notified that a function is restricted. In the meantime, a recovery procedure is positively given to an administrator user and a service person who are familiar with implementation of the recovery procedure in order to prompt early recovery. The notification is given to the administrative user or the service person when the user has a work to do in the image forming apparatus 101 and intentionally approaches the image forming apparatus 101.

Moreover, the notification is also given to the administrator user or the service person when the user happens to pass by the image forming apparatus 101 and enters the image pickup area of the image pickup apparatus 106. Even if a general user who passes by the image forming apparatus 101 is detected, positive message notification to the general user is restrained unless there is behavior of standing in front of the image forming apparatus 101 and starting an operation.

As shown in FIG. 11A, the user-type specified message generation table includes message contents that depends on the recovery procedures to the malfunctions and that should be given according to the respective roles of the general user, administrator user, and service person. Hereinafter, the notification to the general user is called a "first notification", the notification to the administrator user is called a "second notification", and the notification to the service person is called a "third notification". For example, when the recovery procedure is "Replacement of ITB belt", the general user is notified of a message "PRINT/COPY function is unusable" as the first notification. This can restrain continuous use of the PRINT/COPY function that uses the ITB belt as a replacement target.

Moreover, when the administrator user has an authority level to forcibly restrict use by the general user by degenerating the PRINT/COPY function, it is preferable to prompt degeneration of the function. In this case, the administrator user is notified of a message "Degenerate into SEND function only" as the second notification so as to degenerate to the SEND function that does not relate to the ITB belt. Moreover, when the recovery procedure is the "Replacement of ITB belt", the service person shall be required to perform a recovery operation as mentioned above (see FIG. 10). In this case, the service person is notified of a message "Replace ITB belt" as the third notification.

When the recovery procedure is "Replacement of conveyance roller", since the available user is the service person, the service person is notified of a message "Replace conveyance roller" as the third notification. Moreover, the general user is notified of the message "PRINT/COPY function is unusable" as the first notification, and the administrator user is notified of the message "Degenerate into SEND function only" as the second notification.

When the recovery procedure is "Replacement of waste toner box", the administrator user who is the available user is notified of the message "Replace waste toner box" as the second notification. Moreover, the general user is notified of the message "PRINT/COPY function is unusable" as the first notification. When the recovery procedure is "Replacement of waste toner box", there is no operation by the service person. Accordingly, the third notification to the service person is unnecessary and no message is given. Moreover, when the service person can also perform "Replacement of waste toner box", the third notification may be the "Replace waste toner box" as well as the second notification.

As mentioned above, in the notification system 100, the content of the message can be determined as the first notification, the second notification, or the third notification in accordance with the user type, i.e., the general user, the administrator user, or the service person. Then, the first notification is a notification of use suspension or use restriction of the image forming apparatus 101 due to a malfunction. The second notification is a notification of the function degeneration work of the image forming apparatus 101 for enabling use of the image forming apparatus 101 temporarily also under the malfunction. The third notification is a notification of the recovery operation for resolving the malfunction. According to such a determination of the notification, the notification system 100 can give a message to a person who is highly related to the message, which improves a human interface. In this embodiment, the maintenance management module 704 functions as a storage unit that stores the first notification, second notification, and third notification beforehand.

As shown in FIG. 11B, the user-type specified message generation table includes a message content for calling a person suitable for the recovery operation corresponding to the recovery procedure to a malfunction. Hereinafter, a notification for calling the administrator user when the general user is notified of the first notification is called a "first call notification". A notification for calling the service person where the administrator user is notified of the second notification is called a "second call notification". An available user is not always detected near the image forming apparatus 101 when a malfunction occurs. Accordingly, in this embodiment, when an available use cannot be detected, the message to prompt contact to an available user is given.

Generally, the administrator user can contact the service person, and the general user does not know a contact method in many cases. Accordingly, in this embodiment, when the contact to the service person is needed, the general user is prompted to contact the administrator user. Then, the administrator user sends a correspondence request to the service person in response to the contact from the general user.

As shown in FIG. 11B, when the recovery procedure is "Replacement of ITB belt" and the general user is detected, the general user is notified of a message "Call administrator user" as the first call notification. Thereby, the general user can call the administrator user and can tell "Replacement of ITB belt". Then, the administrator user can request "Replacement of ITB belt" from the service person, and accordingly, the quick recovery of the image forming apparatus 101 becomes possible.

Moreover, when the recovery procedure is "Replacement of ITB belt" and the administrator user is detected, the administrator user is notified of the message "Call service person" as the second call notification. Thereby, the administrator user requests "Replacement of ITB belt" from the service person, and accordingly, the quick recovery of the image forming apparatus 101 becomes possible. Also when the recovery procedure is "Replacement of conveyance roller", the first and second call notifications as with the case of "Replacement of ITB belt" are performed.

Moreover, when the recovery procedure is "Replacement of waste toner box" and the general user is detected, the general user is notified of the message "Call administrator user" as the first call notification. Thereby, the general user can call the administrator user and can request "Replacement of waste toner box", and accordingly, the quick recovery of the image forming apparatus 101 becomes possible. When the recovery procedure is "Replacement of waste toner box" and the administrator user is detected, the second call notification that is the message that prompts contact to the service person is not issued. This is because the administrator user copes with "Replacement of waste toner box" as mentioned above.

As mentioned above, in the notification system 100, when the first notification is given to the general user, the first call notification for calling the administrator user is available and when the second notification is given to the administrator user, the second call notification for calling the service person is available. Thereby, the image forming apparatus 101 becomes usable by recovering promptly.

In this embodiment, the maintenance management module 704 functions as a storage unit that stores the first call notification and the second call notification beforehand. Moreover, when the first notification is issued, the first notification and the first call notification are repeated. When the second notification is issued, the second notification and the second call notification are repeated. Thereby, the recovery operation can be further urged. Moreover, in the notification system 100, issuance and stop of the first call notification and second call notification can be controlled on the basis of the content of the malfunction of the image forming apparatus 101. For example, when the malfunction of the image forming apparatus 101 is a paper jam, the first call notification and second call notification can be stopped because the general user can cope with it.

FIG. 12 is a sequence chart showing a periphery monitoring control process performed between the camera control program 800 and the system control program 700. In this embodiment, the image pickup apparatus 106 monitors a user who is around the image forming apparatus 101 according to an instruction from the system control program 700. The image pickup apparatus 106 picks up an image of the periphery (a monitoring target area) of the image forming apparatus 101 and regularly transmits pickup image data to the system control program 700.

The system control program 700 (the image analysis module 703) conducts image analysis of the pickup image data received from the image pickup apparatus 106. Moreover, the system control program 700 identifies an individual user by comparing the analysis result with the user information held by the user information management module 708. The user information during identification is continuously held as the information about the identified user, while the user is in the image pickup area of the image pickup apparatus 106. In this way, the system control program 700 functions as an obtainment unit that obtains attribute information (role) about an attribute of a person in the image picked up by the image pickup apparatus 106 (an obtainment step).

The attribute information defines that the user picked up in the monitoring target area by the image pickup apparatus 106 is the general user, the administrator user, or the service person. As mentioned above, in the notification system 100, the content of the message can be determined as the first notification, the second notification, or the third notification in accordance with the attribute information (role), i.e., the general user, the administrator user, or the service person. In this way, the system control program 700 functions as a determination unit that determines the content of the message according to the attribute information (role) (a determination step).

As shown in FIG. 12, in a step S101, the system control program 700 transmits an instruction signal to start monitoring of the periphery of the image forming apparatus 101 to the camera control program 800. In a step S102, the camera control program 800 controls the image pickup apparatus 106 to pick up the situation around the image forming apparatus 101 and transmits the pickup image data to the system control program 700 with a predetermined cycle.

In a step S103, the system control program 700 forms an image from the pickup image data received in the step S102 and applies an image analysis process to the image concerned. The image analysis process uses at least one of feature amount extraction algorithms, such as ORB (Oriented FAST and RotatedBRIEF), SURF (Speeded-Up Robust Features), and SIFT (Scale-Invariant Feature Transform). Thereby, the feature amount of the user in the image is extracted correctly and promptly.

In a step S104, the system control program 700 extracts a pattern corresponding to a person detection model from the feature amount extracted in the step S103, and conducts person detection analysis that determines whether there is a characteristic feature considered as a specific user in the pickup image. That is, in the step S104, the attribute information is obtained on the basis of the extraction result in the step S103. Thereby, the user picked up in the monitoring target area by the image pickup apparatus 106 is determined as one of the general user, administrator user, and service person.

In a step S105, the system control program 700 identifies an individual user by comparing the person detection analysis result in the step S104 with the user information held by the user information management module 708. The information about the user identified here is continuously held as the information about the identified user, while the user is in the image pickup area of the image pickup apparatus 106.

Figure 13:
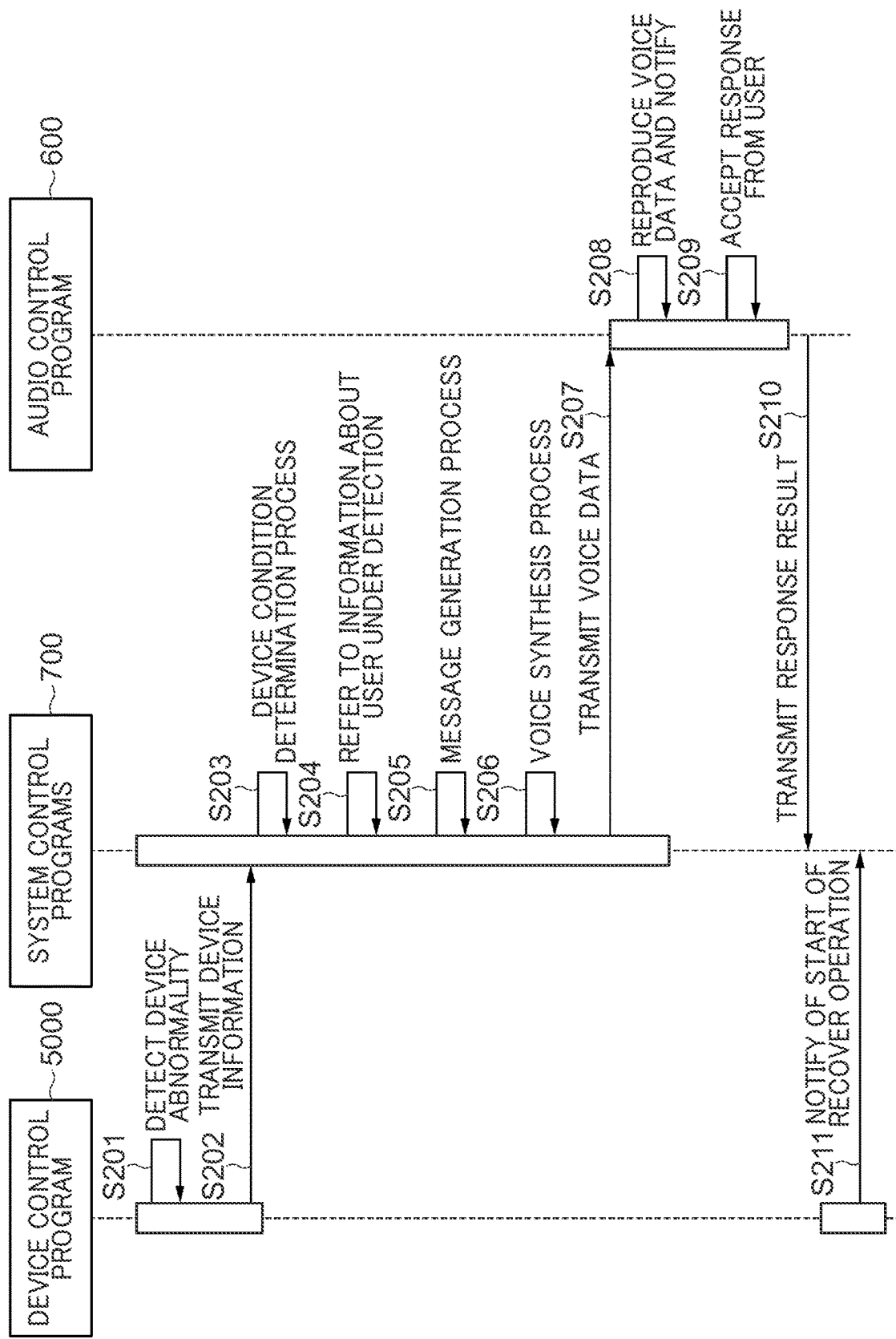
FIG. 13 is a sequence chart showing a process from detection of a device abnormality to voice notification performed among the device control program, the system control program, and the audio control program.

FIG. 13 is a sequence chart showing a process from detection of a device abnormality to voice notification performed among the device control program 5000, the system control program 700, and the audio control program 600. When the device control program 5000 detects an abnormality due to a malfunction of the image forming apparatus 101, the program 5000 transmits the device information together with the malfunction information to the system control program 700. The system control program 700 determines the malfunction type of the image forming apparatus 101 on the basis of the device information received from the device control program 5000.

After that, the system control program 700 extracts the recovery procedure and the available user corresponding to the malfunction type by referring to the maintenance management module 704. Moreover, the system control program 700 determines whether there is a predetermined user around the image forming apparatus 101 by referring to the information about the user under detection by the periphery monitoring control process (FIG. 12).

When determining that there is a user, the system control program 700 generates a notification message to the user and synthesizes voice. The synthesized voice data is transmitted to the audio control program 600. The audio control program 600 reproduces the voice data received from the system control program 700. Thereby, the user is notified of the voice data, i.e., the message.

The audio control program 600 waits for a response from the user for a predetermined period after the voice data is reproduced. When there is the response from the user, the audio control program 600 records the response as voice data and transmits it to the system control program 700. The system control program 700 analyzes the response from the user by the voice recognition module 705 and the morphological analysis module 706.

After that, the device control program 5000 transmits recovery operation status information to the system control program 700, when the restoration operation to the malfunction of the image forming apparatus 101 is performed. The system control program 700 determines whether the recovery operation has been performed by referring to the analysis result of the response from the user and the recovery operation status information. When determining that the recovery operation has not been performed, the system control program 700 again refers to the information about the user under detection, generates a message, synthesizes voice, transmits the voice data to the audio control program 600, and instructs notification.

As shown in FIG. 13, in a step S201, the device control program 5000 detects a state abnormality due to a malfunction of the image forming apparatus 101. In a step S202, the device control programs 5000 transmit the device information about the image forming apparatus 101 including the malfunction information to the system control program 700.

In a step S203, the system control program 700 compares the device information received from the device control program 5000 with the maintenance information managed by the maintenance management module 704 so as to determine the cause of the malfunction of the image forming apparatus 101. Moreover, the system control program 700 extracts the recovery procedure and the available user to the malfunction of the image forming apparatus 101 by referring to the recovery procedure management table (see FIG. 10). In a step S204, the system control program 700 refers to the user information about the user currently detected near the image forming apparatus 101 that the camera control program 800 is monitoring using the image pickup apparatus 106.

In a step S205, the system control program 700 generates a message content that is directed to the user under detection and is suitable for the recovery procedure information about the malfunction that occurs in the image forming apparatus 101 from the user-type specified message generation table (see FIG. 11A). In a step S206, the system control program 700 converts the message content generated in the step S205 into the voice data of a predetermined data format. In a step S207, the system control program 700 transmits the voice data generated in the step S206 to the audio control program 600.

In a step S208, the audio control program 600 reproduces the voice data received from the system control program 700 through the speaker 310. Thereby, the message content is given to the user under detection. In a step S209, the audio control program 600 performs a control process to accept the user response after the message content is given. The audio control program 600 waits for the response of the user to the notification message for the predetermined period. When there is the response from the user, the program 600 records the response as voice data and converts the voice data into a predetermined voice data format. In the meantime, when there is no response from the user within the predetermined period, the audio control program 600 generates blank data that means "no response". In a step S210, the audio control program 600 transmits the voice data generated as the response from the user showing a reaction result or the blank data that means "no response" to the system control program 700.

Moreover, after transmitting the voice data in the step S210, when detecting the recovery operation for resolving the malfunction detected in the step S201, the device control program 5000 notifies the system control program 700 of the start notification of the recovery operation in a step S211. The system control program 700 determines whether this sequence will be repeated again from the step S204 on the basis of the presence of the start notification. The device control program 5000 redoes the sequence from the step S204, when there is no start notification of the recovery operation within the predetermined period from the response receipt in the step S210. Then, the device control program 5000 performs voice notification to the user under detection within the monitoring target area.

Figure 14:
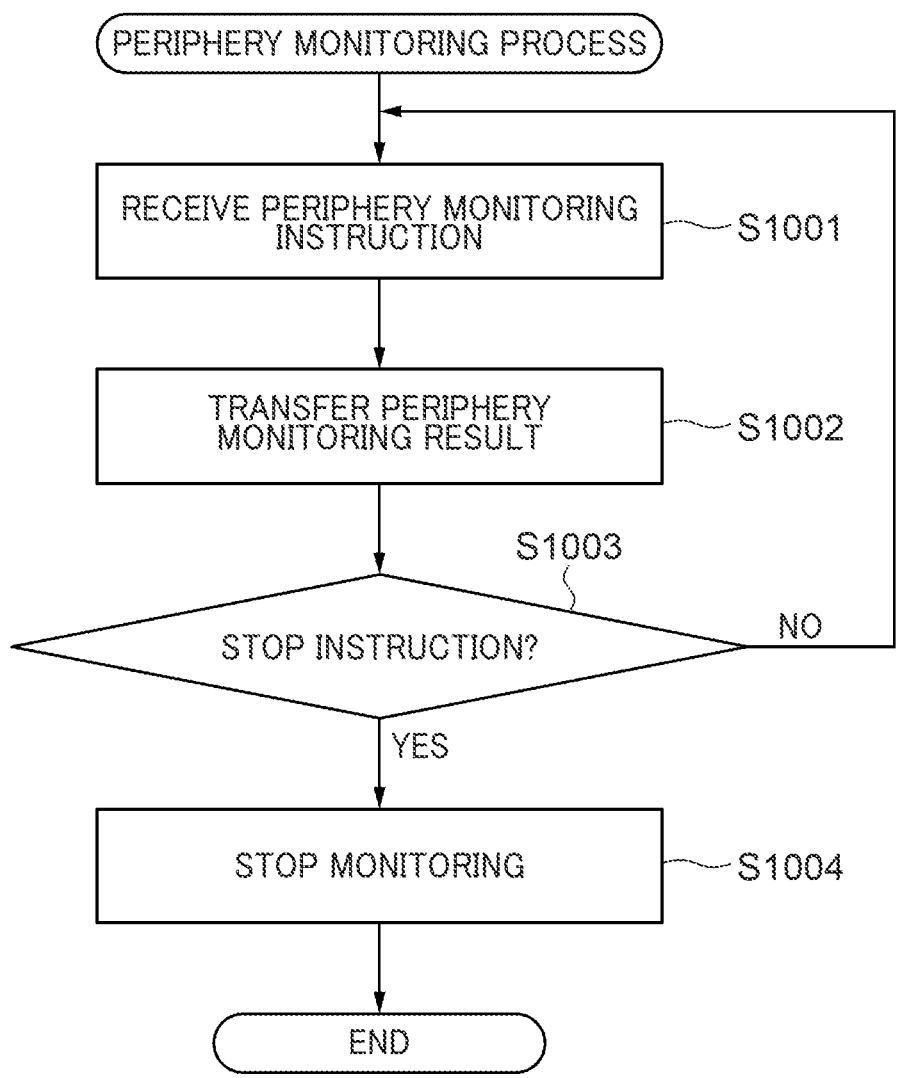
FIG. 14 is a flowchart showing a periphery monitoring process by the camera control program.

FIG. 14 is a flowchart showing a periphery monitoring process by the camera control program 800. The camera control program 800 picks up an image of the monitoring target area around the image forming apparatus 101 according to a monitoring instruction from the system control program 700 and transmits the pickup image concerned to the system control program 700 with a predetermined cycle. The monitoring target area is not limited particularly, for example, it may be a circular area of which radius is 2 to 3 meters around the image forming apparatus 101. Moreover, for example, when the image forming apparatus 101 is arranged in a small room, the entire small room may be the monitoring target area. Moreover, the image pickup process by the camera control program 800 is regularly performed unless receiving the stop instruction from the system control program 700. When the stop instruction is received, the camera control program 800 stops the image pickup promptly and finishes the process.

As shown in FIG. 14, in a step S1001, the CPU 502 receives a monitoring start instruction of the monitoring target area (a periphery monitoring instruction) from the system control program 700. In a step S1002, the CPU 502 starts the image pickup of the monitoring target area and transfers the pickup image to the system control program 700. In a step S1003, the CPU 502 determines whether a stop instruction is received from the system control program 700. When the CPU 502 receives the stop instruction, the process proceeds to a step S1004. In the meantime, when the CPU 502 does not receive the stop instruction, the process is returned to the step S1001 and the following steps are sequentially executed. In the step S1004, the CPU 502 stops picking up an image of the monitoring target area and finishes the process.

Figure 15:
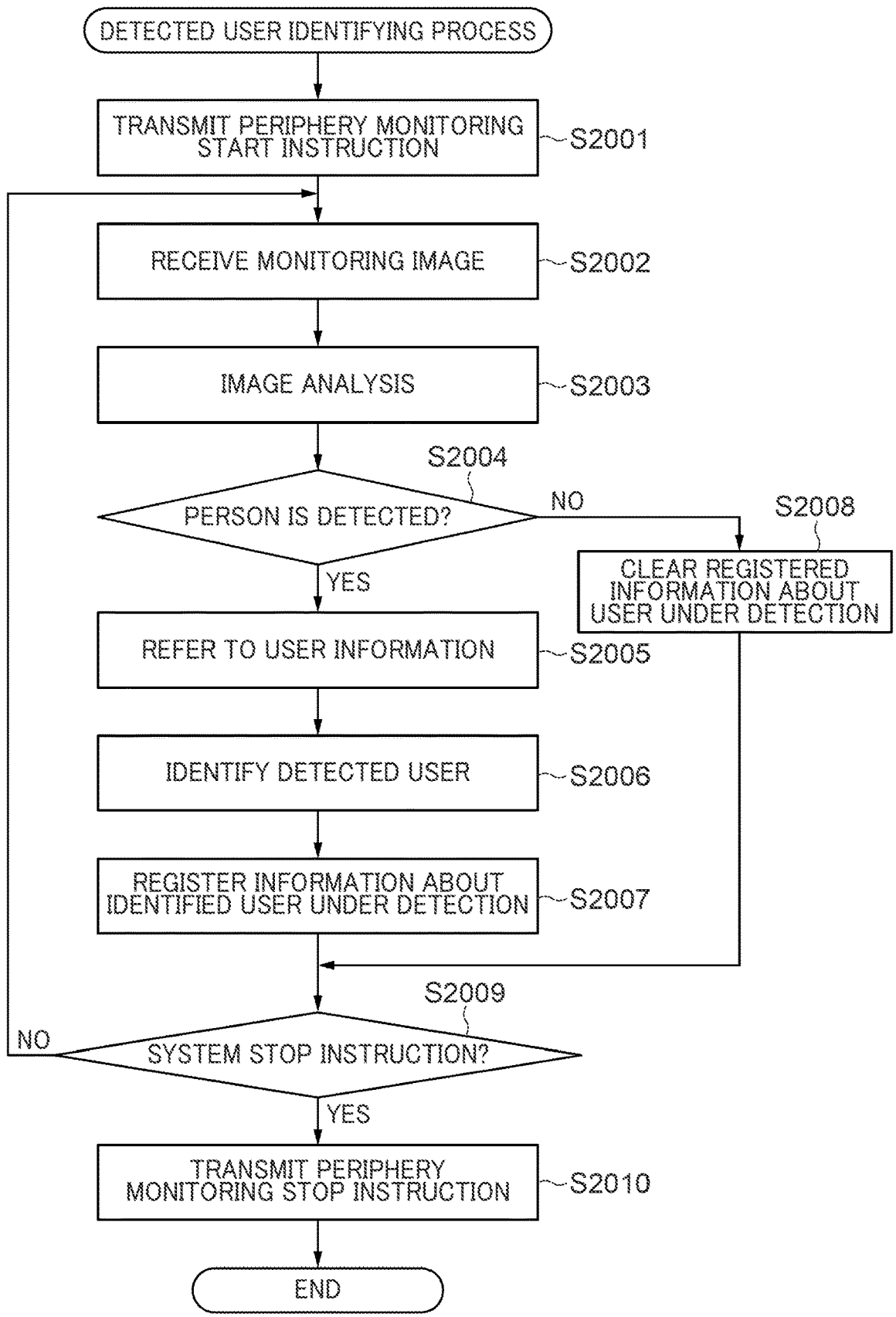
FIG. 15 is a flowchart showing a detected user specifying process by the system control program.

FIG. 15 is a flowchart showing a detected user identifying process by the system control program 700. The system control program 700 analyzes the pickup image received from the camera control program 800, detects a person, identifies a detected user, and registers identified user information. The system control program 700 repeats a detected user identifying process unless receiving the stop instruction from an administrator user of the notification system 100.

Moreover, when a person is not detected, the information about the user under detection that is once registered is cleared. The system control program 700 stops the notification system 100 promptly, when the stop instruction is given from the administrator.

As shown in FIG. 15, in a step S2001, the CPU 402 transmits the monitoring start instruction of the monitoring target area (a periphery monitoring start instruction) to the camera control program 800. In a step S2002, the CPU 402 receives pickup image data (a monitoring image) from the camera control program 800. In a step S2003, the CPU 402 performs the image analysis process to the pickup image data received in the step S2002. At least one of ORB, SURF, and SIFT that are mentioned above is used for this image analysis process. Thereby, the feature amount of the user in the image is extracted.

In a step S2004, the CPU 402 determines whether a feature amount pattern that matches person detection is included in the feature amount extracted in the step S2003. As a result of the determination in the step S2004, when the feature amount pattern is included, i.e., when a person is detected, the process proceeds to a step S2005. In the meantime, as a result of the determination in the step S2004, when the feature amount pattern is not included, i.e., when a person is not detected, the process proceeds to a step S2008.

In the step S2005, the CPU 402 refers to the user information managed by the user information management module 708. In a step S2006, the CPU 402 compares the feature amount of the person detected in the step S2004 with the user information referred in the step S2005, analyzes the characteristic feature, and identifies the person detected in the step S2004 as an individual user. When an individual user cannot be identified, the process is proceeded as "no identified user". In a step S2007, the CPU 402 registers and holds the user information identified in the step S2006 as "Identified user under detection". This user information is continuously held while the person concerned is detected in the monitoring target area.

In the step S2008 after executing the process in the step S2007, the CPU 402 determines that there is no user under detection in the monitoring target area and erases the user information about "Identified user under detection". When there is no "Identified user under detection" in starting the step S2008, the process is proceeded without executing anything particularly.

In a step S2009, the CPU 402 determines whether the administrator user gives the stop instruction of the notification system 100. As a result of the determination in the step S2009, when the CPU 402 determines that the administrator user gives the stop instruction, the process proceeds to a step S2010. In the meantime, as a result of the determination in the step S2009, when the CPU 402 determines that the administrator user does not give the stop instruction, the process returns to the step S2002 and the following steps are executed sequentially.

Figure 16:
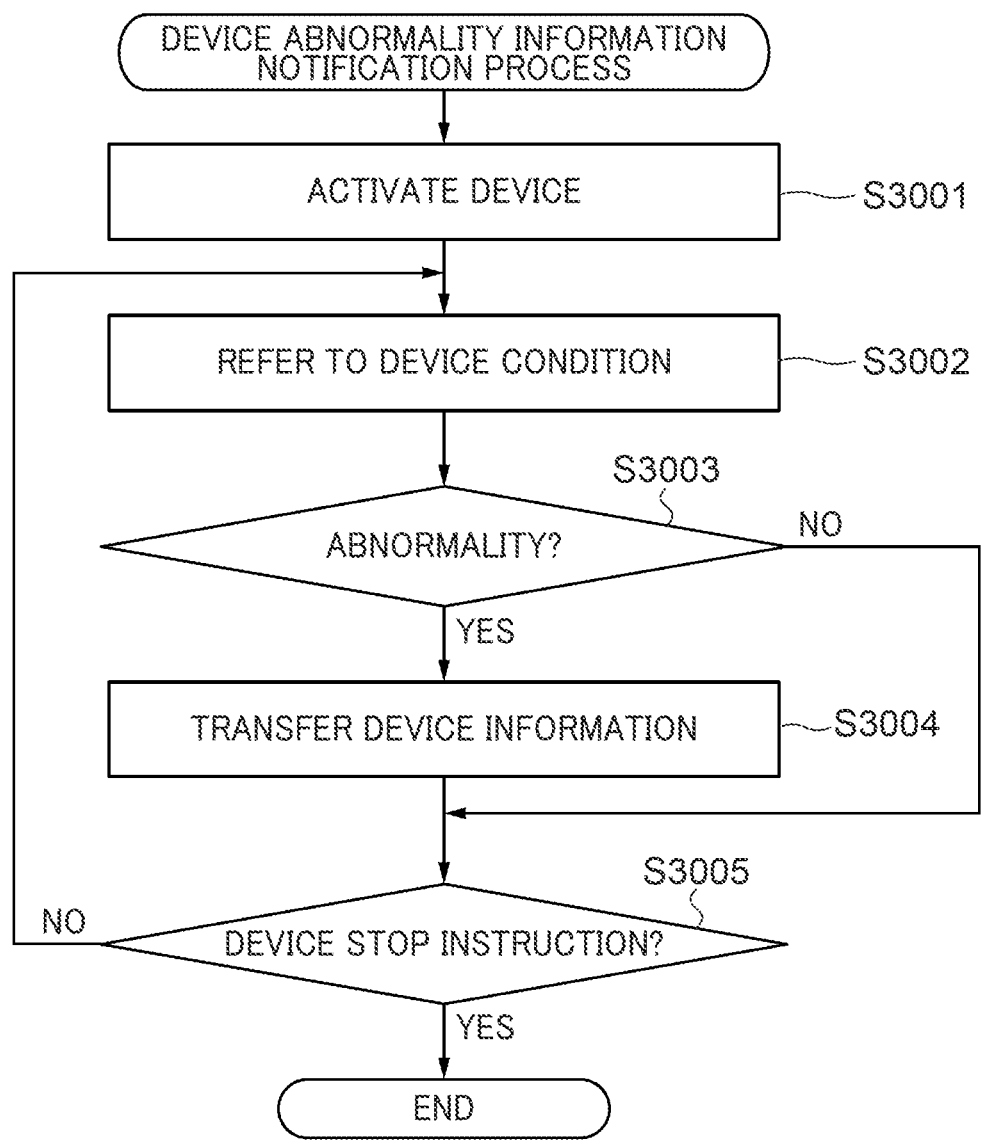
FIG. 16 is a flowchart showing a device abnormality information notification process by the device control program.

FIG. 16 is a flowchart showing a device abnormality information notification process by the device control program 5000. The device control program 5000 regularly monitors the status of the image forming apparatus 101 after starting the image forming apparatus 101. Thereafter, the device control program 5000 continuously monitors the status unless receiving the stop instruction from a user. However, when a state abnormality due to a malfunction is detected, the device control program 5000 transmits the device information about the image forming apparatus 101 together with the malfunction information to the system control program 700.

Moreover, although the device control program 5000 continues the status monitoring even after transmitting the malfunction information and the device information unless receiving the stop instruction from a user, the program 5000 finishes the process promptly when the stop instruction is given from the user by performing a shutdown process. Although it is not shown in the drawing, the notification system 100 transmits the operation information to the system control program 700 as with the step S211 when the recovery operation is received from the available user of the recovery procedure after detecting the state abnormality. Then, recovery control according to the recovery procedure is performed according to a predetermined recovery flow.

As shown in FIG. 16, in a step S3001, the CPU 202 starts the respective devices (for example, a conveyance mechanism that has the ITB belt, the conveyance roller, etc.) that constitute the image forming apparatus 101. In a step S3002, the CPU 202 refers to current states of the respective devices of the image forming apparatus 101. In a step S3003, the CPU 202 determines whether a state abnormality due to a malfunction is occurring in the devices referred in the step S3002. As a result of the determination in the step S3003, when the CPU 202 determines that the state abnormality is occurring, the process proceeds to a step S3004. In the meantime, as a result of the determination in the step S3003, when the CPU 202 determines that a state abnormality is not occurring, the process proceeds to a step S3005.

In a step S3004, the CPU 202 transfers the device information together with the information about the state abnormality due to the malfunction to the system control program 700. Moreover, in the step S3005, the CPU 202 determines whether a device stop instruction is given by a power OFF operation by a user, etc. As a result of the determination in the step S3005, when the CPU 202 determines that the device stop instruction is given, the process is finished. In the meantime, as a result of the determination in the step S3005, when the CPU 202 determines that the device stop instruction is not given, the process returns to the step S3002. and the following steps are executed sequentially.

Figure 17:
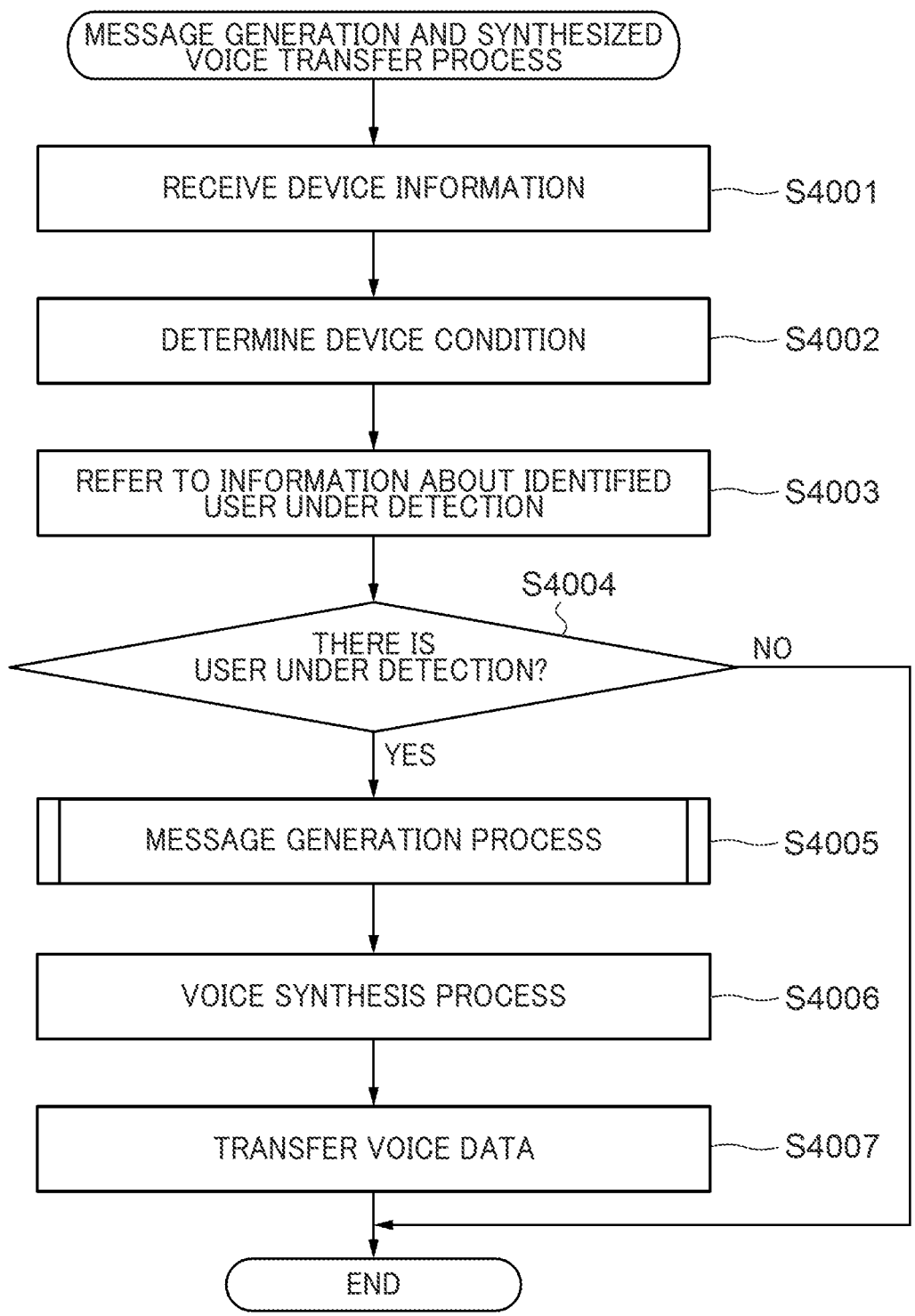
FIG. 17 is a flowchart showing a process that generates a message to a detected user and transfers synthesized voice by the system control program.

FIG. 17 is a flowchart showing a process that generates a message to a detected user and transfers synthesized voice by the system control program 700. When receiving the device information that includes the malfunction information from the device control program 5000, the system control program 700 extracts the recovery procedure corresponding to the malfunction concerned by referring to the maintenance management module 704. After that, the system control program 700 extracts the available user of the recovery procedure.

Moreover, when a predetermined user is in the monitoring target area, the system control program 700 generates a notification message corresponding to the user by referring to the user information about the user who is detecting by the periphery monitoring process of the camera control program 800, and the program 700 synthesizes voice. The synthesized voice data is transmitted to the audio control program 600. It should be noted that this process is started when the device information is transmitted from the device control program 5000.

As shown in FIG. 17, in a step S4001, the CPU 402 receives the device information from the device control program 5000. In a step S4002, the CPU 402 determines a device status from the device information received in the step S4001 and specifies the cause of the malfunction caused in the image forming apparatus 101. In a step S4003, the CPU 402 refers to the user information about "Identified user under detection" who is currently detected in the monitoring target area of the camera control program 800.

In a step S4004, the CPU 402 determines whether there is the "Identified user under detection" referred in the step S4003 is in the monitoring target area. As a result of the determination in the step S4004, when the CPU 402 determines that the "Identified user under detection" is the monitoring target area, the process proceeds to the step S4005. In the meantime, as a result of the determination in the step S4004, when the CPU 402 determines that the "Identified user under detection" is not in the monitoring target area, the process is finished.

In the step S4005, the CPU 402 performs a message generation process that generates a message to the "Identified user under detection" concerning the malfunction information. A content of the message generated in the step S4005 is determined according to the user type of the "Identified user under detection". This will be mentioned later by referring to FIG. 18. In a step S4006, the CPU 402 generates the voice data corresponding to the message content generated in the step S4005 by synthesizing by the predetermined voice data format. In a step S4007, the CPU 402 transfers the voice data generated in the step S4006 to the audio control program 600. And then, the process is finished.

Figure 18:
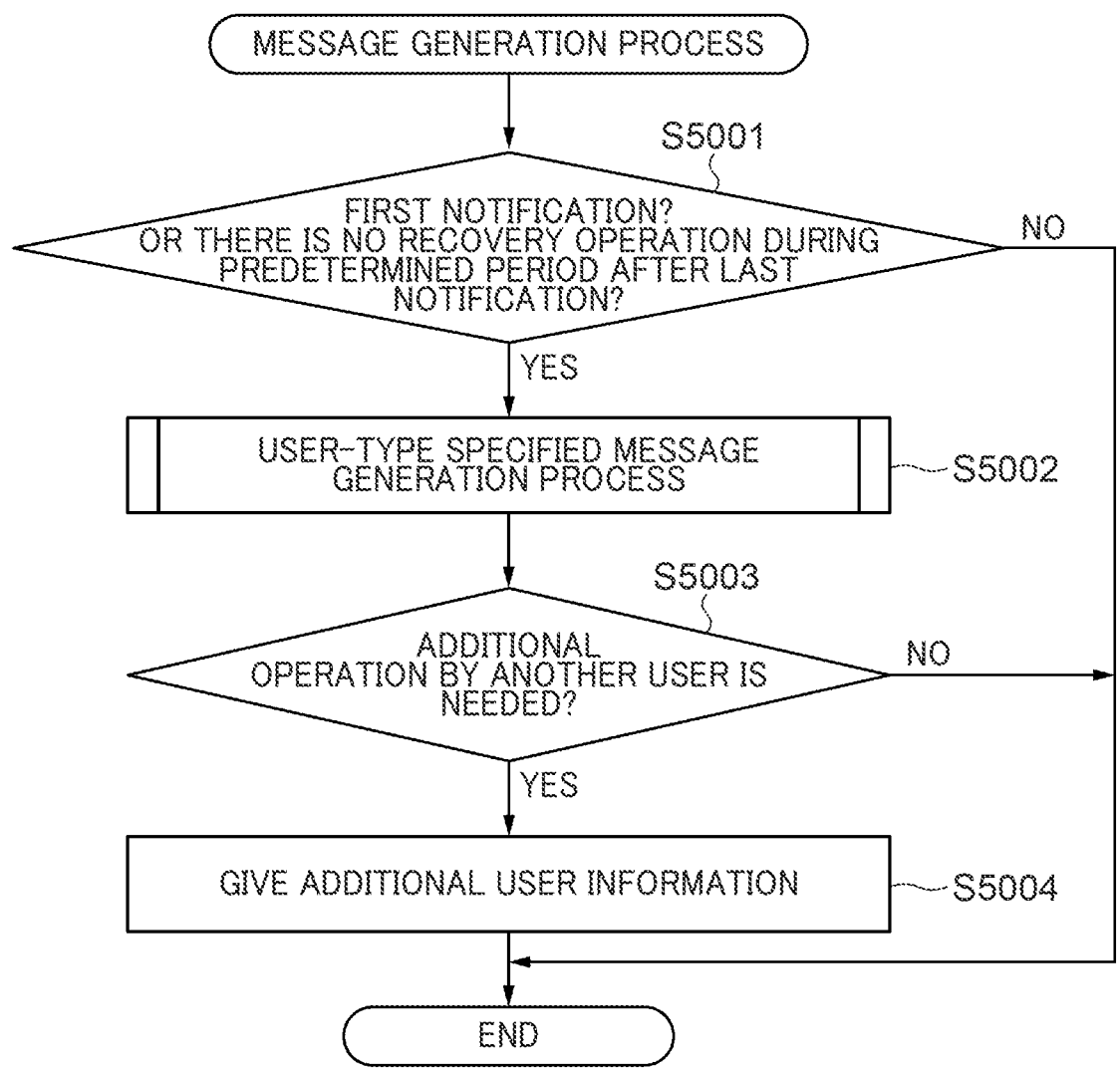
FIG. 18 is a flowchart showing a message generation process executed by the system control program in S4005 in FIG. 17.

FIG. 18 is a flowchart showing the message generation process by the system control program 700. FIG. 18 is the flowchart showing the subroutine in the step S4005 in FIG. 17. As mentioned above, when a malfunction occurs in the image forming apparatus 101, the notification system 100 determines a user type from among the general user, administrator user, and service person, and generates and gives a message corresponding to the determined user type. The system control program 700 extracts a recovery procedure on the basis of the malfunction information received from the device control program 5000 and starts this process after determining that the user under detection is near the image forming apparatus 101.

The system control program 700 compares the malfunction information, the user information about the user under detection, and the user-type specified message generation tables (see FIG. 11A and FIG. 11B). Thereby, the system control program 700 can select and generate the notification message corresponding to the user type of the user under detection from the user-type specified message generation table (see FIG. 11A). When the message notification is not the first time and the predetermined user under detection has been already notified of the notification message, the process from the message generation process (the step S5002) is skipped, i.e., implementation of the message generation is stopped.

Moreover, when a predetermined time period does not elapse after the last message notification, the process from the message generation process (the step S5002) is skipped. In this case, the voice data is not generated by the voice synthesis process in the step S4006 (see FIG. 17) and the step S4007 is also skipped. As a result, implementation of the voice notification from the audio control program 600 is restrained. This prevents the situation where the message is excessively given to the predetermined user who has been already notified of the message whenever the user is detected in the monitoring target area. Moreover, this enables checking of whether the recovery operation is performed in a predetermined period.

As shown in FIG. 18, in a step S5001, the CPU 402 determines whether the predetermined user has not yet been notified of the notification message concerning the malfunction of the image forming apparatus 101 as the detection target even once. Moreover, in addition to the above determination, the CPU 402 determines in the step S5001 whether the recovery operation is not performed to the image forming apparatus 101 during the predetermined time period after the last notification even if the predetermined user has been notified of the notification message. As a result of the determination in the step S5001, when the CPU 402 determines that the current notification is a first message notification (i.e., a message is not given even once) or determines that the recovery operation is not performed during the predetermined time period after the last notification, the process proceeds to a step S5002. In the meantime, as a result of the determination in the step S5001, when the CPU 402 determines the state other than the above state, the process is finished.

In the step S5002, the CPU 402 generates a message corresponding to the malfunction and the user type of the "Identified user under detection" by referring to the user-type specified message generation table (see FIG. 11A). In a step S5003, the CPU 402 determines whether an additional recovery operation by another user is needed to the user type of the "Identified user under detection" by referring to the user-type specified message generation table (see FIG. 11B). As a result of the determination in the step S5003, when the CPU 402 determines that the additional recovery operation by another user is needed (i.e., a contact to another user is required), the process proceeds to a step S5004. As a result of the determination in the step S5003, when the CPU 402 determines that the additional recovery operation by another user is not needed, the process is finished. In the step S5004, the CPU 402 gives a message that prompts a contact to another user registered in the user-type specified message generation table (see FIG. 11B). And then, the process is finished.

Figure 19:
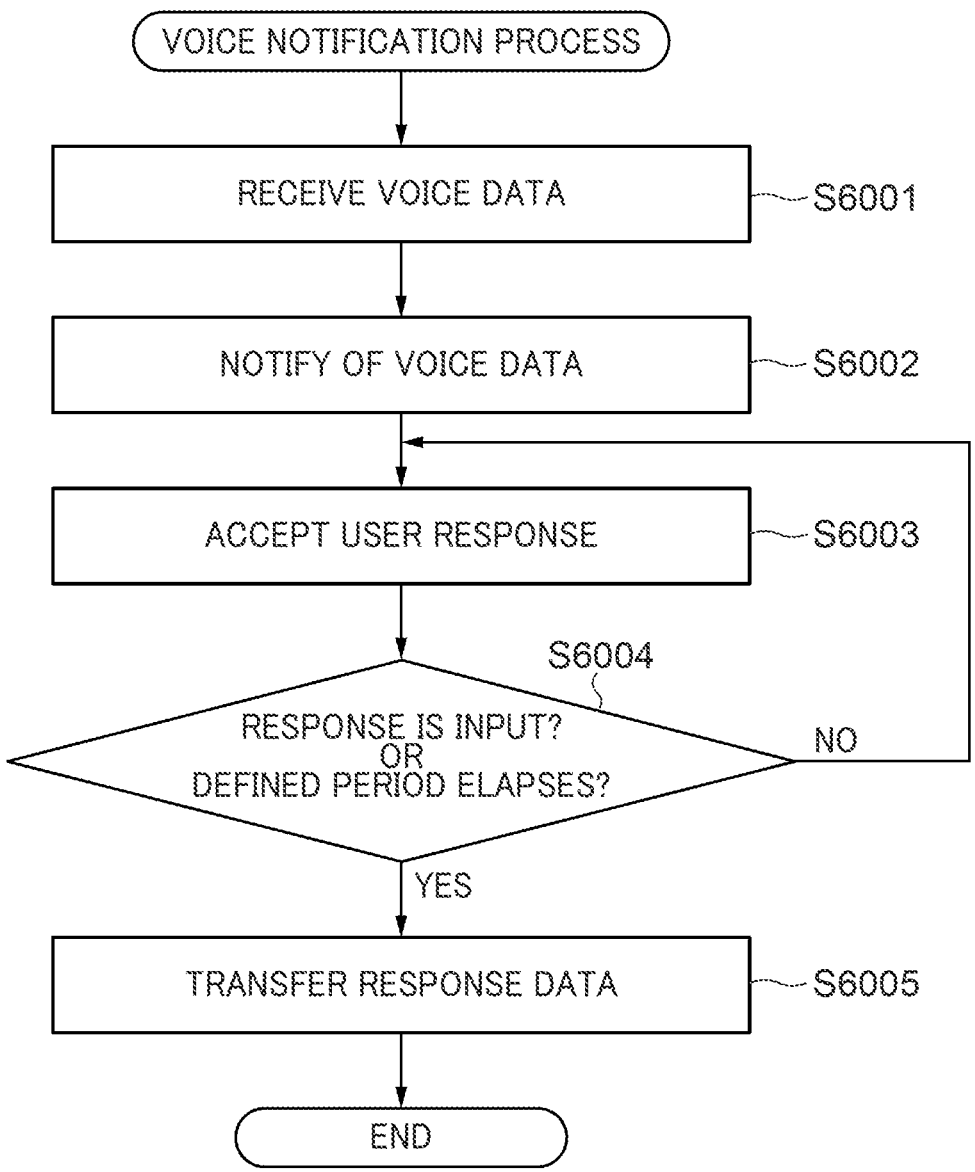
FIG. 19 is a flowchart showing a voice notification process by the audio control program.

FIG. 19 is a flowchart showing a voice notification process by the audio control program 600. The audio control program 600 reproduces the voice data through the speaker 310 when receiving the voice data from the system control program 700. After reproduction of the voice data, a response from a user is waited during a certain period. Moreover, when the response is received from the user, the audio control program 600 converts response data and transmits the converted data to the system control program 700. When no response is received during the certain period, the audio control program 600 transmits blank data to the system control program 700. In this case, it is determined as "no reaction".

As shown in FIG. 19, in a step S6001, the CPU 302 receives the voice data from the device control program 700. In a step S6002, the CPU 302 reproduces the voice data received in the step S6001 through the speaker 310. Thereby, a target user is notified an object user is notified of a message content. In a step S6003, the CPU 302 accepts the response from the user to the message given in the step S6001. In this step, the CPU 302 waits for a response from the user during a defined period and records voice from the user through the microphone 308. In a step S6004, the CPU 302 determines whether the response as a reaction of the user is input or whether the defined period elapses.

As a result of the determination in the step S6004, when the CPU 302 determine that there is a reaction or the definite period elapses, the process proceeds to a step S6005. In the meantime, as a result of the determination in the step S6004, when the CPU 302 determines the state other than the above state, the process returns to the step S6003 and the following steps will be sequentially executed. In the step S6005, the CPU 302 converts the voice data recorded in the step S6003 into the predetermined voice data format and transfers the converted data to the system control program 700. When no reaction is input and the defined period elapses to be timeout in the step S6004, the CPU 302 generates blank data as the information of "no reaction" and transmit it.

Figure 20A:
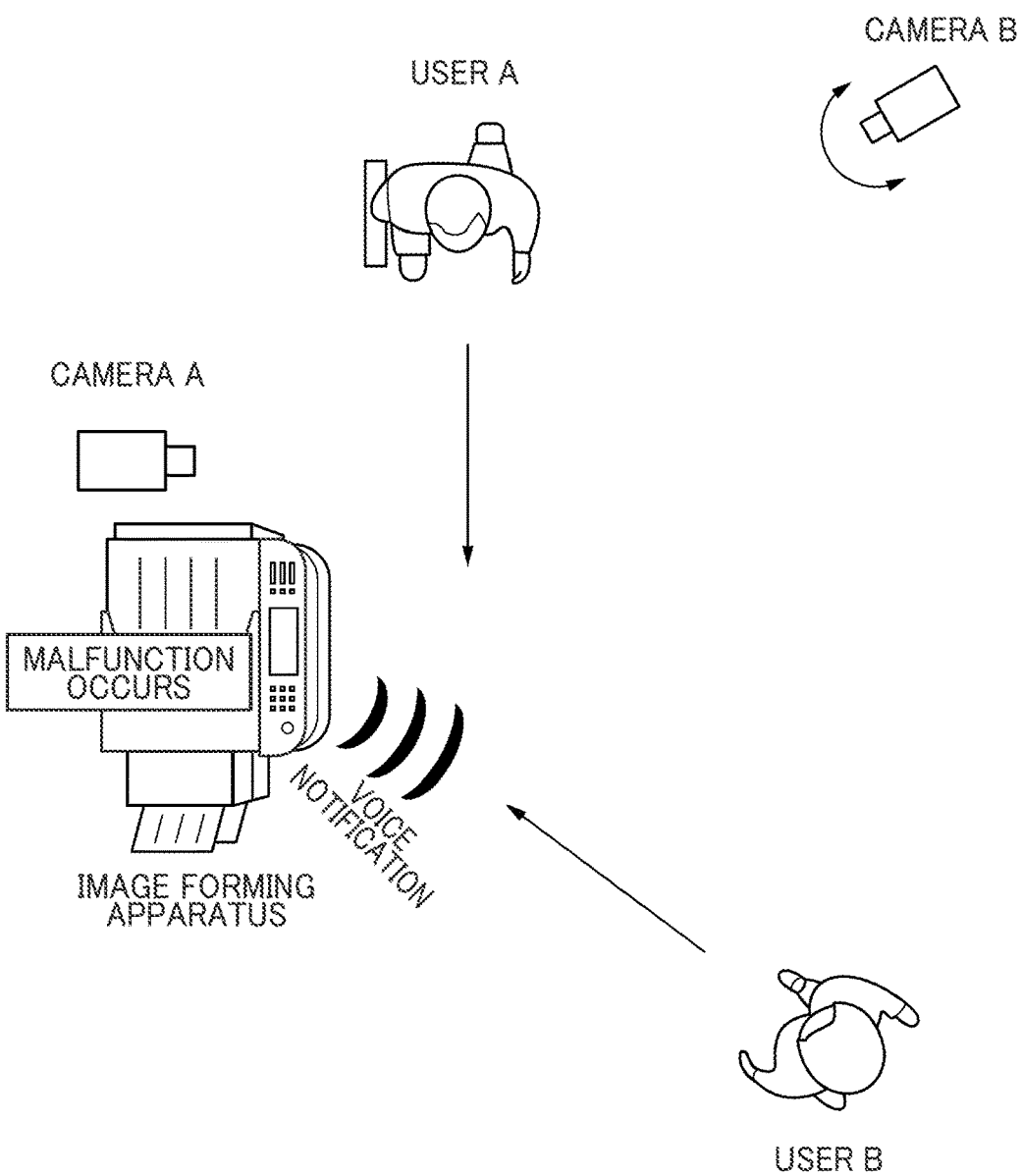
FIG. 20A is an overhead view showing an arrangement example of the image forming apparatus, the image pickup apparatus, and users who are monitoring targets.
Figure 20B:
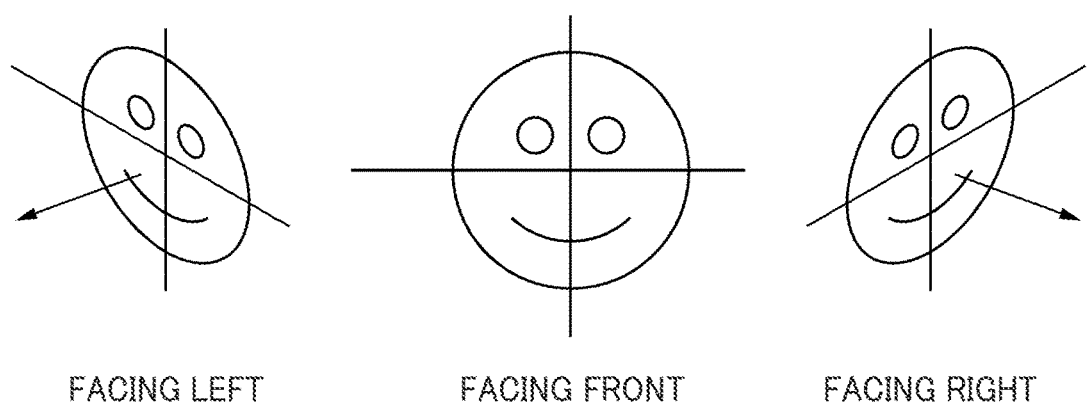
FIG. 20B is a view describing face authentication.

FIG. 20A is an overhead view showing an arrangement example of the image forming apparatus 101, the image pickup apparatus 106, and users who are monitoring targets. FIG. 20B is a view describing face authentication. FIG. 20C through FIG. 20F are overhead views respectively showing arrangement examples of the image forming apparatus 101, the image pickup apparatus 106, and users who are monitoring targets. In the notification system 100 of this embodiment, when a malfunction of the image forming apparatus 101 occurs, users in the monitoring target area are detected and a message corresponding to the user type (role) is given. The regular user is not notified of a procedure for resolving the malfunction.

However, the notification system 100 is preferable to regulate an operation by notifying a general user that the function is restricted due to the malfunction when the general user tries to operate the image forming apparatus 101. Accordingly, it is preferable not to notify a passing user of a message positively when the user detected does not linearly approach the installation position of the image forming apparatus 101 like a user A in FIG. 20A. In the meantime, it is preferable to restrain an excessive operation of a user who linearly approaches the installation position of the image forming apparatus 101 like a user B in FIG. 20A by giving a message positively.

For example, how to determine whether a user linearly approaches the image forming apparatus 101 is mentioned as follows according to the installation position of the image pickup apparatus 106. However, it is not limited to them. As shown in FIG. 20A, when a camera A is installed in the almost same position and orientation as the image forming apparatus 101, a user who approaches so as to face the front orientation of the camera A can be determined as a user who linearly approaches the image forming apparatus 101. This determination becomes available by face authentication. As shown in FIG. 20B, in the face authentication, a face direction (front, left, or right) of a user with respect to the camera A is determined from a positional relationship between eyes, a nose, and a mouth that are extracted as feature points for the face authentication. When it is determined that a user is approaching for a certain period so as to face the front of the camera A, it is determined that a target user is linearly approaching the image forming apparatus 101, and a message is given.

In the meantime, when a camera B is installed in a position other than the image forming apparatus 101, it is determined whether a user linearly approaches on the basis of relation between the installation position of the image forming apparatus 101, a user's position, and a user's moving direction. Since a user A moves in a direction different from a straight line that connects the position of the user A and the installation position of the image forming apparatus 101, it is not determined that the user A approaches the image forming apparatus 101 linearly. Since a user B moves to the image forming apparatus 101 on the straight line that connects the position of the user B and the installation position of the image forming apparatus 101, it is determined that the user B approaches the image forming apparatus 101 linearly.

Moreover, the notification system 100 can also judge whether a message is given according to a user's moving direction. That is, the notification system 100 may judge necessity of massage notification by determining whether a user approaches the image forming apparatus 101 or passes near the image forming apparatus 101. This judgement is performed by the controller unit 400 (the CPU 402) of the cloud server 103 as a judgement unit, for example. When a user detected in the monitoring target area is the administrator user or the service person, even if the user is in a passing state, a message is given positively to prompt degeneration of a function or replacement of a component against a malfunction.

Figure 20C:
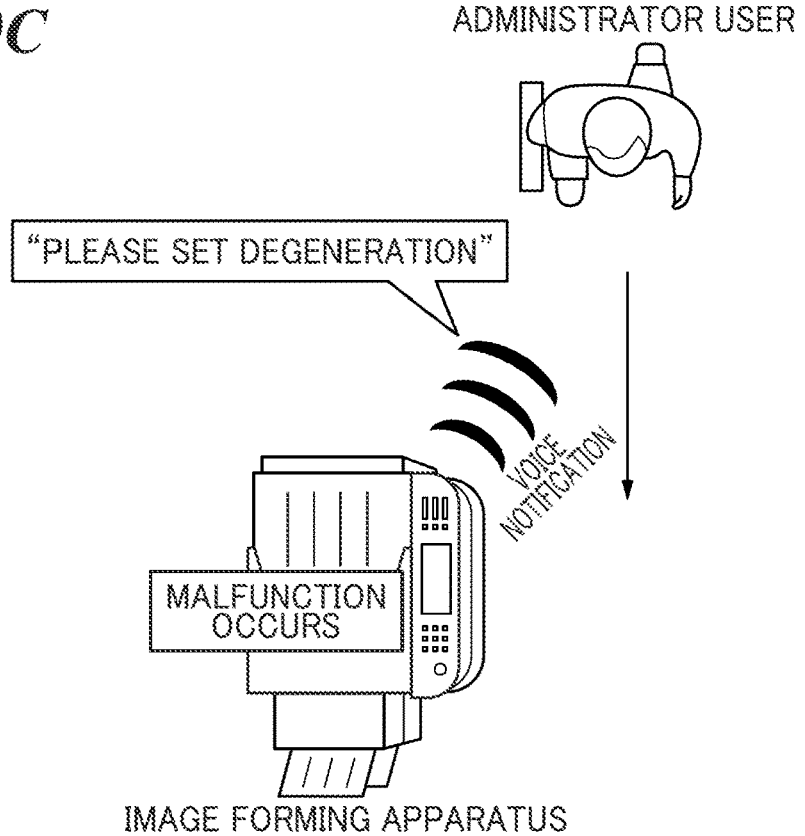
FIG. 20C is an overhead view showing an arrangement example of the image forming apparatus, the image pickup apparatus, and a user who is a monitoring target.
Figure 20D:
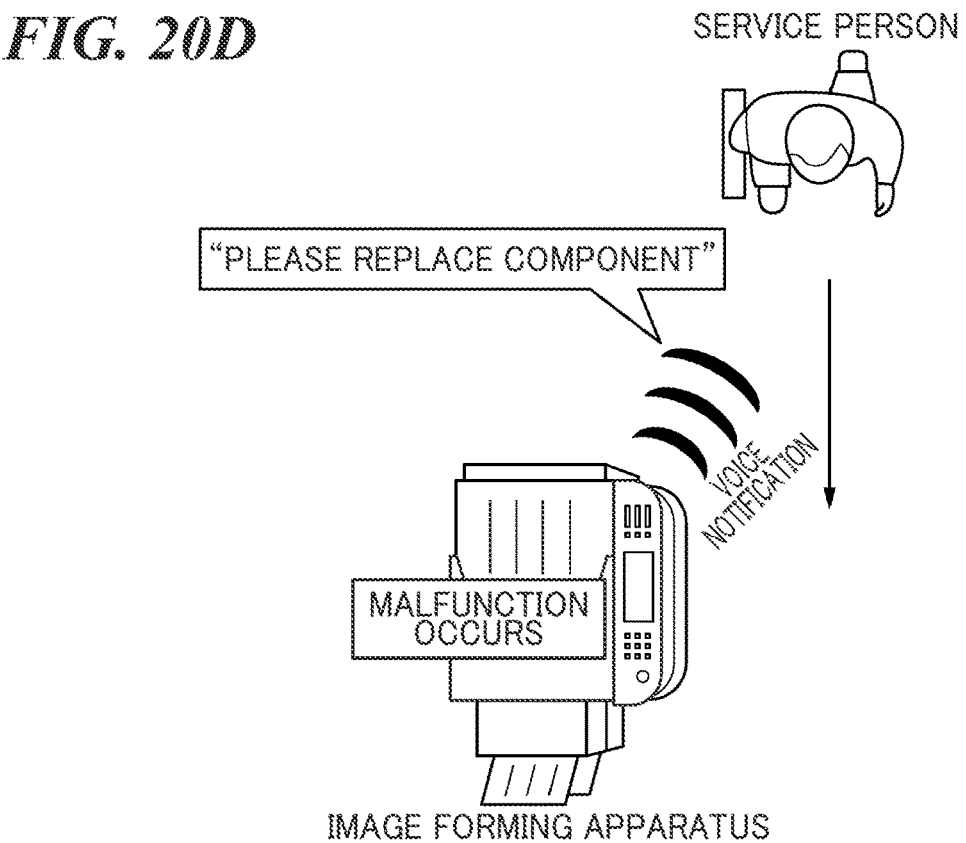
FIG. 20D is an overhead view showing an arrangement example of the image forming apparatus, the image pickup apparatus, and a user who is a monitoring target.

FIG. 20C shows a situation where the message is given positively so as to prompt a degeneration setting (a degeneration operation) when an administrator user is detected as a passing user. FIG. 20D shows a situation where the message is given positively so as to prompt replacement of a component when a service person is detected as a passing user.

Figure 20E:
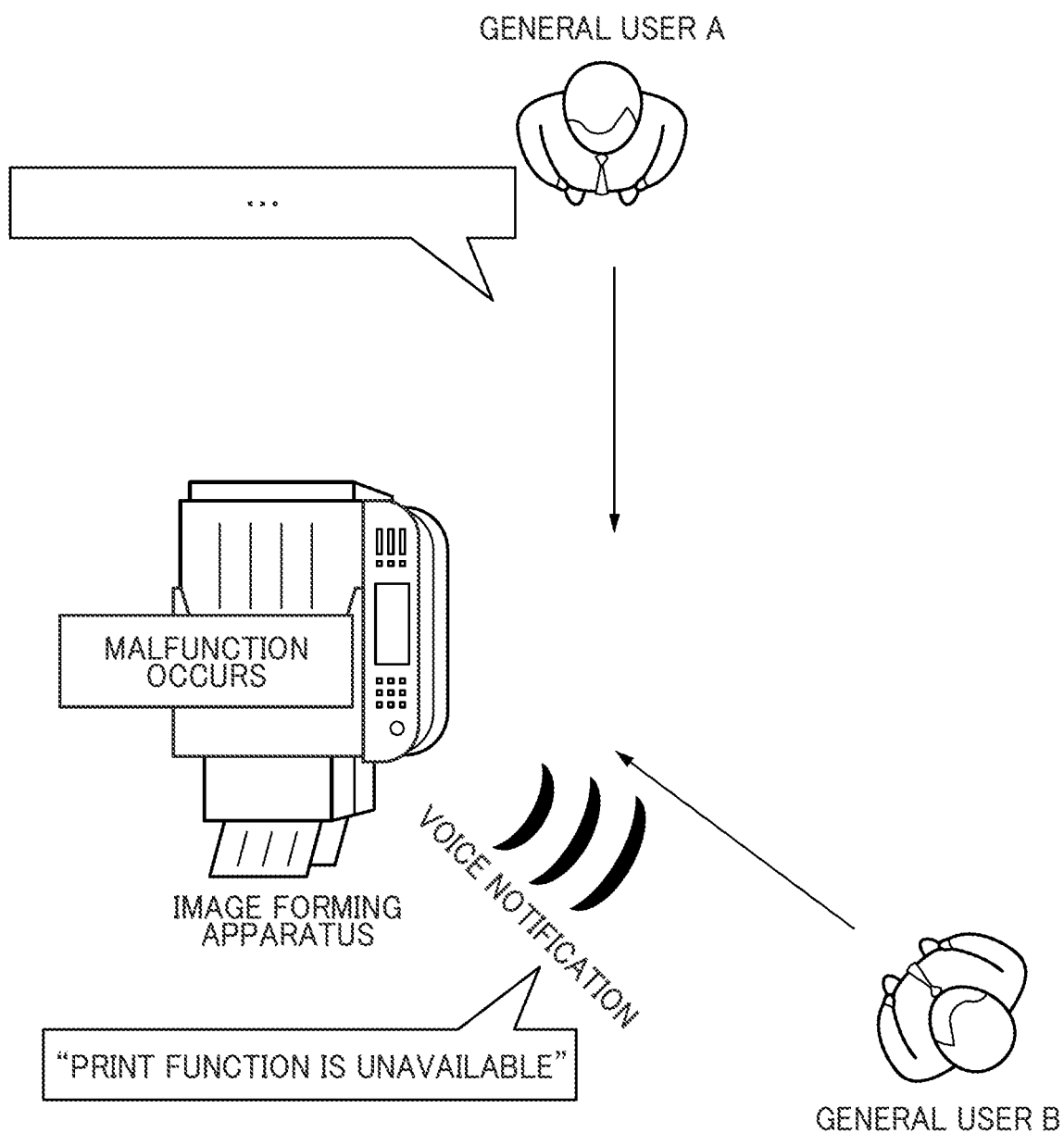
FIG. 20E is an overhead view showing an arrangement example of the image forming apparatus, the image pickup apparatus, and users who are monitoring targets.

In the meantime, positive message notification to a passing general user is restrained because the notification about degeneration of a function and replacement of a component may cause a new malfunction due to an excessive operation. It is preferable that a general user is notified of information about a restricted function as a message only when the general user approaches the image forming apparatus 101 to use it. FIG. 20E shows a situation where no message is given to a general user A who is passing near the image forming apparatus 101 and a message about a restricted function is given to a general user B who approaches the image forming apparatus 101.

Figure 20F:
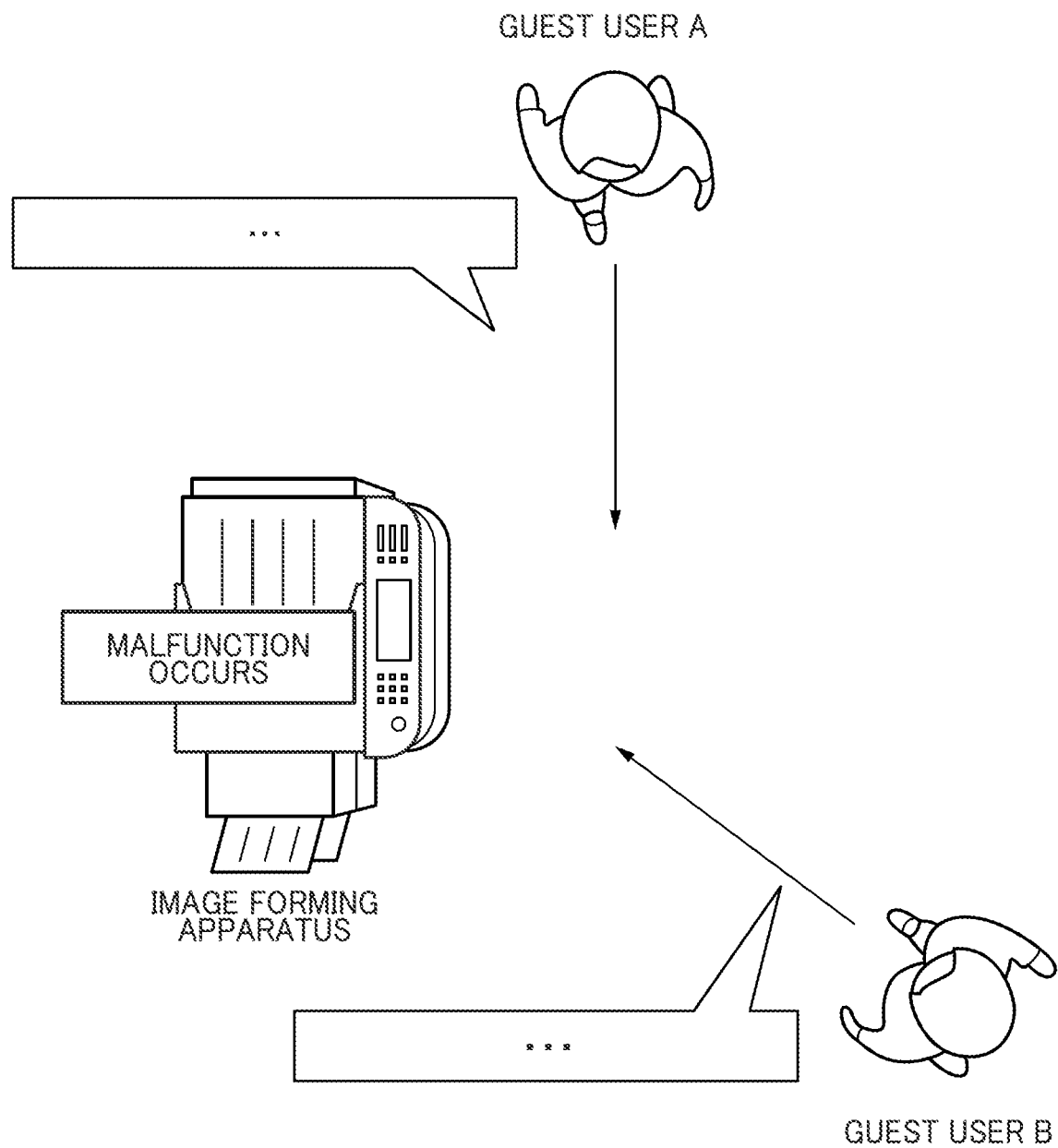
FIG. 20F is an overhead view showing an arrangement example of the image forming apparatus, the image pickup apparatus, and users who are monitoring targets.

Furthermore, a guest user who is not a user in a company and cannot be individually identified is a user type that does not have the authority to operate the image forming apparatus 101. In this case, it is preferable that a guest user is not notified of a message in not only a case where the guest user passes near the image forming apparatus 101 but also a case where the guest user approaches the image forming apparatus 101. FIG. 20F shows a situation where the message is not given to a guest user A who is passing near the image forming apparatus 101 and a guest user B who approaches the image forming apparatus 101. That is, the positive message notification is restrained.

Figure 21:
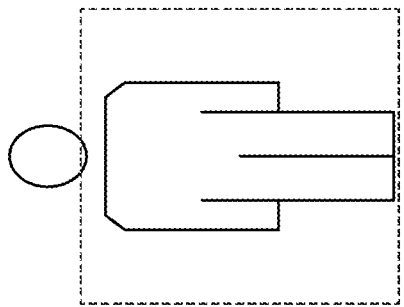
FIG. 21 is a view showing examples of characteristic features used in determining a user type from an image picked up by the image pickup apparatus.

FIG. 21 is a view showing examples of characteristic features used in determining a user type from an image picked up by the image pickup apparatus 106. Although messages about a malfunction are given to many and unspecified users detected in the monitoring target area in the notification system 100, the contents of the messages differ according to the user type. Here, a clothing, an accessory, etc. that a user wears are detected and the user type is determined using the detection result without using the face authentication.

As shown in FIG. 21, a clothing is detected from an area other than a user's face part. When the clothing as the detection result includes a necktie or a predetermined employee ID card, a target user is determined as the general user. Moreover, when the clothing is a suit, the target user is determined as the administrator user. When the clothing is a predetermined working wear, the target user is determined as the service person. Moreover, when the clothing is other than them, the target user is determined as the guest user. The user type determination is not limited to the above-mentioned configuration. For example, when an environment includes a user account management unit that manages a user type for each personal user, a message content can be determined according to a user type extracted in relation to a personal user identified using the face authentication.

Figure 22:
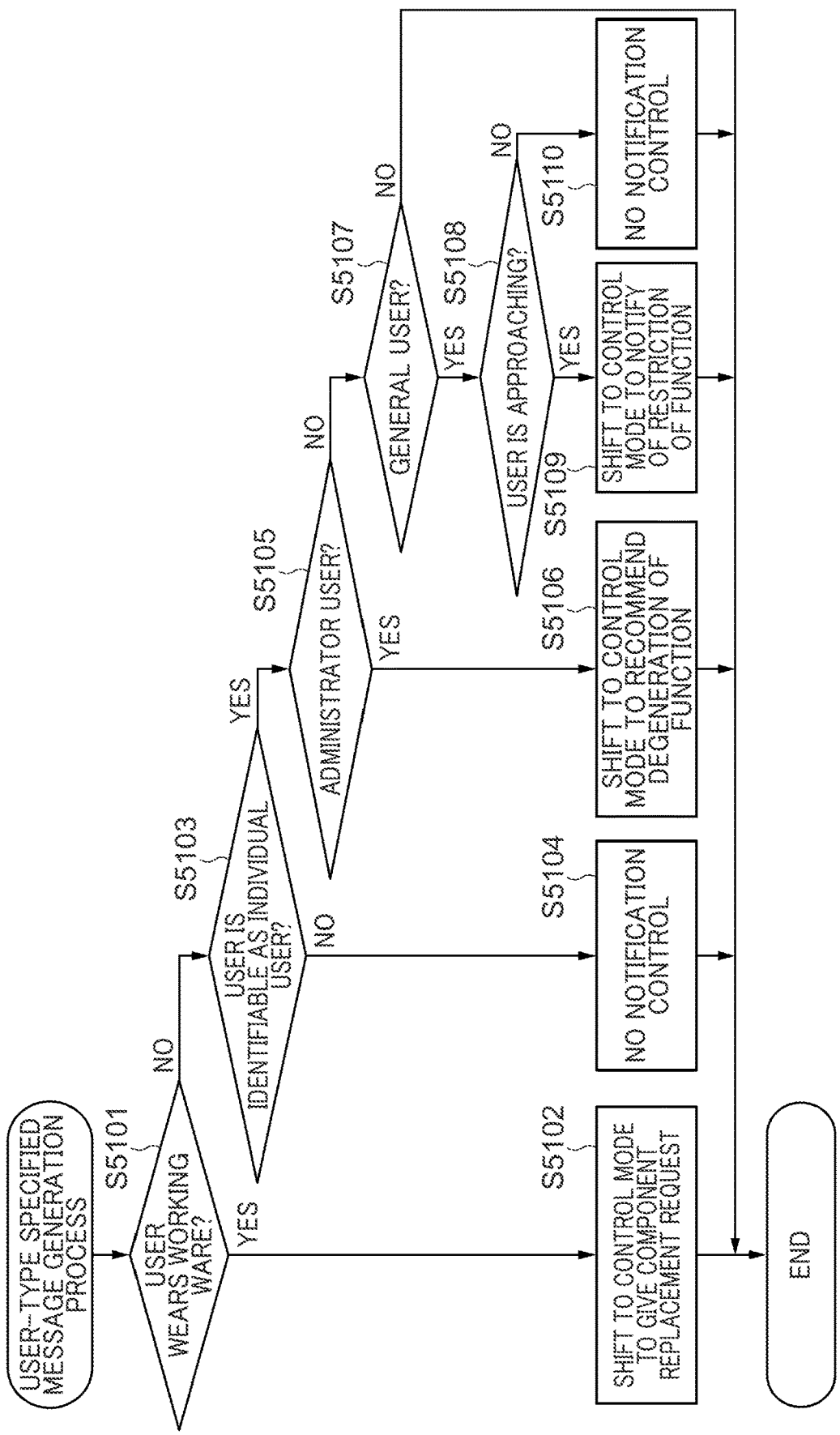
FIG. 22 is a flowchart showing a user-type specified message generation process executed in S5002 in FIG. 18.

FIG. 22 is a flowchart showing a user-type specified message generation process. FIG. 22 is the flowchart showing the subroutine in the step S5002 in FIG. 18. As mentioned above, in the notification system 100, a message content that should be given is determined according to the user type by referring to the user-type specified message generation tables (see FIG. 11A and FIG. 11B), and message notification is controlled.

Furthermore, the notification system 100 determines necessity of massage notification by detecting whether the user approaches the image forming apparatus 101 or passes near the image forming apparatus 101. When the user detected in the monitoring target area is the service person or the administrator user, the message is given positively even if the user is in the passing state.

Moreover, when the user detected in the monitoring target area is the general user or the guest user, the message notification is not given when the user concerned is in the passing state. When the general user may cause a further malfunction by trying to use the function relevant to the malfunction, the message showing the information about the restricted function is given to the general user only when the general user approaches the image forming apparatus 101.

As shown in FIG. 22, in a step S5101, the CPU 402 determines whether the characteristic feature of the clothing of the user of the detection target matches the characteristic feature of the working wear of the service person. As a result of the determination in the step S5101, when the CPU 402 determines that it matches the characteristic feature of the working ware of the service person, the process proceeds to a step S5102. In the meantime, as a result of the determination in the step S5101, when the CPU 402 determines that it does not match the working ware of the service persona, the process proceeds to a step S5103. In the step S5102, the CPU 402 determines that the user of the detection target is the service person and shifts to a control mode that generates a message of a component replacement request by referring to the user-type specified message generation tables and gives the message.

In the step S5103, the CPU 402 determines whether the user of the detection target can be identified as an individual user. As a result of the determination in the step S5103, when the CPU 402 determines that the user can be identified as an individual user, the process proceeds to a step S5105. In the meantime, as a result of the determination in the step S5103, when the CPU 402 determines that the user cannot be identified as an individual user, the process proceeds to the step S5104. In the step S5104, the CPU 402 determines that the user of the detection target shall be the guest user and shifts to a control mode that does not give any message. It should be noted that the step S5104 may not be established as a control step.

In the step S5105, the CPU 402 identifies the user of the detection target as an individual user and determines whether the user is the administrator user. As a result of the determination in the step S5105, when the CPU 402 determines that the user is the administrator user, the process proceeds to a step S5106. In the meantime, as a result of the determination in the step S5105, when the CPU 402 determines that the user is not the administrator user, the process proceeds to a step S5107. In the step S5106, the CPU 402 generates a message that recommends degenerating the function that cannot be used due to the malfunction by referring to the user-type specified message generation tables, and shifts to a control mode that gives the message.

In the step S5107, the CPU 402 identifies the user of the detection target as an individual user and determines whether the user is the general user. As a result of the determination in the step S5107, when the CPU 402 determines that the user is the general user, the process proceeds to a step S5108. In the meantime, as a result of the determination in the step S5107, when the CPU 402 determines that the user is not the general user, the CPU 402 performs error determination because the user of the detection target is an unfixed user who is not even the guest user, and finishes the process without generating a message.

In the step S5108, the CPU 402 determines whether the general user who is identified as an individual user is approaching the image forming apparatus 101. As a result of the determination in the step S5108, when the CPU 402 determines that the general user is approaching, the process proceeds to a step S5109.

In the meantime, as a result of the determination in the step S5108, when the CPU 402 determines that the general user is not approaching, the process proceeds to a step S5110. In the step S5109, the CPU 402 shifts to a control mode that generates the message that notifies that the function is restricted due to the malfunction by referring to the user-type specified message generation tables and gives the message. In the step S5110, the CPU 402 does not generate any message and shifts to the control mode that does not give any message as well as the step S5104. It should be noted that the step S5110 may not be established as a control step.

As described above, presence of a user who approaches the image forming apparatus is monitored by the image pickup apparatus 106 in the notification system 100. Then, when a user is detected, image data of the user is transmitted to the cloud server 103, and identification of the user is performed. Moreover, when a malfunction occurs in the image forming apparatus 101, the device information is transferred to the cloud server 103 at the timing in detecting the malfunction, and the cause is specified and a recovery procedure is referred.

Moreover, a suitable message is generated internally according to the specified user type and the user is notified of the message. When an additional recovery operation by another user is needed, the information about the recovery operation is also given with the message. Moreover, in this notification process, the message is not necessarily given every time when the user is detected. When the message has been already given even once, it is checked whether the recovery operation is performed in a predetermined period. When the recovery operation is not performed during the predetermined period, it is controlled to give the message again. Namely, when the attribute information is not changed, the notification of the message and the suspension of the notification are repeated for the predetermined period.

This enables notification of the message concerning the malfunction according to the user type while restraining excessive notification, which prevents occurrence of a further malfunction. Moreover, a recovery operation is prompted to a suitable user only. In the notification system 100, whenever the attribute information is changed, the content of the message is redetermined. Thereby, the message suitable for the attribute information can be given.

Although the approach of the user to the vicinity of the image forming apparatus 101 is detected on the basis of the pickup image of the image pickup apparatus 106 in this embodiment, it is not limited to this. For example, a short distance communication means (BLE (Bluetooth Low Energy) etc.) that can detect that a user approaches the vicinity of the image forming apparatus 101 may be employed. Although the cloud server 103 holds the user information and determines a user in this embodiment, it is not limited to this. For example, the image forming apparatus 101 may hold the user information. In such a case, the cloud server 103 determines a user on the basis of the user information and the device information that are obtained from the image forming apparatus 101 at the time of occurrence of the malfunction.

Moreover, a means that suspends the message notification is not limited, for example, a manual operation button for suspension of the message notification may be provided. In addition, the message notification may be suspended when the times of the message notification reaches a prescribed number. In this case, the prescribed number may be changed according to the user type (a general user, an administrator user, and a service person). Moreover, the message notification may be suspended when the user goes out from the monitoring target area. Moreover, the message notification may be suspended when the recovery operation for restoring the image forming apparatus 101 is completed. When the recovery operation for restoring the image forming apparatus 101 is not performed after the predetermined period elapses, the message notification according to the user type of the detected user may be repeated.

Moreover, although the notification system 100 is constituted so that the attribute information about the attribute of the user (person) in the image will be obtained on the basis of the image picked up by the image pickup apparatus 106 in this embodiment, it is not limited to this configuration. For example, when an IC tag is inserted in an employee ID card, a user is detected by receiving a signal from the IC tag by a reception unit (a detection unit), and attribute information about attribute of the user may be obtained on the basis of the detection result.

Next, a notification system according to a second embodiment of the present invention will be described. In the second embodiment, a user is identified by the face authentication and a content of a message is determined on the basis of user's roles (authority and affiliation) registered. Hereinafter, the descriptions about the configurations and processes that are common to that of the first embodiment will be omitted and only the different parts will be described.

The entire configuration of the notification system 100, the hardware configurations of the image forming apparatus 101, audio control apparatus 102, image pickup apparatus 106, and cloud server 103 are identical to the configurations shown in FIG. 1 through FIG. 5.

It should be noted that the cloud server 103 can determine words in connection with screen operations and job executions of the image forming apparatus 101 from a voice recognition result in the audio control apparatus 102. A "job" is an executable unit of a series of image forming processes (for example, a copy, a scan, a print, etc.) that the image forming apparatus 101 achieves using the print engine 211 or the scanner 213. Moreover, the cloud server 103 generates a predetermined message (text) according to a voice recognition result or a determination result of the words, and synthesizes voice data for reproducing the message content by the audio control apparatus 102.

A person shall be classified to one of two user types including a general user (a user) and an administrator user (an administrator) in this embodiment. It should be noted that a service person and a guest user may be also included as the user types. The guest user is a visitor person etc. who is prohibited to use the image forming apparatus 101 in principle.

The software configuration of the image forming apparatus 101 is the same as the configuration shown in FIG. 6. That is, the data transmission/reception module 5001 transmits/receives data to/from other devices on the network 104 through the network I/F 206 by TCP/IP. The data transmission/reception module 5001 receives device operation data that the cloud server 103 generates. Moreover, in this embodiment, the data transmission/reception module 5001 transmits a job execution result, screen update notification showing that a screen display content of a response of a device operation result, and job execution state notification showing a state of a job to the cloud server 103. The contents of the notification will be described later by referring to a sequence chart shown in FIG. 24.

The data management module 5004 stores various data, such as work data generated by executing the device control program 5000, setting parameters required for controlling various devices, and various operation histories by users, to predetermined areas of the RAM 203 and the storage unit 205, and manages these data. In addition, such data include job data that consist of combinations of setting items and setting values of jobs that are executed by the job control module 5003, and language settings as information about languages displayed on the operation panel 209.

Moreover, the data management module 5004 stores and manages authentication information required for communication with the gateway 105 and device information required for communication with the cloud server 103 etc. Moreover, the data management module 5004 stores and manages the image data that are formed by the image forming apparatus 101. Moreover, the data management module 5004 stores screen control information used for screen display control by the display module 5005, and operation target determination information used in order to determine an operation target by the operational target determination module 5006.

Then, the data management module 5004 manages the screen control information and the operation target determination information for every screen displayed by the display module 5005. Moreover, the data management module 5004 stores data that can determine a user. For example, face data of a user and a value calculated from a feature amount of a user's face are stored in the data management module 5004. Moreover, the data analysis module 5002 in the image forming apparatus 101 can determine whether users are coincident by comparing image data obtained by the camera 508 with data stored in the data management module 5004.

The display module 5005 controls the operation panel 209 through the display controller 207. For example, the display module 5005 displays user operatable UI widgets (buttons, pulldown lists, check boxes, etc.) on the operation panel 209. The screen displayed on the operation panel 209 is updated on the basis of screen display control information. For example, the display module 5005 obtains a language dictionary corresponding to a language setting stored in the data management module 5004 from the storage unit 205, and displays text data on the basis of the language dictionary on the screen.

The operational target determination module 5006 obtains a touched coordinate on the operation panel 209 through the operation I/F 208 and determines a UI widget corresponding to the touched coordinate on the operation panel 209 as an operation target. Moreover, the operational target determination module 5006 reads the screen display control information corresponding to the UI widget determined as the operation target and determines a process content at the acceptance of the operation on the basis of the information concerned. For example, the operational target determination module 5006 instructs the display module 5005 to update the display content on the screen, and transmits parameters of a job set by a user's operation and a start instruction of the job concerned to the job control module 5003.

The software configuration of the audio control apparatus 102 is the same as the configuration shown in FIG. 7. However, the data transmission/reception module 601 receives synthesized voice data used as a response to a user. It should be noted that voice processing after the voice-operation-start detection module 607 detects a wake word is mentioned later.

The utterance end determination module 608 determines an end timing of the process by the voice obtainment module 604. For example, when a user's voice breaks off beyond a predetermined period (for example, 3 seconds), the utterance end determination module 608 determines that the user's utterance has been finished and transmits the determination result to the audio control module 603 as the utterance end notification. A determination criterion about the utterance end is not limited to a no-utterance period (a blank period). For example, the utterance end may be determined on the basis of a predetermined word phrase from a user. The utterance end determination module 608 may determine that the utterance is finished without waiting the predetermined period when one of predetermined wards, such as "yes", "no", "OK", "cancel", "finish", and "start", is obtained. Moreover, the utterance end may be determined by the cloud server 103 and may be determined on the basis of meaning or context of the contents of the user's utterance.

Hereinafter, start and end timings of the processes of the voice obtainment module 604, the voice reproduction module 605, and the display module 606 will be described. The audio control module 603 starts the process of the voice obtainment module 604, when the operation start notification is received from the voice-operation-start detection module 607. Moreover, the audio control module 603 finishes the process of the voice obtainment module 604, when the utterance end notification is received from the utterance end determination module 608.

For example, a user shall speak a wake word and say "I want to copy" continuously. At this time, the voice-operation-start detection module 607 detects the voice of the wake word and transmits the operation start notification to the audio control module 603. When receiving the operation start notification, the audio control module 603 controls to start the process of the voice obtainment module 604.

The voice obtainment module 604 obtains analog voice "I want to copy" that the user said, converts it into voice data, and stores the voice data temporarily. When determining that there is a predetermined blank period after saying "I want to copy", the utterance end determination module 608 transmits the utterance end notification to the audio control module 603. When receiving the utterance end notification, the audio control module 603 finishes the process of the voice obtainment module 604. It should be noted that a state from the start to the end of the process of the voice obtainment module 604 shall be called an "utterance processing state". The display module 606 lights the LED 312 so as to show the utterance processing state.

The audio control module 603 controls so as to transmit the voice data that is temporarily stored in the voice obtainment module 604 to the cloud server 103 through the data transmission/reception module 601 after the determination of the end of the utterance of the user, and waits for a response from the cloud server 103. The response from the cloud server 103 consists of a header part showing a response and a response message consisting of synthesized voice data.

When the response message is received with the data transmission/reception module 601, the audio control module 603 controls the voice reproduction module 605 to reproduce the synthesized voice data. The synthesized voice data is a message "Copy screen is displayed", for example. It should be noted that a state after the utterance end determination until the termination of reproduction of the synthesized voice data shall be called a "response processing state".

The display module 606 blinks the LED 312 so as to show the response processing state. After the response process, the user can continuously say what the user wants to do without speaking a wake word during continuation of interactive session with the cloud server 103. When the cloud server 103 transmits an interactive session end notification to the audio control apparatus 102, the end of the interactive session is determined. It should be noted that a state from the end of the interactive session to a start of next interactive session shall be called a "standby state". The standby state is always kept until the audio control apparatus 102 receives the operation start notification from the voice-operation-start detection module 607. The display module 606 extinguishes the LED 312 under the standby state.

Figure 23:
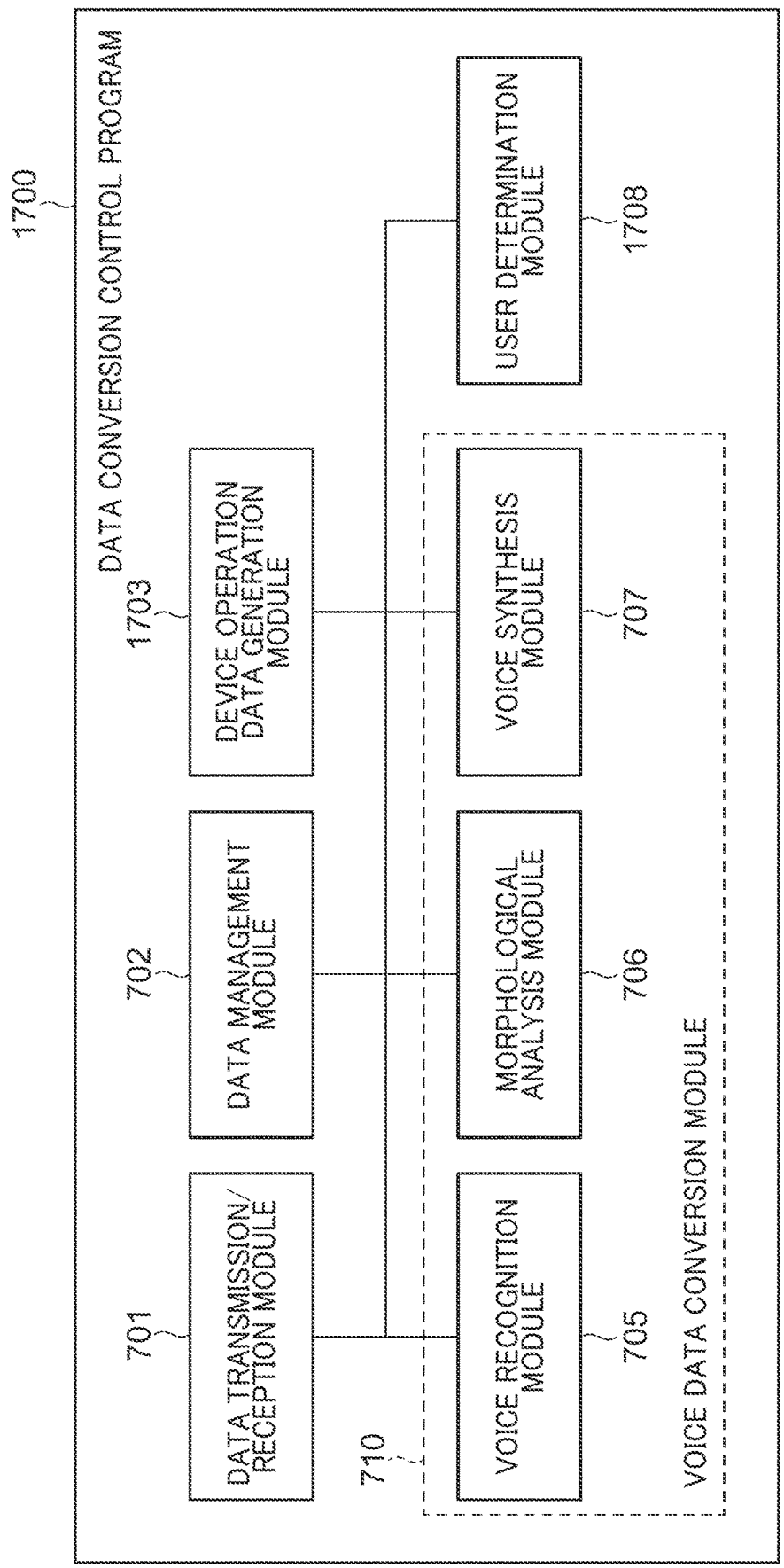
FIG. 23 is a block diagram showing a configuration of a software (a data conversion control program) of a cloud server included in a notification system according to a second embodiment of the present invention.

FIG. 23 is a block diagram schematically showing a configuration of software (a data conversion control program) of the cloud server according to the second embodiment. The data conversion control program (system control program) 1700 shown in FIG. 23 is stored in the storage unit 405. The CPU 402 develops the data conversion control program 1700 to the RAM 403 at start-up of the cloud server 103 and runs it. The data conversion control program 1700 includes the data transmission/reception module 701, the data management module 702, a device operation data generation module 1703, a user determination module 1708, and the voice data conversion module 710. The voice data conversion module 710 includes the voice recognition module 705, morphological analysis module 706, and voice synthesis module 707.

The data transmission/reception module 701 transmits/receives data to/from other devices on the network 104 through the network I/F 406 by TCP/IP. The data transmission/reception module 701 receives voice data of a user from the audio control apparatus 102. Moreover, the data management module 702 transmits a user ID that is determined by the user determination module 1708 and a text data determination result that is generated by executing a voice recognition process by the voice recognition module 705.

The data management module 702 stores various data, such as work data generated by executing the data conversion control program 1700 and parameters required to run the voice recognition process by the voice data conversion module 710, to a predetermined area of the storage unit 405 and manages them. For example, the data management module 702 stores an acoustic model and a language model, which are used for converting the voice data received by the data transmission/reception module 701 into a text, to the predetermined area of the storage unit 405 and manages them.

Moreover, the data management module 702 stores a dictionary used for performing morphological analysis of a text by the morphological analysis module 706 to the predetermined area of the storage unit 405 and manages it.

Moreover, the data management module 702 stores a user ID list used for determining a user ID by the user determination module 1708 to the predetermined area of the storage unit 405 and manages it.

Moreover, the data management module 702 stores a voice database used for synthesizing voice by the voice synthesis module 707 to the predetermined area of the storage unit 405. Moreover, the data management module 702 stores and manages device information required for communication with the audio control apparatus and image forming apparatus 101. The device operation data generation module 1703 generates operation information when the image forming apparatus 101 is operated by the user.

As mentioned above, the voice data conversion module 710 includes the voice recognition module 705, morphological analysis module 706, and voice synthesis module 707. The voice recognition module 705 performs the voice recognition process that converts the user's voice data received by the data transmission/reception module 701 into a text. The voice recognition process converts the user's voice data into phonemes using an acoustic model, and also converts the phonemes into actual text data using a language model.

There may be a plurality of languages of input voice. In this case, a first voice recognition method that determines the language of input voice data and converts the voice data into text data meeting the language determined may be employed. Alternatively, a second voice recognition method that converts the input voice data into phonemes using an acoustic model of a different language, converts them into text data in each language using a corresponding language model, and output it may be employed. In order to convert into text data with a plurality of language form in the case of a second voice recognition method, the voice recognition module 705 outputs the voice recognition data which consists of a text and a language setting as a result of a voice recognition process.

The languages of input voice shall be Japanese and English in this embodiment. The voice recognition data in Japanese shall consist of a text consisting of one or more kanas (the Japanese syllabaries) and a language setting "Japanese". The voice recognition data in English shall consist of a text consisting of one or more alphabets and a language setting "English". The voice recognition process that converts voice data into voice recognition data is not limited to the above-mentioned methods. The morphological analysis module 706 analyzes morphemes of the voice recognition data converted by the voice recognition module 705 according to the language setting.

The morphological analysis deduces a morpheme string from the dictionary that has the grammar of the language and information about parts of speech etc., and discriminates a part of speech for each of the morphemes. The morphological analysis module 706 is achieved using publicly known morphological analysis software, such as JUMAN, Chasen, and MeCab, for example. The voice synthesis module 707 converts the text information described in the text data into voice information according to the language setting. It should be noted that the morphological analysis module 706 and voice synthesis module 707 are publicly known.

The user determination module 1708 determines whether the user is registered in the user ID list recorded in the data management module 702 on the basis of the user information that is received by the data transmission/reception module 701. Moreover, when determining that the user is registered in the user ID list, the user determination module 1708 determines whether the user has the authority to the image forming apparatus 101.

The software configuration of the image pickup apparatus 106 is the same as the configuration shown in FIG. 9. The data transmission/reception module 801 has a function that enables reception of instructions to start and finish the monitoring, data conversion of a pickup image picked up by the image pickup apparatus 106, and transmission of the converted image data.

Although the instructions to start and finish the monitoring are transmitted from the image forming apparatus 101 in this embodiment, they may be transmitted from the cloud server 103. Moreover, although the image data is transmitted to the image forming apparatus 101, it may be transmitted to the cloud server 103. The image pickup module 802 has a function to pick up an object while controlling the image pickup lens mounted and a function to take in an image pickup signal. The monitoring control module 803 has a function to integrally perform interpretation of instructions to start and finish the monitoring, control of start and finish of the monitoring process, and control of transmission instruction of pickup image data.

Figure 24:
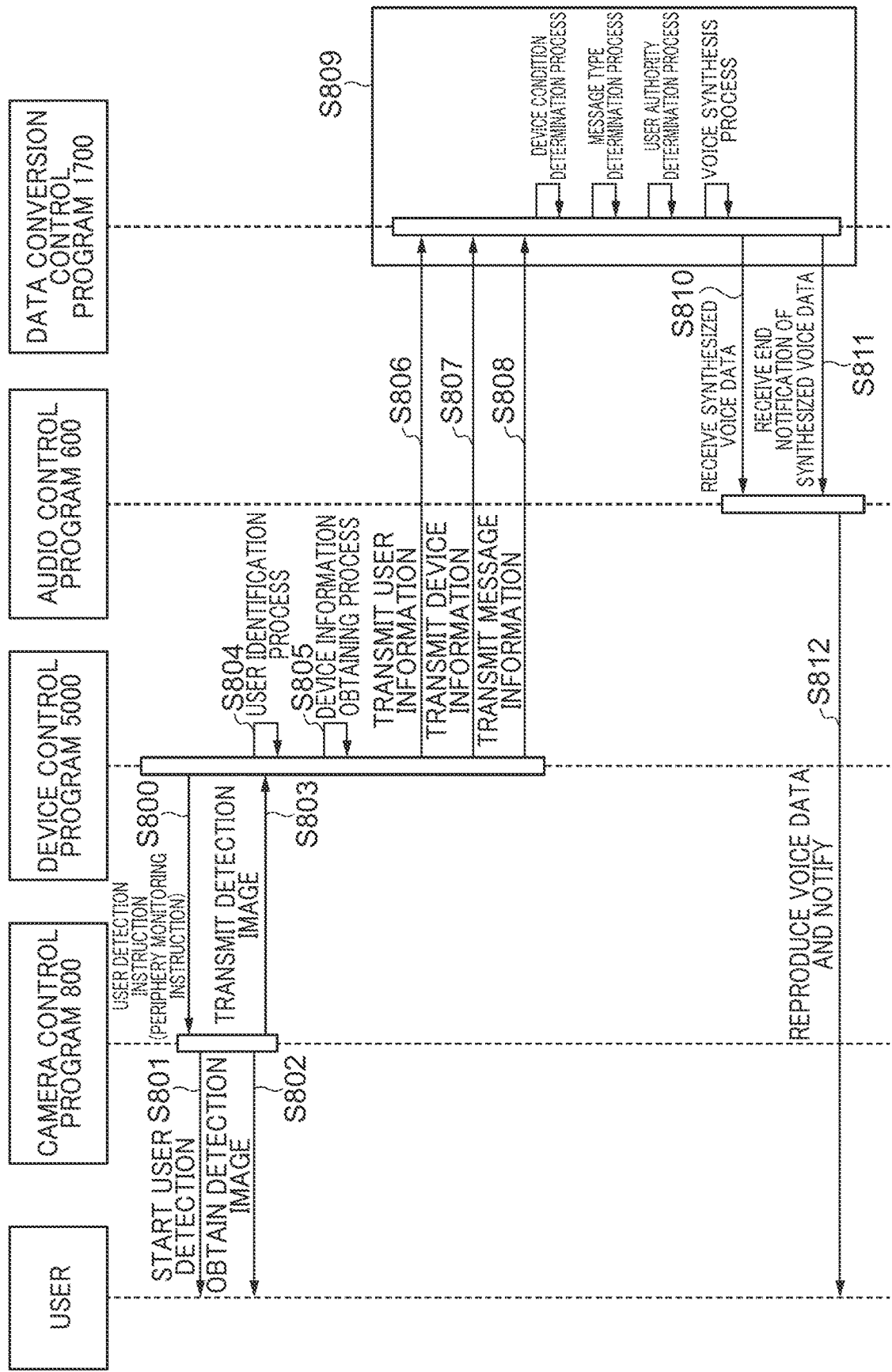
FIG. 24 is a sequence chart showing a process performed among a camera control program, a device control program, an audio control program, and the data conversion control program.

FIG. 24 is a sequence chart showing a process performed among the camera control program 800, the device control program 5000, the audio control program 600, and the data conversion control program 1700. In the sequence shown in FIG. 24, a user who approaches the image forming apparatus 101 is detected in the monitoring target area, and the individual user concerned is identified (is discriminated). Then, whether a voice message about the state of the image forming apparatus 101 is given is determined according to the identification result.

In the example of the sequence shown in FIG. 24, the image forming apparatus 101 is in a state that should notify a user to prepare a new K toner (black toner) cartridge and to replace an existing K toner cartridge because a remaining amount of K toner is small. A replacement work to the new K toner cartridge is performed by a user belonging to a first group. The first group is a group of which a member has predetermined authority to an event caused in the image forming apparatus 101. In this embodiment, the first group is an administrator group to which an administrator user to whom the replacement work is allowed in order to manage the state of image forming apparatus 101 belongs. In this case, the replacement work to the new K toner cartridge is performed by the administrator user.

In the meantime, there is also a second group in addition to the first group. The second group is a group of which a member has authority different from the authority of the first group. In this embodiment, the second group is a user group to which a user who uses the image forming apparatus 101 belongs. A general user belongs to the second group. In the example of the sequence shown in FIG. 24, a user who approaches the image forming apparatus 101 within the monitoring target area shall be an administrator user belonging to the first group.

As shown in FIG. 24, in a step S800, the device control program 5000 instructs the camera control program 800 to start user detection. The user detection starts when the power of the image forming apparatus 101 turns ON or when a user permits the user detection by operating the operation panel 209, for example. In a step S801, the camera control program 800 starts detection of a user who approaches the image forming apparatus 101 in the monitoring target area. The monitoring target area is not limited particularly, for example, it may be a circular area of which radius is 2 to 3 meters around the image forming apparatus 101. Moreover, for example, when the image forming apparatus 101 is arranged in a small room, the entire small room may be the monitoring target area.

In a step S802, the camera control program 800 picks up a detection image with the camera 508 to identify a user. Since user identification is performed by the face authentication that detects a person's face, the detection image picked up in the step S802 includes a user's face. In a step S803, the camera control program 800 transmits the detection image to the device control program 5000.

In a step S804, the data analysis module 5002 of the device control program 5000 performs a face detection process to the detection image picked up in the step S803 to determine whether a face is included. When determining that the face is included, the data analysis module 5002 calculates degrees of similarity between the detection image and user's face authentication images stored in the storage unit 205. And then, the data analysis module 5002 determines a user of which the degree of similarity is equal to or more than a threshold and the degree of similarity is the highest as an identification target. Thereby, the user picked up in the monitoring target area by the image pickup apparatus 106 is determined as one of the general user and the administrator user.

In this embodiment, the data analysis module 5002 identifies the user in the image picked up by the image pickup apparatus 106 on the basis of the image concerned in this way. Then, the data analysis module 5002 functions as an obtainment unit that obtains a group (the first group or the second group) to which the user in the monitoring target area belongs on the basis of the identification result. Thereby, when the user in the monitoring target area is determined as an administrator user, it is determined that the administrator user belongs to the first group, i.e., the user is associated with the first group.

Moreover, when the user in the monitoring target area is determined as a general user, it is determined that this general user belongs to the second group. A user identification process executed by the data analysis module 5002 preferably uses at least one of the ORB, SURF, and SIFT. Thereby, the feature amount of the user in the detection image can be extracted correctly and promptly, and, accordingly the user can be identified correctly.

In a step S805, the device control program 5000 obtains status information about the image forming apparatus 101 held in the RAM 203, and a job situation that is a situation of a job that is received by the image forming apparatus 101. In a step S806, the device control program 5000 transmits the user name and personal ID that are held in the storage unit 205 of the image forming apparatus 101 to the data conversion control program 1700 as the user information about the user identified in the step S804.

In a step S807, the device control program 5000 transmits the status information about the image forming apparatus 101 and information about the job situation that are obtained in the step S805 to the data conversion control program 1700 as the device information. In a step S808, the device control program 5000 transmits message information for specific users (i.e., for users belonging to the first group) according to the status information and the job situation that are held in the RAM 203 of the image forming apparatus 101.

In a step S809, the data conversion control program 1700 performs processes according to the message information given from the image forming apparatus 101. Details of the process in the step S809 will be mentioned later by referring to FIG. 25.

In a step S810, the audio control program 600 receives the synthesized voice data generated by the data conversion control program 1700 with the data transmission/reception module 601. In a step S811, the audio control program 600 receives an end notification of the synthesized voice data generated by the data conversion control program 1700 with the data transmission/reception module 601.

In a step S812, the audio control program 600 reproduces the synthesized voice data that is received in the step S810 with the voice reproduction module 605. The synthesized voice data may be "Remaining amount of K toner is insufficient. Please replace for new K toner cartridge.", for example. It is not limited to this. Moreover, the synthesized voice data is output from the speaker 310. In this way, a message about a malfunction of the image forming apparatus 101 is announced by voice through the speaker 310 (a notification step).

The speaker 310 is included in the notification unit that notifies a user of a message in this embodiment. This makes the administrator user positively recognize the message to prompt the replacement work of the K toner cartridge. Notification of a message is not limited to the notification by voice. For example, notification with an image is allowable and notification by voice and an image is also allowable. After reproduction of the synthesized voice data, the audio control program 600 shifts the audio control apparatus 102 to the standby state.

As mentioned above, in the notification system 100, it is preferable that the message includes a malfunction factor (shortage of the remaining amount of the K toner) of the image forming apparatus 101 and a solution (replacement to a new K toner cartridge) to the malfunction. Thereby, the administrator user can grasp the situation of the image forming apparatus 101 correctly. It should be noted that the message is not limited to what includes both the malfunction factor of the image forming apparatus 101 and the solution to the malfunction. For example, the message may include one of them.

Moreover, although the information about the recovery work (replacement to a new K toner cartridge) for resolving the malfunction is included as the solution to the malfunction, it is not limited to this. For example, information about a function degeneration work of the image forming apparatus 101 that enables temporal use of the image forming apparatus 101 under the malfunction may be included as the solution to the malfunction. When the image forming apparatus 101 enables color printing, an operation for printing by substituting toners other than K toner may be mentioned as the information about the function degeneration work. This enables printing while using the image forming apparatus 101 temporarily.

Then, in the notification system 100, when the user identified by the data analysis module 5002 belongs to the first group, a message can be announced, and when the user identified by the data analysis module 5002 belongs to the second group, the notification of a message can be restrained. This enables to send a message to a user who is highly related to the message. In this embodiment, the message about the shortage of remaining amount of K toner and the replacement to a new K toner cartridge is sent to an administrator user who is highly related to the message and belongs to the first group.

Moreover, a means that suspends the message notification is not limited, for example, a manual operation button for suspension of the message notification may be provided. In addition, the message notification may be suspended when the times of the message notification reaches a prescribed number. Moreover, the message notification may be suspended when the user goes out from the monitoring target area. Moreover, the message notification may be suspended when the recovery operation for restoring the image forming apparatus 101 is completed. When the recovery operation for restoring the image forming apparatus 101 is not performed after the predetermined period elapses, the message may be given again.

A periphery monitoring process by the camera control program in this embodiment is similar to the process of the flowchart shown in FIG. 14. The camera control program 800 picks up an image of the monitoring target area around the image forming apparatus 101 according to a monitoring instruction from the device control program 5000 and transmits the pickup image concerned to the device control program 5000 with a predetermined cycle. Moreover, the image pickup process by the camera control program 800 is regularly performed unless receiving the stop instruction from the device control program 5000. When the stop instruction is received, the camera control program 800 stops the image pickup promptly and finishes the process.

Figure 25:
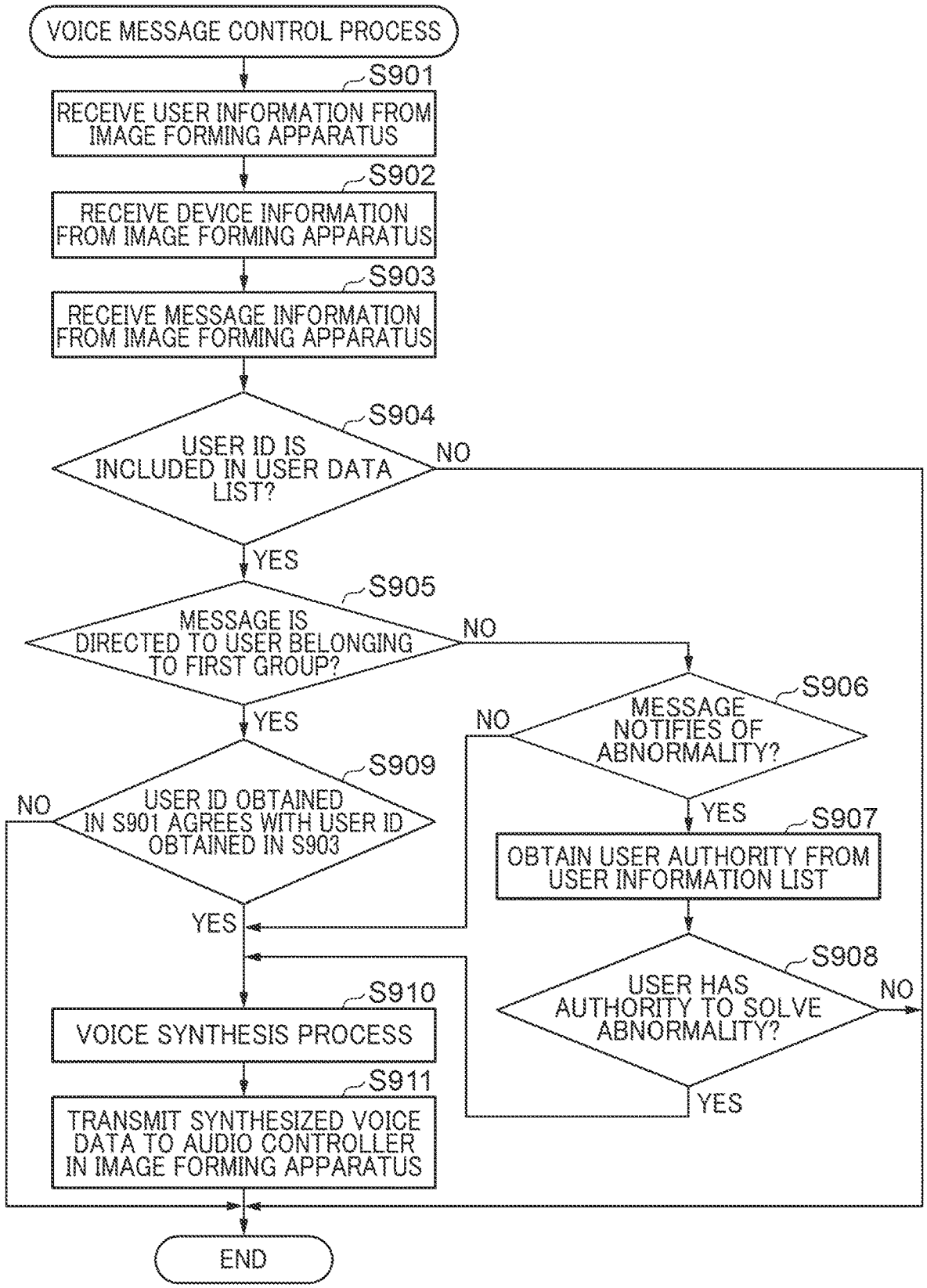
FIG. 25 is a flowchart showing a voice message control process by the data conversion control program.

FIG. 25 is a flowchart showing a voice message control process until voice notification by the data conversion control program 1700. FIG. 25 is the flowchart that shows the details of the process in the step S809 in FIG. 24.

As shown in FIG. 25, in a step S901, the CPU 402 receives the user name and user ID that are transmitted in the step S806 as the user information that is detected by the image pickup apparatus 106. The user name etc. are held in the storage unit 205 of the image forming apparatus 101. In a step S902, the CPU 402 receives the status information of the image forming apparatus 101 and the information about the job situation that are transmitted in the step S807 as the device information.

In a step S903, the CPU 402 receives the message information transmitted in the step S808 according to the status information of the device and the job situation. In a step S904, the CPU 402 refers to a user data list held in the RAM 403 on the basis of the user ID received in the step S901. Then, the CPU 402 determines whether the user ID is included in the user data list. The user data list will be described later by referring to FIG. 26. As a result of the determination in the step S904, when the CPU 402 determines that the user ID is included in the user data list, the process proceeds to a step S905. In the meantime, as a result of the determination in the step S904, when the CPU 402 determines that the user ID is not included in the user data list, the process is finished. This prevents unnecessary message notification.

In a step S905, the CPU 402 determines a classification of the message information received in the step S903. As a result of the determination in the step S905, when the CPU 402 determines that the message directed to a specific user (an administrator user) who belongs to the first group, the process proceeds to a step S909. In the meantime, when the CPU 402 determines that the message is not directed to the specific user, the process proceeds to a step S906.

In the step S906, the CPU 402 determines whether the message information received in the step S903 is what notifies a user of an exception state (a malfunction) of the image forming apparatus 101. Specifically, the CPU 402 checks whether the message is a device stop request owing to solvable malfunctions, such as a paper jam and a residual toner shortage, in the image forming apparatus 101.

As a result of the determination in the step S906, when the CPU 402 determines that the message is the device stop request, the process proceeds to a step S907. In the meantime, as a result of the determination in the step S906, when the CPU 402 determines that the message is not the device stop request, the process proceeds to a step S910. In this case, the message can be given to any user regardless of the user type. Accordingly, when whether the user identified by the data analysis module 5002 belongs to the first group or the second group is out of the question, the message that can be given to any user is given. For example, in the step S910, the voice message "Copy is completed" is synthesized as a job end message. Thereby, any user can recognize the completion of a copy job.

In the step S907, the CPU 402 searches the user data list (user information list) from a head on the basis of the user ID received in the step S901. Then, the CPU 402 obtains the information about user authority associated with the user ID from the user data list. As mentioned above, there are a general user and an administrator user as examples of users picked up in the monitoring target area. The user authority is divided into authority to the general user and authority to the administrator user according to contents of the solvable exception condition of the image forming apparatus 101.

In a step S908, the CPU 402 executes a process depending on the user authority obtained in the step S907. Specifically, the CPU 402 determines whether the user authority obtained in the step S907 is permitted to solve the exception condition of the image forming apparatus 101. That is, the CPU 402 determines whether the user has a user authority that can solve the exception condition of the image forming apparatus 101. As a result of the determination in the step S908, when the CPU 402 determines that the user has the user authority, the process proceeds to the step S910. In the meantime, as a result of the determination in the step S908, when the CPU 402 determines that the user does not have the user authority, the process is finished. This prevents unnecessary message notification.

In the step S909, the CPU 402 determines whether the user ID received as the user information in the step S901 agrees with the user ID obtained in the step S903. As a result of the determination in the step S909, when the CPU 402 determines that the user IDs agree, the process proceeds to the step S910. In the meantime, as a result of the determination in the step S909, when the CPU 402 determines that the user IDs do not agree, the process is finished.

In the step S910, the CPU 402 synthesizes voice data given to the audio control apparatus 102. For example, when the administrator user is notified of occurrence of the exception condition, the voice data "Exception condition occurs" is synthesized as a message indicating this. Moreover, when a message type is reception print, voice data "Print job to user AAA reached" is synthesized as a message indicating this, for example. In a step S911, the CPU 402 transmits the synthesized voice data obtained in the step S910 to the audio control apparatus 102. Thereby, the audio control apparatus 102 outputs the synthesized voice data by voice.

FIG. 26 is a view showing an example of the user data list. The user data list shown in FIG. 26 has items of a user ID, a mail address, and a role of each user, and information of each item is stored. This user data list is a database that manages individual user information and the authority to the exception condition of the image forming apparatus 101 while associating them. In this embodiment, the authority to solve the exception condition of the image forming apparatus 101 is set corresponding to the role of the user.

The administrator user has the authority to solve the exception condition of the image forming apparatus 101. The general user is restricted in execution of solution of the exception condition. For example, as shown in FIG. 26, when focusing on a serial number "1", the user whose user ID is "AAA" is associated to the role of the general user. Similarly, when focusing on the serial number "2", the user whose user ID is "BBB" is associated to the role of the administrator user. When focusing on the serial number "3", the user whose user ID is "CCC" is associated to the role of the general user. Such a user data list enables quick determination of whether the user is the general user or the administrator user.

A device abnormality information notification process by the device control program in this embodiment is similar to the process of the flowchart shown in FIG. 16. When detecting any state abnormality due to a malfunction, the device control program 5000 transmits malfunction information to the data conversion control program 1700. Moreover, although the device control program 5000 continues the status monitoring even after transmitting the malfunction information unless receiving the stop instruction from a user, the program 5000 finishes the process promptly when the stop instruction is given from the user by performing a shutdown process. As the malfunction information (device abnormality information), there are the residual toner shortage and the paper jam mentioned above, etc., for example.

A voice notification process by the audio control program in this embodiment is similar to the process of the flowchart shown in FIG. 19. The audio control program 600 reproduces the voice data through the speaker 310 when receiving the voice data from the data conversion control program 1700. After reproduction of the voice data, a response from a user is waited during a certain period. Moreover, when receiving a response from the user, the audio control program 600 converts of the response into response data and transmits it to the data conversion control program 1700. When there is no response during the certain period, the audio control program 600 transmits blank data to the data conversion control program 1700. In this case, it is determined as "no reaction".

FIG. 27 is a view showing an example of a message generation table. The message generation table shown in FIG. 27 shows a relation between a state of the image forming apparatus 101 (device), a message type, and a user, and is stored in the data management module 702 of the cloud server 103. In this embodiment, when the image forming apparatus 101 comes to a print execution unavailable state as the exception condition, a recovery procedure is given to only the administrator user who can solve the exception condition, and the notification of the recovery procedure to the general user is restricted. The recovery procedure is given to the administrator user who has a work to do in the image forming apparatus 101 and approaches intentionally.

As shown in FIG. 27, the message generation table includes a message type, and voice messages for the general user, specific user, and administrator user corresponding to each device condition of the image forming apparatus 101. For example, when the exception condition, such as the paper jam or the residual K toner shortage, occurs in the image forming apparatus 101, the message type becomes an abnormality message that includes at least one of the factor of the malfunction and the solution handling the malfunction. Then, this message is given to only the administrator user who can solve the exception condition as voice information.

Moreover, when the device condition of the image forming apparatus 101 is reception of a fax job, the message type becomes a message for specific user that notifies the specific user that there is a job. Then, this message is given to only the specific user as voice information. Moreover, when the device condition of the image forming apparatus 101 is completion of a copy job, the message type becomes a general message indicating this. Then, this message is given to all the users including the general user, the specific user, and the administrator user as voice information.

As mentioned above, in the notification system 100, a user who is notified of a message is changed corresponding to the device condition (event) of the image forming apparatus 101. This enables to correctly send a message to a person who is highly related to the message. Moreover, the messages are beforehand stored in the data management module 702 as a storage unit. Thereby, a message can be selected from the data management module 702 and can be given promptly.

Figure 28:
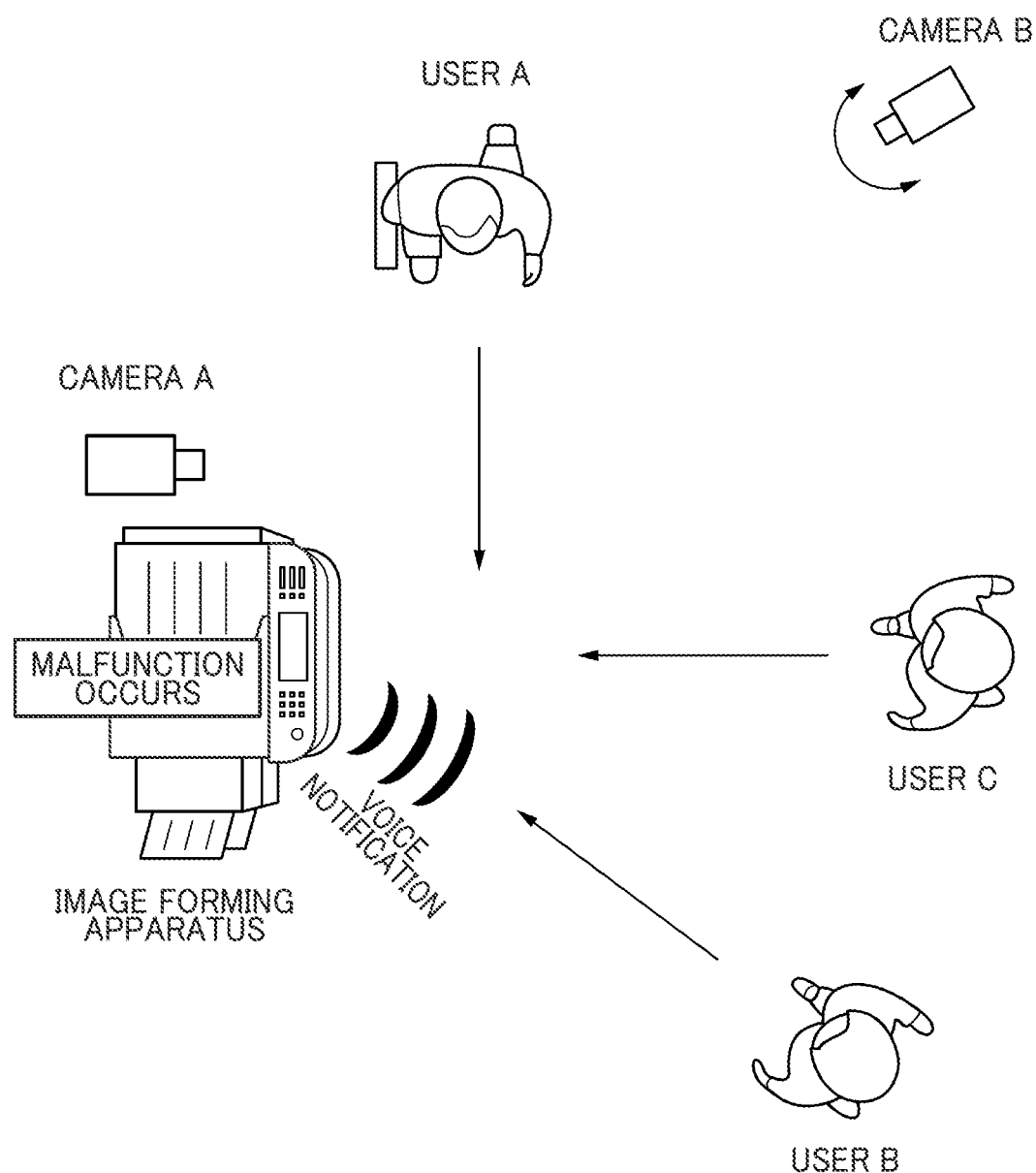
FIG. 28 is an overhead view showing an arrangement example of the image forming apparatus, the image pickup apparatus, and users who are monitoring targets.

FIG. 28 is an overhead view showing an arrangement example of the image forming apparatus, the image pickup apparatus, and users who are monitoring targets. In the notification system 100, it is preferable to notify only the administrator user who can solve the exception condition of the image forming apparatus 101 of the recovery procedure. Accordingly, a user who approaches the image forming apparatus 101 is detected and whether the message is given or not is switched on the basis of the role and behavior of the user.

As shown in FIG. 28, it is preferable not to notify a passing user A who does not linearly approach the installation position of the image forming apparatus 101 of a message even when the user is detected. In the meantime, it is preferable to positively notify a user B and a user C who linearly approach the installation position of the image forming apparatus 101 of the message.

Whether a user is linearly approaching the image forming apparatus 101 is determined in the same manner as the first embodiment. The face authentication has been described by referring to FIG. 17B. Since the user A moves in a direction different from a straight line that connects the position of the user A and the installation position of the image forming apparatus 101, it is not determined that the user A approaches the image forming apparatus 101 linearly. Since the user B and the user C moves to the image forming apparatus 101 on the straight line that connects the positions of the respective users and the installation position of the image forming apparatus 101, it is determined that the user B and the user C approach the image forming apparatus 101 linearly.

In this way, the notification system 100 can judge whether a message is given according to a user's moving direction. Thereby, excessive message notification in a case where a user who approaches the monitoring target area hurries to go to a destination can be prevented, for example. Furthermore, necessity of the message notification is judged again based on whether the target user belongs to the first group. Furthermore, this determination is available by using the data analysis module 5002 as the judgement unit. Moreover, when an infrared sensor is further employed for the user face authentication, for example, depth information of a face can be used as the feature amount, which improves a user identifying ability.

When an administrator user is detected as a passing user, a message is positively given so as to prompt degeneration setting (a degeneration operation) as with the example shown in FIG. 20C. Thereby, even when the administrator user who approaches the monitoring target area hurries to go to a destination, and when the degeneration setting is easy, the administrator user can set the image forming apparatus 101 to a usable state temporarily. When a service person who belongs to the first group is detected as a passing user, a message is positively given so as to prompt replacement of a component as with the example shown in FIG. 20D. Thereby, the service person can recognize that component replacement is required, for example, can perform component replacement in future.

In the meantime, positive message notification to a passing general user is restrained because the notification about degeneration of a function and replacement of a component may cause a new malfunction due to an excessive operation. It is preferable that a general user is notified of information about a restricted function as a message only when the general user approaches the image forming apparatus 101 to use it. No message is given to a general user who is passing near the image forming apparatus 101 and a message about a restricted function is given to a general user B who approaches the image forming apparatus 101 as with the example shown in FIG. 20E.

Furthermore, a guest user who is not a user in a company and cannot be individually identified is a user type that does not have the authority to operate the image forming apparatus 101. In this case, it is preferable that a guest user is not notified of a message in not only a case where the guest user passes near the image forming apparatus 101 but also a case where the guest user approaches the image forming apparatus 101. When a guest user passes near the image forming apparatus 101 or approaches the image forming apparatus 101, a positive message notification is restrained as with the example shown in FIG. 20F.

Figure 29:
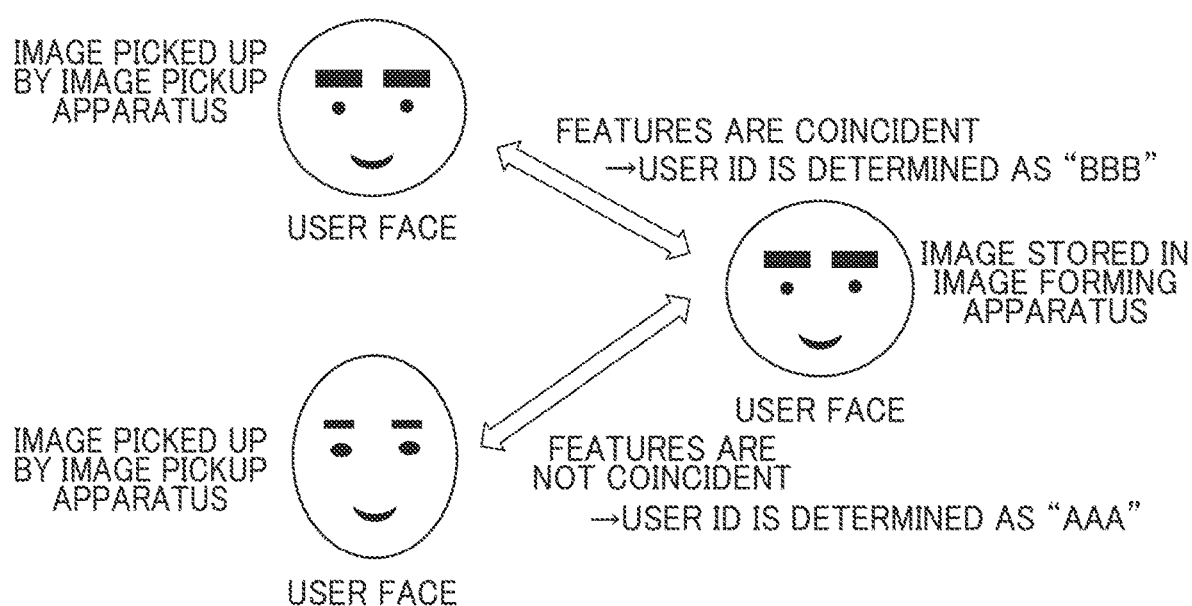
FIG. 29 is a view showing examples of characteristic features used in determining a user type from an image picked up by the image pickup apparatus.

FIG. 29 is a view showing examples of characteristic features used in determining a user type from an image picked up by the image pickup apparatus. In the notification system 100, a message is given to the specific user who is detected in the monitoring target area and belongs to the first group. Hereinafter, a concrete example of the face authentication for determination of whether a user detected in the monitoring target area belongs to the first group will be described.

As shown in FIG. 29, a face image (a right side in the drawing) that a face of an administrator user belonging to the first group is viewed from a front side is beforehand stored in the image forming apparatus 101. When the image pickup apparatus 106 picks up a user under this situation, for example, a face image at an upper left side in FIG. 29 shall be obtained as the face image of the user concerned. This face image is an actual image of a face of a user detected in the monitoring target area that is picked up from the front side.

Then, a positional relationship between eyes, a nose, a mouth, etc. are extracted as a feature amount by applying the feature amount extraction algorithm like the ORB mentioned above to this actual image when performing the face authentication. The degree of coincidence between the feature amount of the actual image and the feature amount of the face image of the administrator user that is beforehand stored in the image forming apparatus 101 is calculated. When the calculated result is equal to or more than a predetermined threshold, the actual image is determined as the face image of the user whose user ID is "BBB" (see FIG. 26). Then, the attribute of the group associated with the user ID "BBB" is determined, and the user concerned is determined as the administrator user belonging to the first group.

In the meantime, a face image at a lower left side in FIG. 29 shall be obtained as the face image of the user. This face image is an actual image of a face of a user detected in the monitoring target area that is picked up from the front side.

A positional relationship between eyes, a nose, a mouth, etc. are extracted as a feature amount by applying the feature amount extraction algorithm like the ORB mentioned above to the actual image when performing the face authentication. The degree of coincidence between the feature amount of the actual image and the feature amount of the face image of the administrator user that is beforehand stored in the image forming apparatus 101 is calculated. When the calculated result is less than the predetermined threshold, the actual image is determined as the face image of the user whose user ID is "AAA" (see FIG. 26). Then, the attribute of the group associated with the user ID "AAA" is determined, and the user concerned is determined as the general user belonging to the second group.

As mentioned above, the notification system 100 is constituted so as to identify a user (person) in the image picked up by the image pickup apparatus 106 using the face authentication on the basis of the image concerned. Machine learning that reasons and identifies a user can be used for this face authentication, for example. In this case, an inference model is preferably a learning model that uses a neural network of which parameters are adjusted by an error back propagation method etc. Thereby, the inference model can perform deep learning that generates various parameters, such as feature amounts and weight, for learning by itself, for example.

The machine learning is not limited to the deep learning. For example, the machine learning using arbitrary machine learning algorithms, such as a support vector machine, logistics revolution, and a decision tree, may be employed. Although the approach of the user to the vicinity of the image forming apparatus 101 is detected on the basis of the pickup image of the image pickup apparatus 106 in this embodiment, it is not limited to this. For example, a short distance communication means (BLE (Bluetooth Low Energy) etc.) that can detect that a user approaches the vicinity of the image forming apparatus 101 may be employed.

Moreover, although the image forming apparatus 101 holds the user information and identifies a user in this embodiment, it may not be limited to this. For example, the cloud server 103 may hold the user information and may identify a user.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The Computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2022-068273, filed Apr. 18, 2022, No. 2022-076685, filed May 6, 2022, and No. 2023-022893, filed Feb. 16, 2023, which are hereby incorporated by reference herein in their entireties.

What is claimed is:

1. A notification system comprising:
an image pickup apparatus configured to pick up an image including a person as an object;
a memory configured to store computer-executable instructions; and
a processor configured to execute the computer-executable instructions to implement:
an obtainment unit configured to obtain attribute information about an attribute of the person as a role of the person in the image based on the image picked up by the image pickup apparatus;
a determination unit configured to determine a content of a message about a predetermined event as at least one of a first notification, a second notification, and a third notification in accordance with the attribute information; and
a notification unit configured to cause notification of the message determined by the determination unit,
wherein the predetermined event is a malfunction of a predetermined apparatus,
wherein in a case where the predetermined event occurs and the obtainment unit obtains the attribute information indicating that the role of the person is an administrator who manages a state of the predetermined apparatus, the determination unit determines the content of the message to be the second notification,
wherein in a case where the predetermined event occurs and the obtainment unit obtains the attribute information indicating that the role of the person is a maintenance person who performs maintenance of the predetermined apparatus, the determination unit determines the content of the message to be the third notification,
wherein the second notification notifies of a function degeneration work of the predetermined apparatus for enabling use of the predetermined apparatus temporarily also under the malfunction,
wherein the third notification notifies of a recovery operation for resolving the malfunction, and
wherein the notification unit causes a speaker to notify of the message by voice.

2. The notification system according to claim 1, wherein the content of the message includes at least one of a factor of the malfunction and a solution for handling the malfunction.

3. The notification system according to claim 1, wherein the first notification notifies of use suspension or use restriction of the predetermined apparatus due to the malfunction.

4. The notification system according to claim 1, further comprising a storage configured to store the first notification, the second notification, and the third notification.

5. The notification system according to claim 1, wherein the notification unit enables a first call notification for calling the administrator who manages the state of the predetermined apparatus in a case where the first notification is given to a user who uses the predetermined apparatus, and
wherein the notification unit enables a second call notification for calling the maintenance person who performs maintenance of the predetermined apparatus in a case where the second notification is given to the administrator.

6. The notification system according to claim 5, wherein the notification unit is configured to cause the first notification and the first call notification to be repeated and to cause the second notification and the second call notification to be repeated.

7. The notification system according to claim 5, further comprising a storage configured to store the first call notification and the second call notification.

8. The notification system according to claim 1, wherein the determination unit redetermines the content of the message whenever the attribute information is changed.

9. The notification system according to claim 1, wherein the obtainment unit obtains the role using at least one of Oriented FAST and Rotated BRIEF, Speeded-Up Robust-Features and Scale-Invariant Feature Transform.

10. The notification system according to claim 1, wherein the obtainment unit identifies the person by performing face authentication that detects a face of the person in the image and obtains a group to which the person belongs as the role, and
wherein the notification unit causes notification of the message in a case where the person belongs to a first group that has predetermined authority to the event, and wherein the notification unit does not cause notification of the message in a case where the person belongs to a second group that has authority different from the predetermined authority of the first group.

11. The notification system according to claim 10, wherein the content of the message includes one of the second notification and the third notification.

12. The notification system according to claim 10, wherein the first group is an administrator group to which the administrator who manages the state of the predetermined apparatus belongs, and
wherein the second group is a user group to which a user who uses the predetermined apparatus belongs.

13. A control method for a notification system, the control method comprising:
an image pickup step of picking up an image including a person as an object;
an obtainment step of obtaining attribute information about an attribute of the person as a role of the person in the image based on the image picked up in the image pickup step;
a determination step of determining a content of a message about a predetermined event as at least one of a first notification, a second notification, and a third notification in accordance with the attribute information; and
a notification step of notifying of the message determined in the determination step,
wherein the predetermined event is a malfunction of a predetermined apparatus, wherein in a case where the predetermined event occurs and the obtained attribute information indicates that the role of the person is an administrator who manages a state of the predetermined apparatus, the content of the message is determined to be the second notification, wherein in a case where the predetermined event occurs and the obtained attribute information indicates that the role of the person is a maintenance person who performs maintenance of the predetermined apparatus, the content of the message is determined to be the third notification, wherein the second notification notifies of a function degeneration work of the predetermined apparatus for enabling use of the predetermined apparatus temporarily also under the malfunction, wherein the third notification notifies of a recovery operation for resolving the malfunction, and wherein the notification step causes a speaker to notify of the message by voice.

14. A non-transitory computer-readable storage medium storing a control program causing a computer to execute a control method for a notification system, the control method comprising:

an image pickup step of picking up an image including a person as an object;

an obtainment step of obtaining attribute information about an attribute of the person as a role of the person in the image based on the image picked up in the image pickup step;

a determination step of determining a content of a message about a predetermined event as at least one of a first notification, a second notification, and a third notification in accordance with the attribute information; and a notification step of notifying of the message determined in the determination step, wherein the predetermined event is a malfunction of a predetermined apparatus, wherein in a case where the predetermined event occurs and the obtained attribute information indicates that the role of the person is an administrator who manages a state of the predetermined apparatus, the content of the message is determined to be the second notification, wherein in a case where the predetermined event occurs and the obtained attribute information indicates that the role of the person is a maintenance person who performs maintenance of the predetermined apparatus, the content of the message is determined to be the third notification, wherein the second notification notifies of a function degeneration work of the predetermined apparatus for enabling use of the predetermined apparatus temporarily also under the malfunction, wherein the third notification notifies of a recovery operation for resolving the malfunction, and wherein the notification step causes a speaker to notify of the message by voice.

* * * * *